US012029356B2

(12) United States Patent
Kim et al.

(10) Patent No.: US 12,029,356 B2
(45) Date of Patent: Jul. 9, 2024

(54) DRYING APPARATUS

(71) Applicant: LG ELECTRONICS INC., Seoul (KR)

(72) Inventors: Dae woong Kim, Seoul (KR); Seung Yup Lee, Seoul (KR); Min Kyu Oh, Seoul (KR); Hyun Ki Kim, Seoul (KR); Seong Woo An, Seoul (KR); Yang hwan No, Seoul (KR); Sang Yoon Lee, Seoul (KR); Byung Soo Oh, Seoul (KR); Yeon A Jo, Seoul (KR); Gi seop Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 794 days.

(21) Appl. No.: 17/151,942

(22) Filed: Jan. 19, 2021

(65) Prior Publication Data

US 2022/0061604 A1 Mar. 3, 2022

(30) Foreign Application Priority Data

Aug. 31, 2020 (KR) ........................ 10-2020-0110383

(51) Int. Cl.
*A47K 10/48* (2006.01)
*F26B 21/02* (2006.01)

(52) U.S. Cl.
CPC .............. *A47K 10/48* (2013.01); *F26B 21/02* (2013.01)

(58) Field of Classification Search
CPC ........... F26B 21/00; F26B 21/02; A47K 10/48
USPC .............................................. 34/90, 595–610
See application file for complete search history.

(56) References Cited

U.S. PATENT DOCUMENTS 1,989,998 A * 2/1935 Mueller .................. F26B 21/02 34/223
2,310,680 A * 2/1943 Dinley .................. D06F 43/086 34/131
3,039,285 A * 6/1962 Smith ..................... D06F 25/00 68/144
4,905,381 A * 3/1990 Poterala .................. F26B 13/10 432/59
5,185,939 A * 2/1993 Kimura ................... A47L 23/20 34/212
2018/0064298 A1 3/2018 Bullock
(Continued)

FOREIGN PATENT DOCUMENTS

AU 2005203363 A1 2/2006
CN 106061343 A 10/2016
(Continued)

*Primary Examiner* — Stephen M Gravini
(74) *Attorney, Agent, or Firm* — Bryan Cave Leighton Paisner LLP

(57) ABSTRACT

A drying apparatus is proposed. The main body (100) may constitute the frame of the drying apparatus. The fan receiving part (104) may be provided in an upper part of the main body (100), and the fan assembly (160) may be installed in the fan receiving part (104). In the fan receiving part (104), the fan of the fan assembly (160) may be relatively located at a side of a rear end of the main body (100), and a fan motor (170) may be relatively located at a side of the front end of the main body (100). Accordingly, outside air may be introduced through the side edges of the rear end of the main body (100); may flow through a filter assembly (180) directly to the fan housing (162); and may flow through the air exit (169) of the fan housing (162) directly to the duct (130).

20 Claims, 40 Drawing Sheets

(56) References Cited

U.S. PATENT DOCUMENTS

| | | | | |
|---|---|---|---|---|
| 2018/0066855 | A1 | 3/2018 | Lee et al. | |
| 2022/0061604 | A1* | 3/2022 | Kim | F26B 21/02 |
| 2022/0061606 | A1* | 3/2022 | An | B01D 46/58 |
| 2022/0079397 | A1* | 3/2022 | An | A45D 20/16 |
| 2023/0391434 | A1* | 12/2023 | Paturu | B63C 9/22 |

FOREIGN PATENT DOCUMENTS

| | | | | | |
|---|---|---|---|---|---|
| CN | 108852101 | A | | 11/2018 | |
| CN | 114098494 | A | * | 3/2022 | A47K 10/48 |
| EP | 3960051 | A1 | * | 3/2022 | A47K 10/48 |
| JP | 078412 | A | | 1/1995 | |
| JP | 07008412 | A | | 1/1995 | |
| JP | 2015112929 | A | * | 6/2015 | |
| KR | 1020090109634 | A | | 10/2009 | |
| KR | 102189863 | B1 | | 12/2020 | |
| KR | 20220028832 | A | * | 3/2022 | |

* cited by examiner

【FIG. 1】
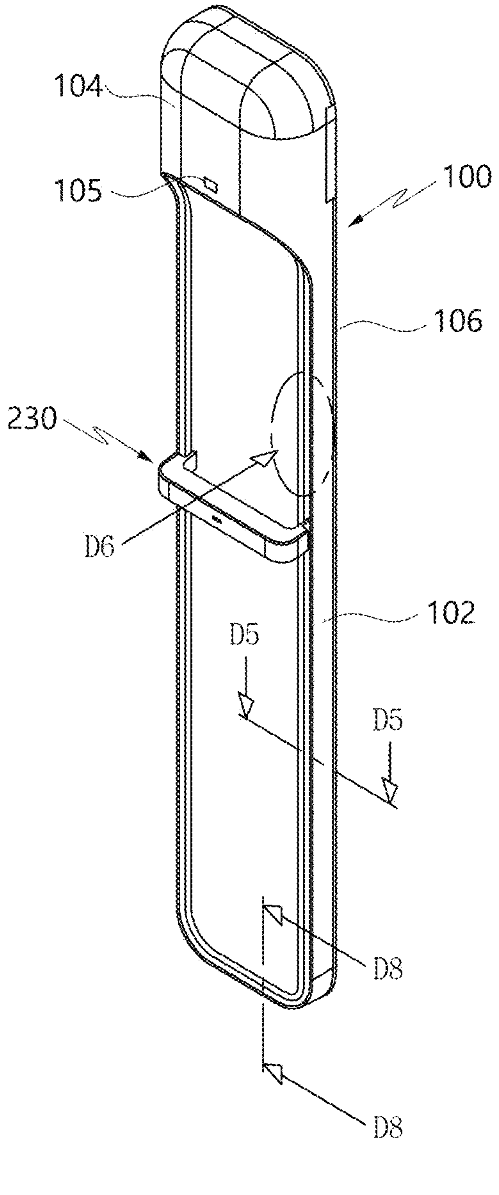

【FIG. 2】
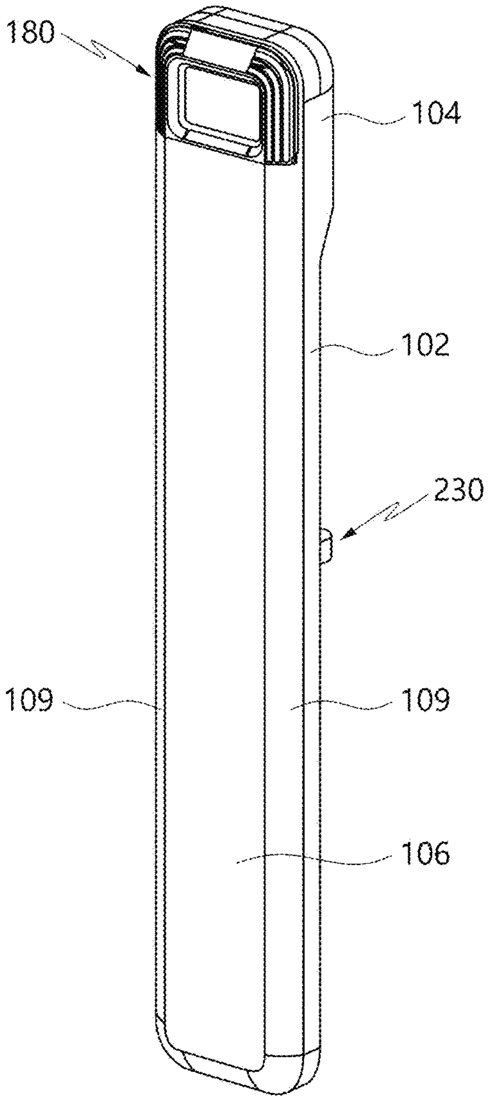

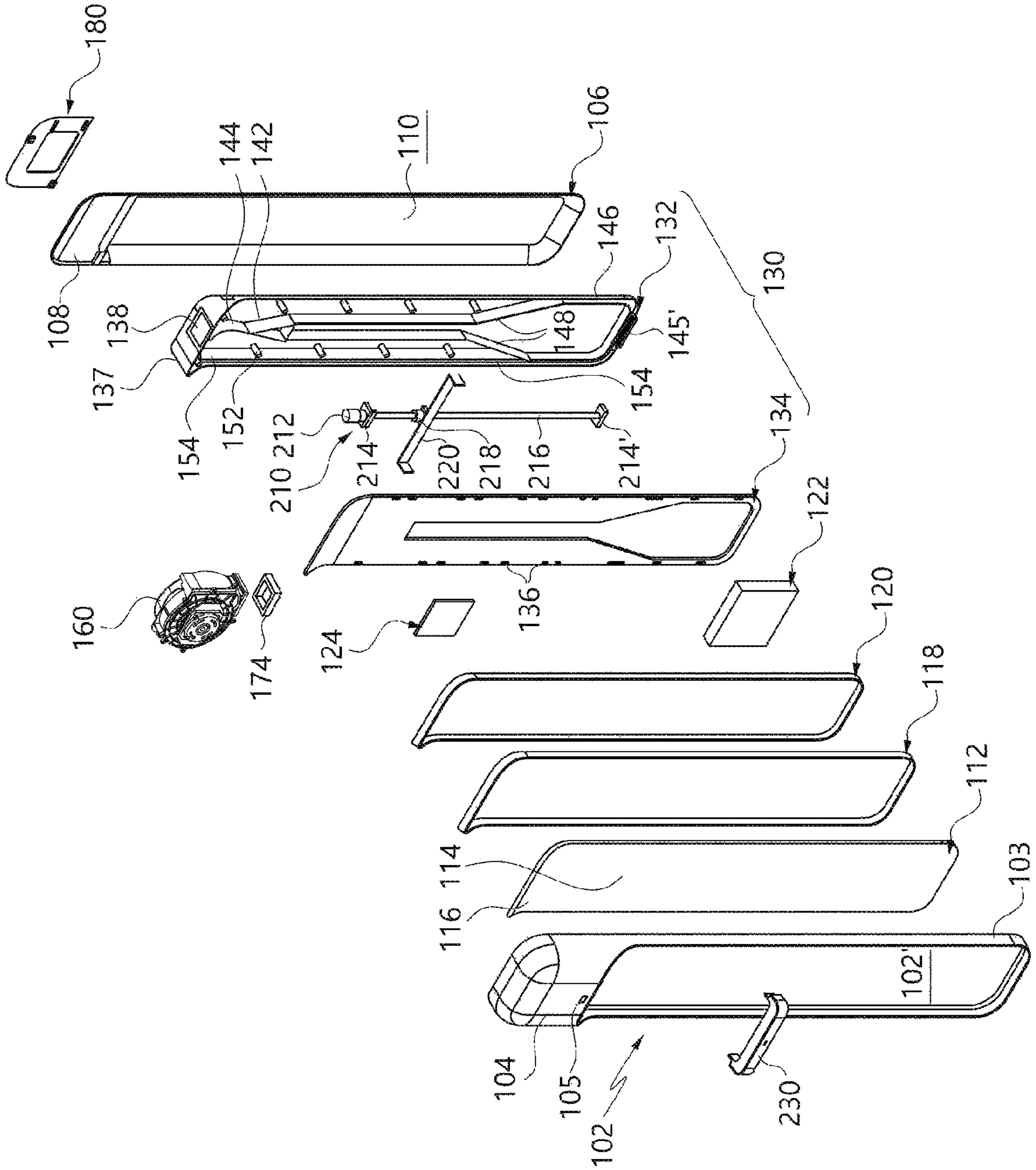
[FIG. 3]

【FIG. 4】
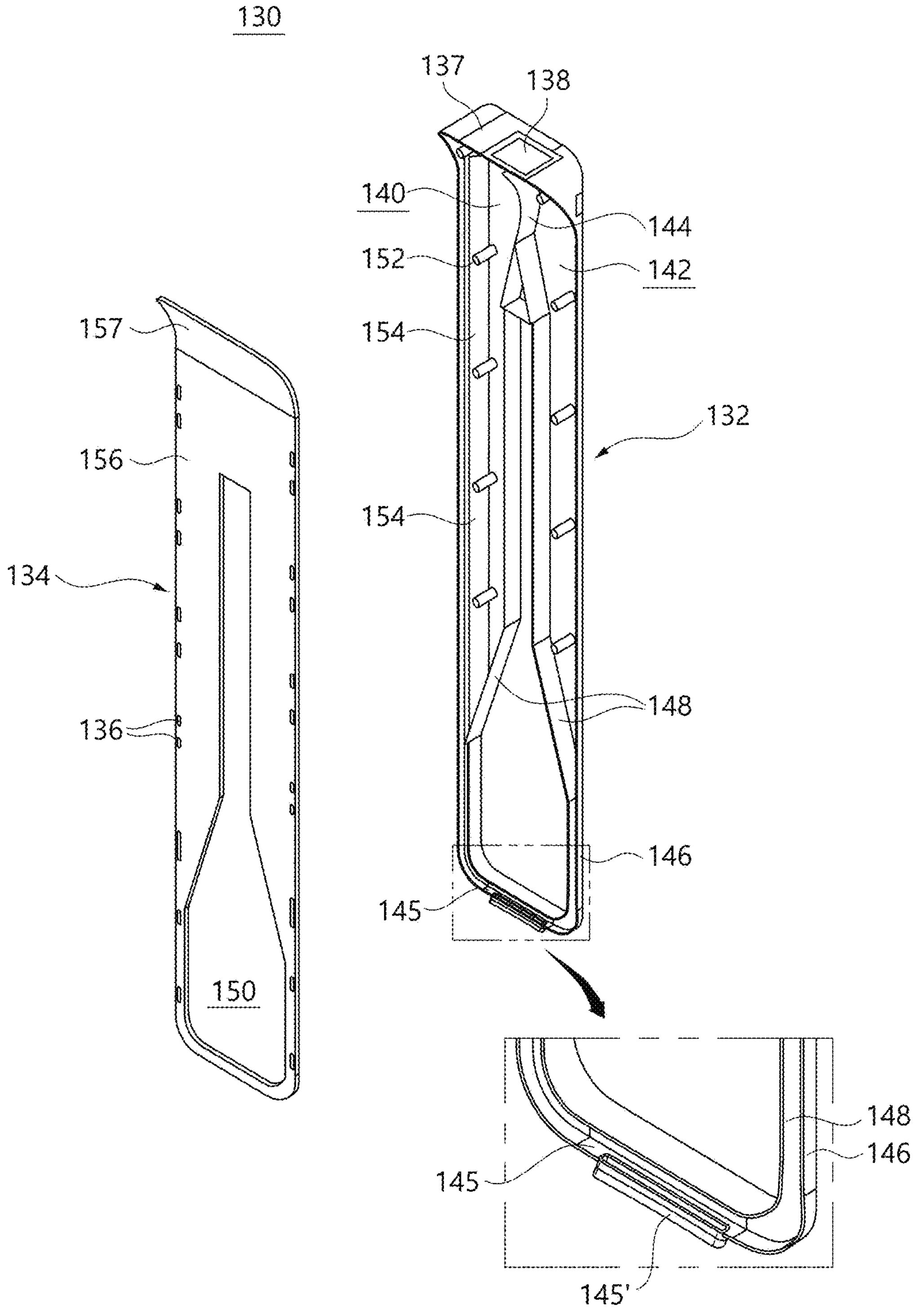

【FIG. 5】
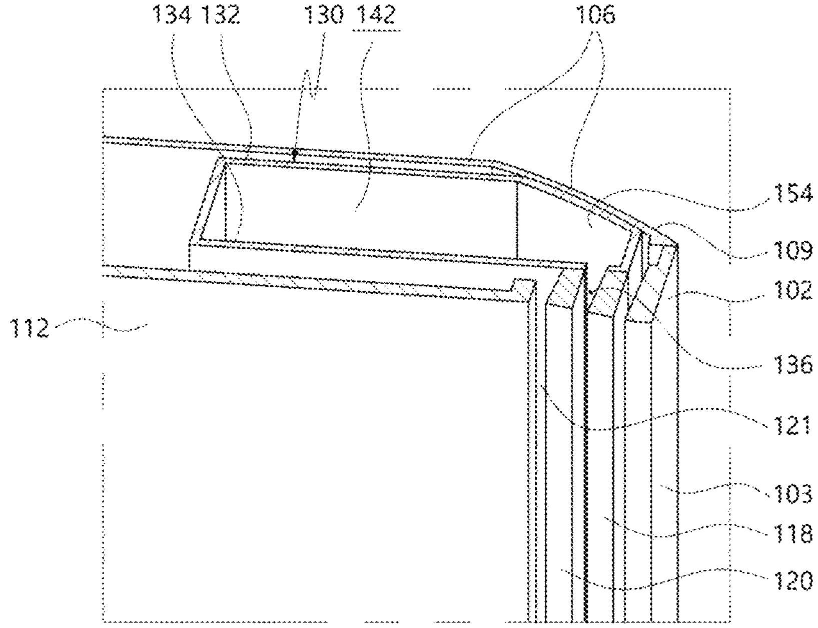
【FIG. 6】
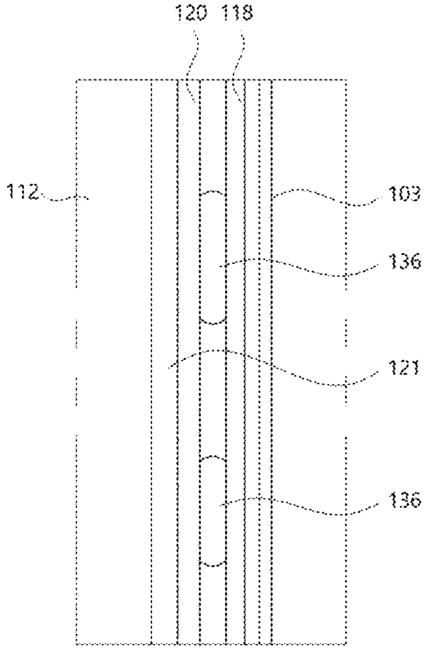

【FIG. 7】
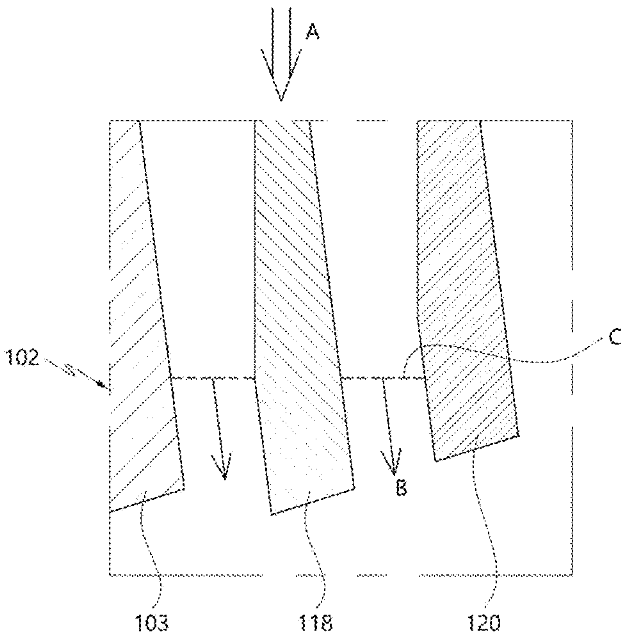
【FIG. 8】
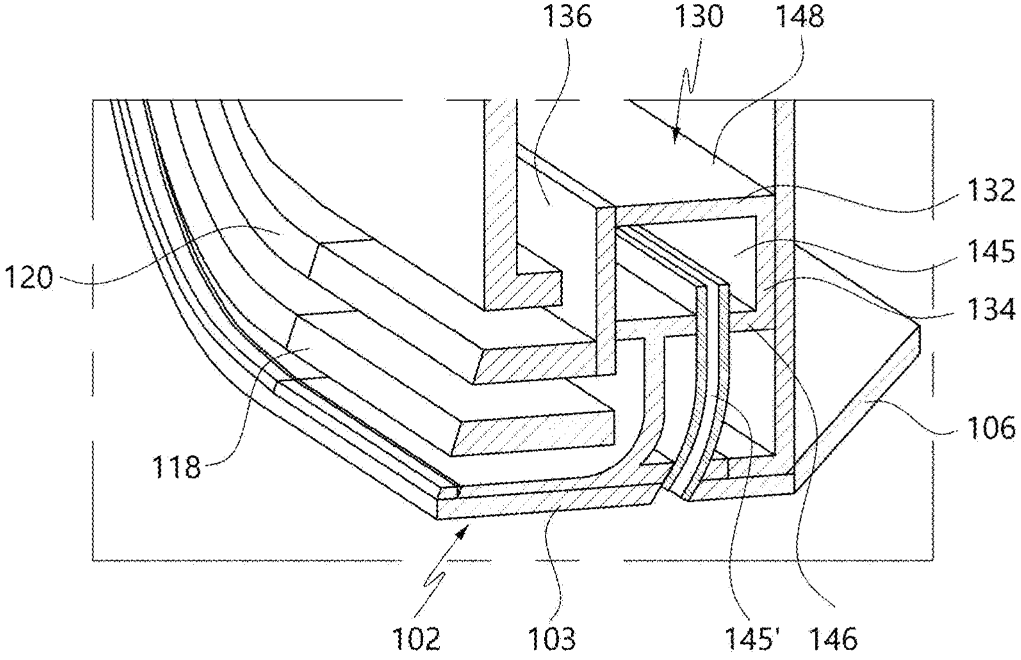

【FIG. 9】
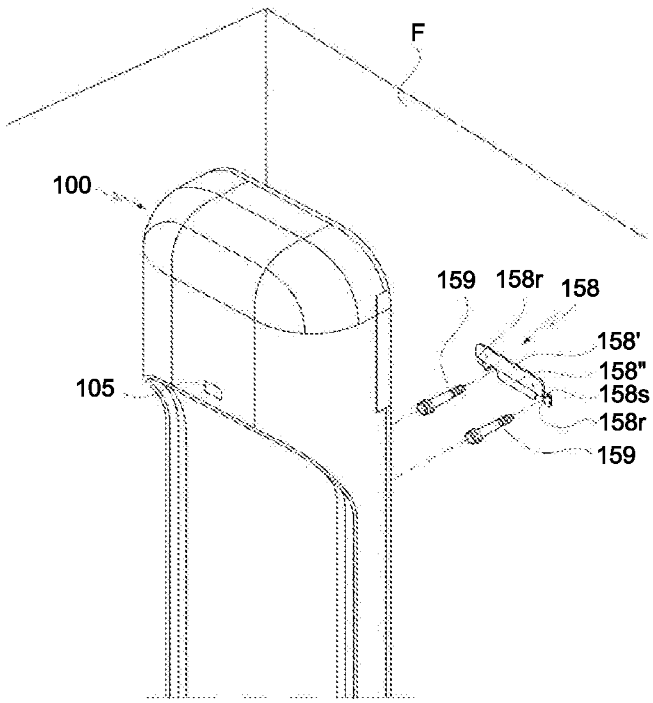
【FIG. 10】
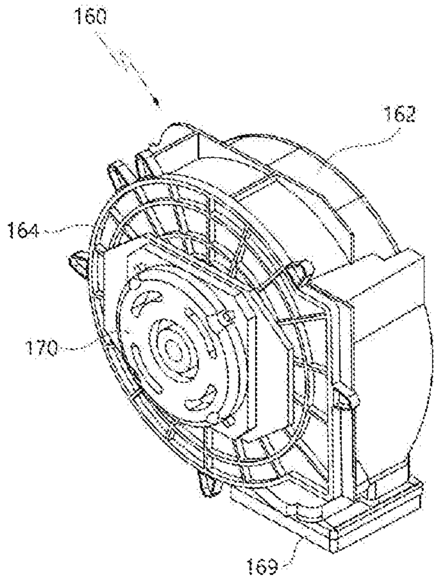

【FIG. 11】
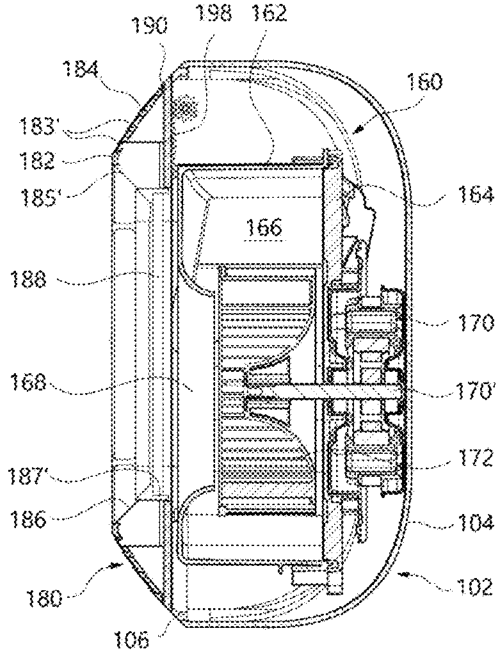
【FIG. 12】
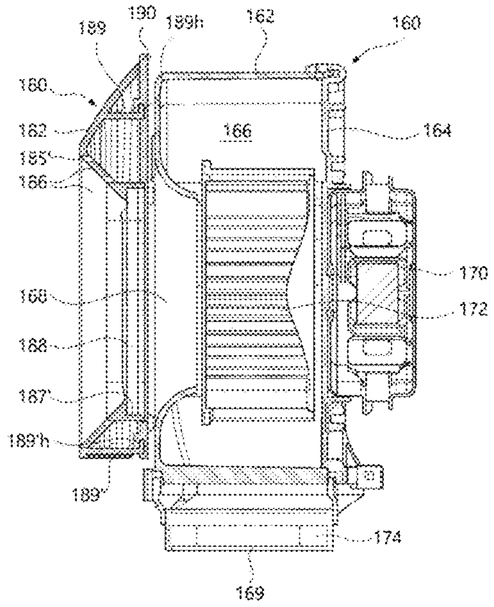

【FIG. 13】
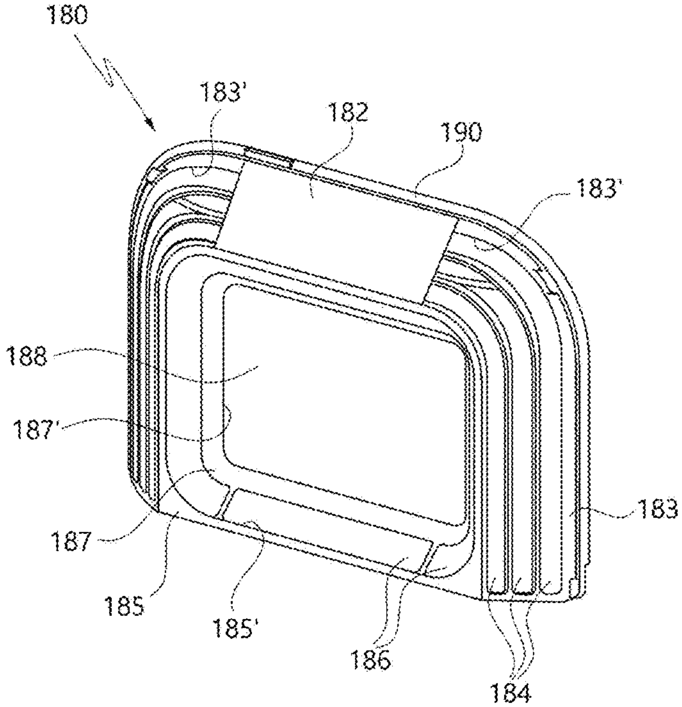
【FIG. 14】
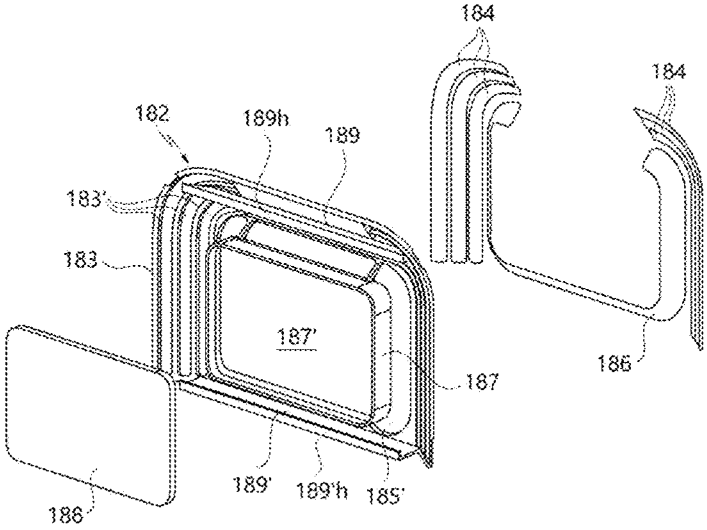

【FIG. 15】
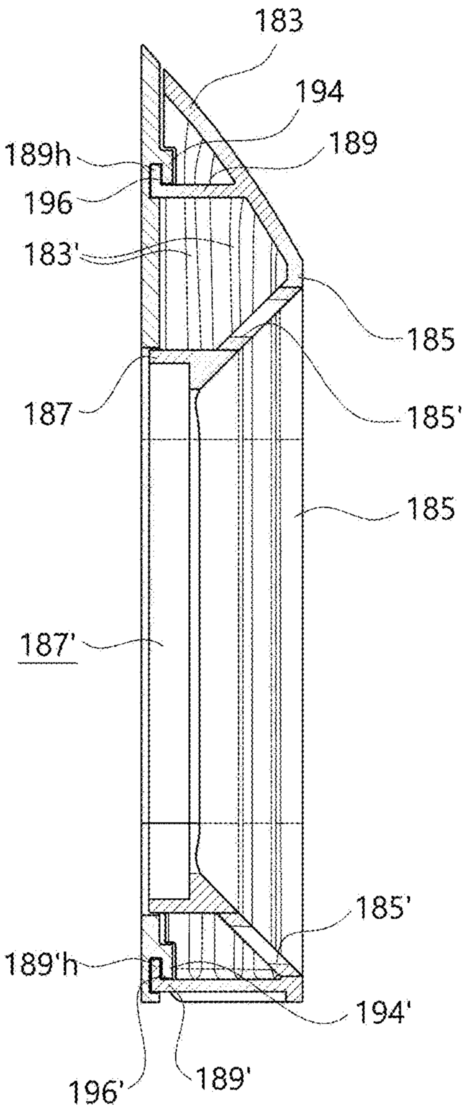

【FIG. 16】
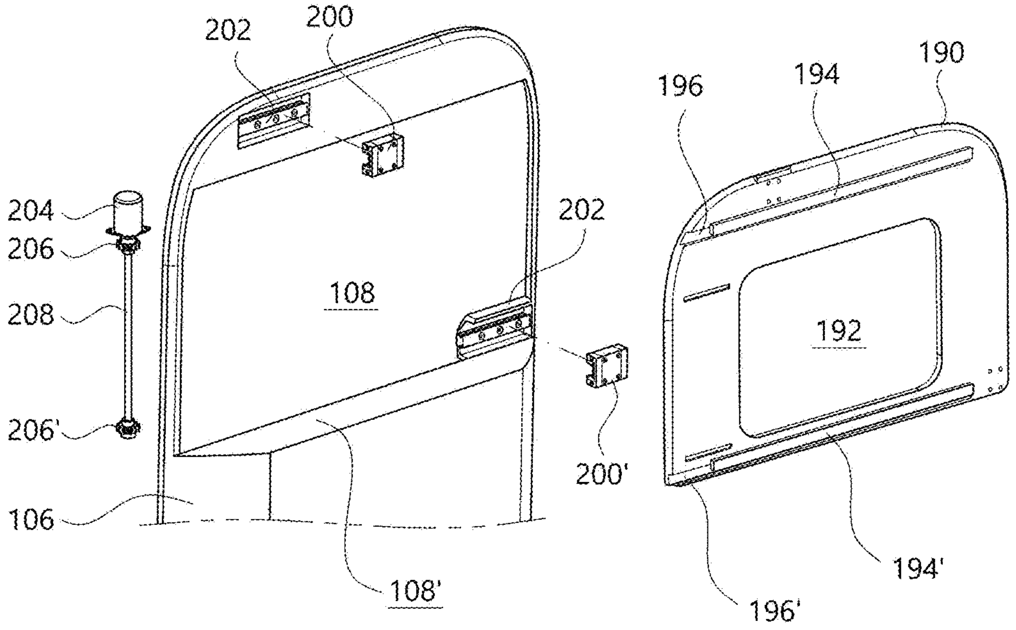
【FIG. 17】
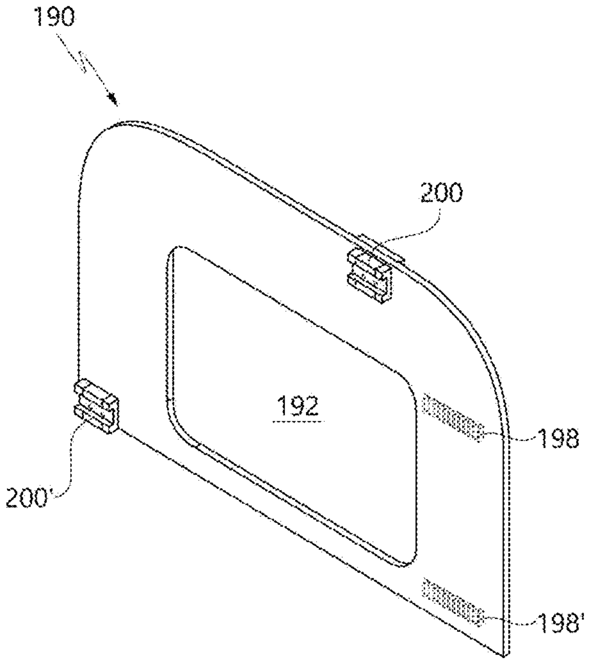

【FIG. 18】
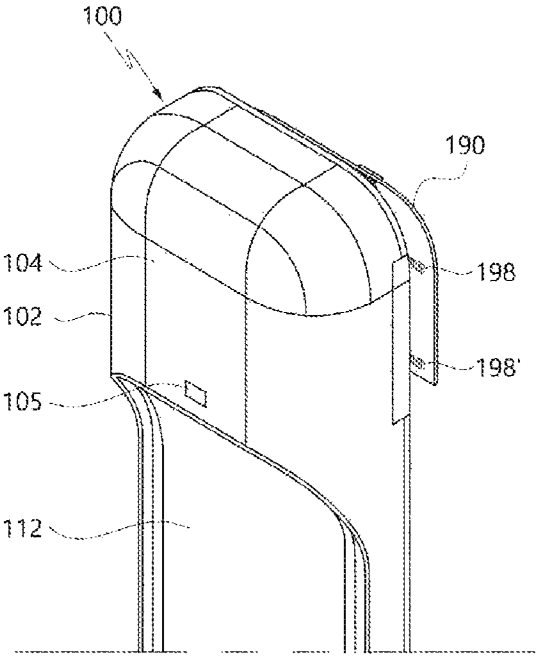
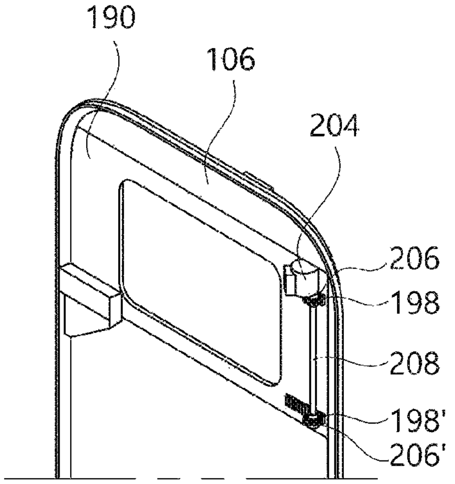
[FIG.19 (a)]
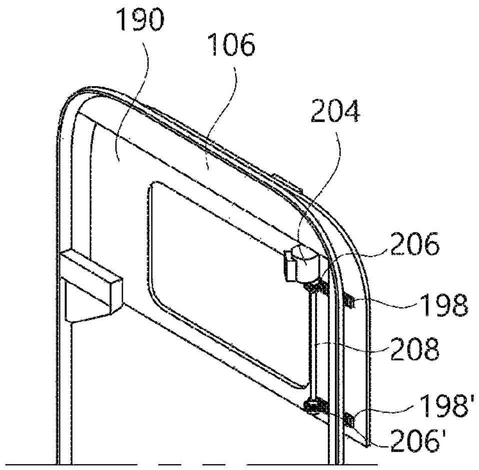
[FIG.19 (b)]

【FIG. 20】
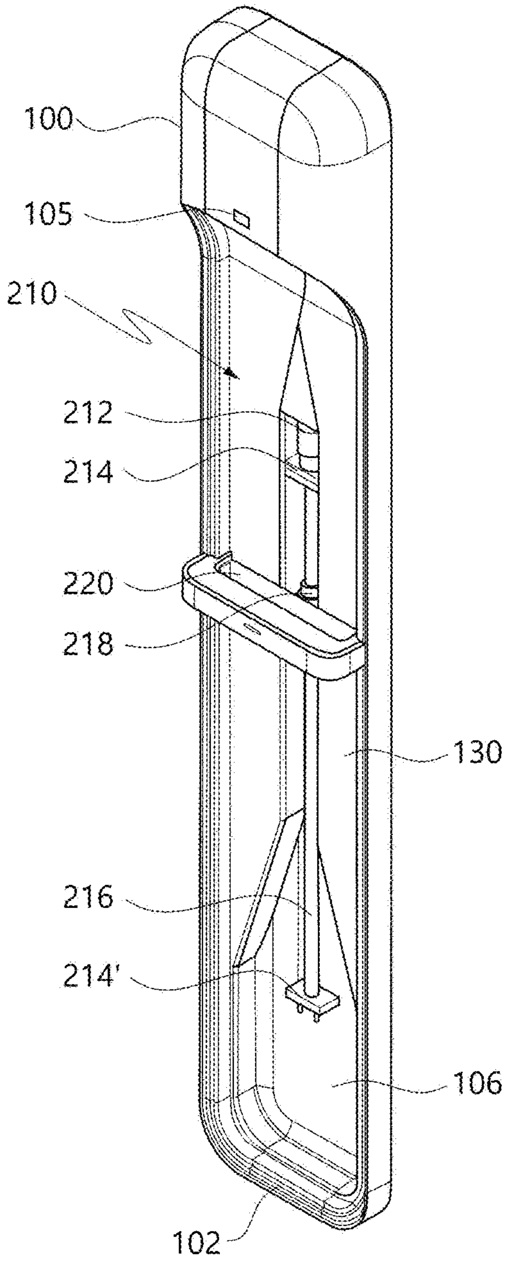

【FIG. 21】
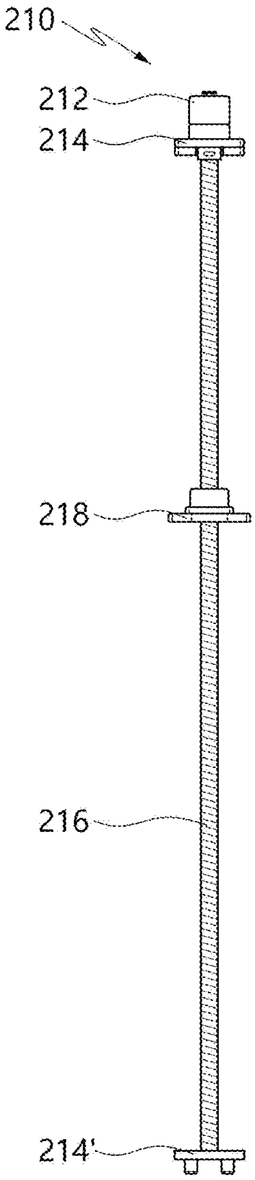

【FIG. 22】
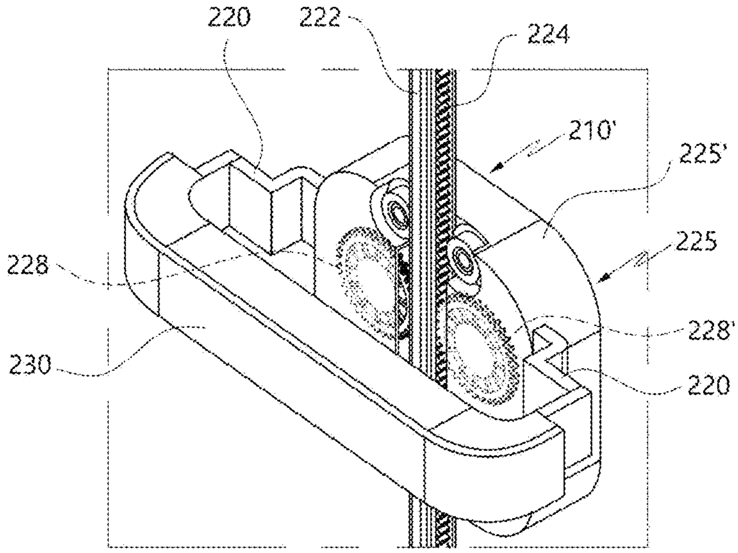
【FIG. 23】
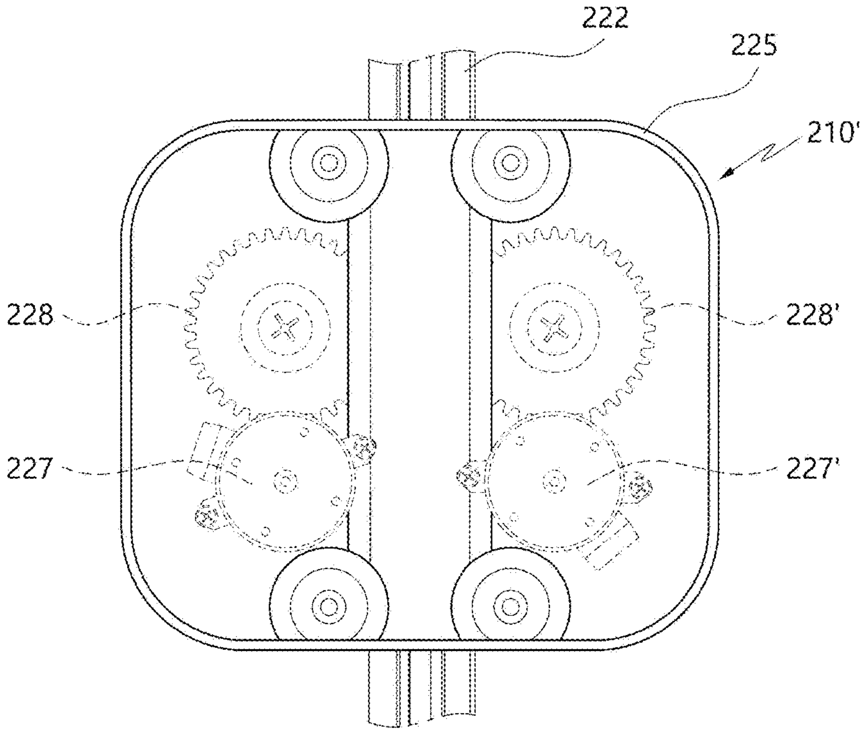

【FIG. 24】
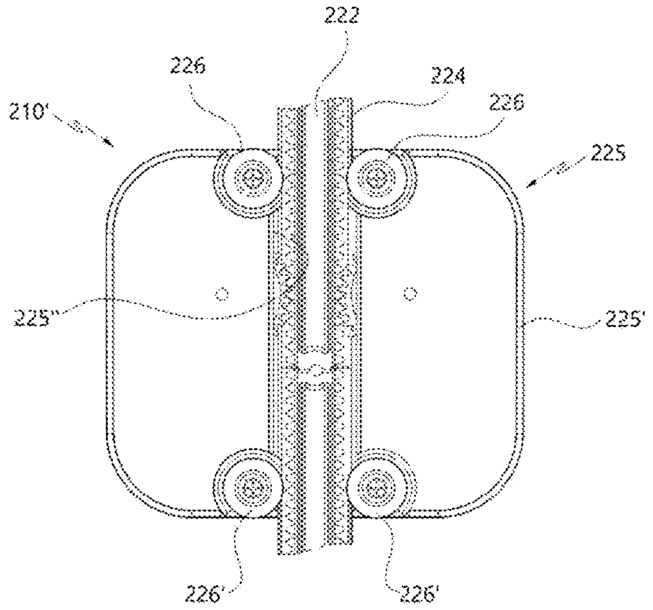
【FIG. 25】
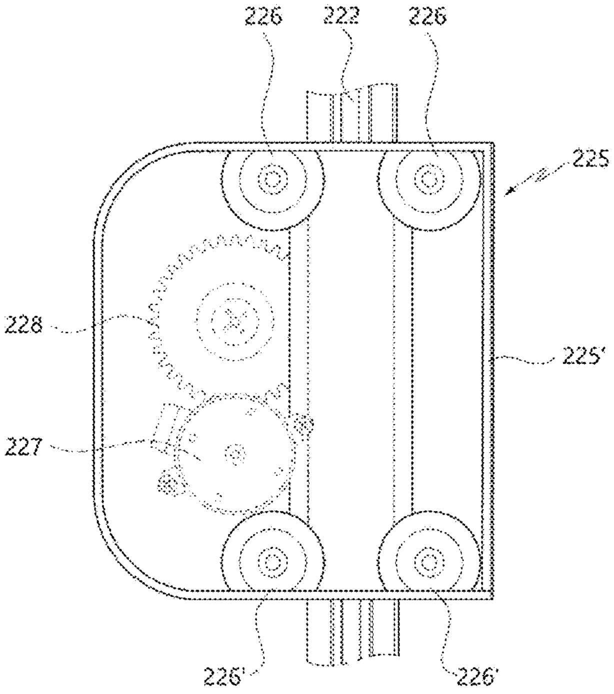

【FIG. 26】
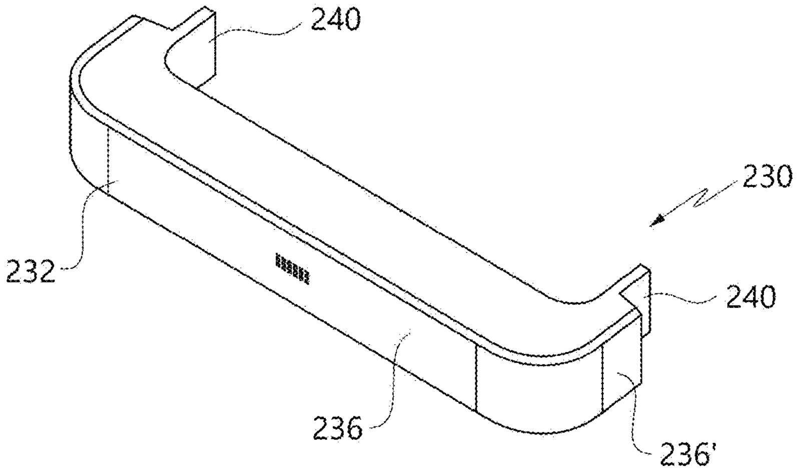
【FIG. 27】
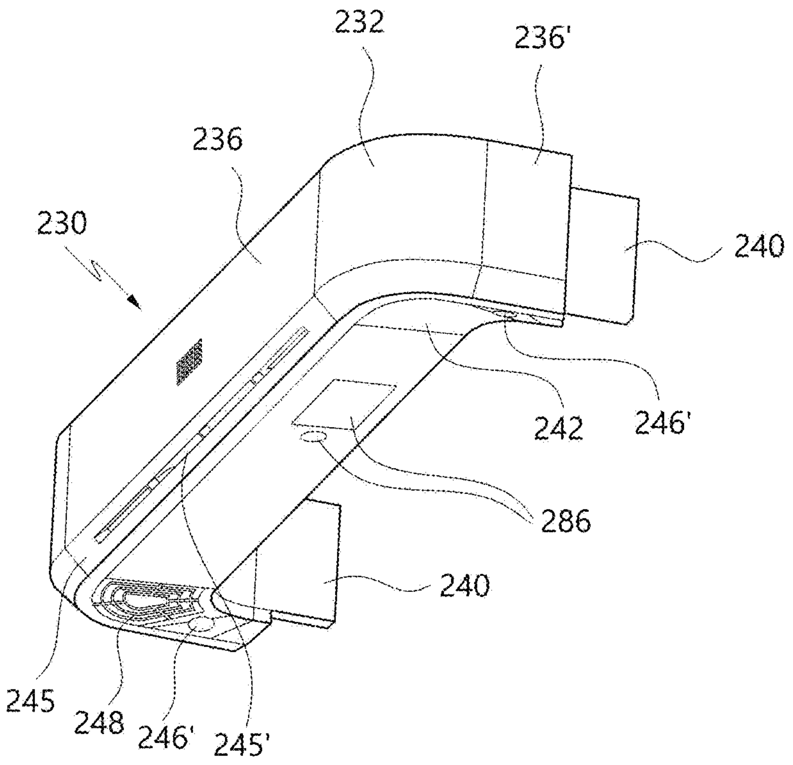

【FIG. 28】
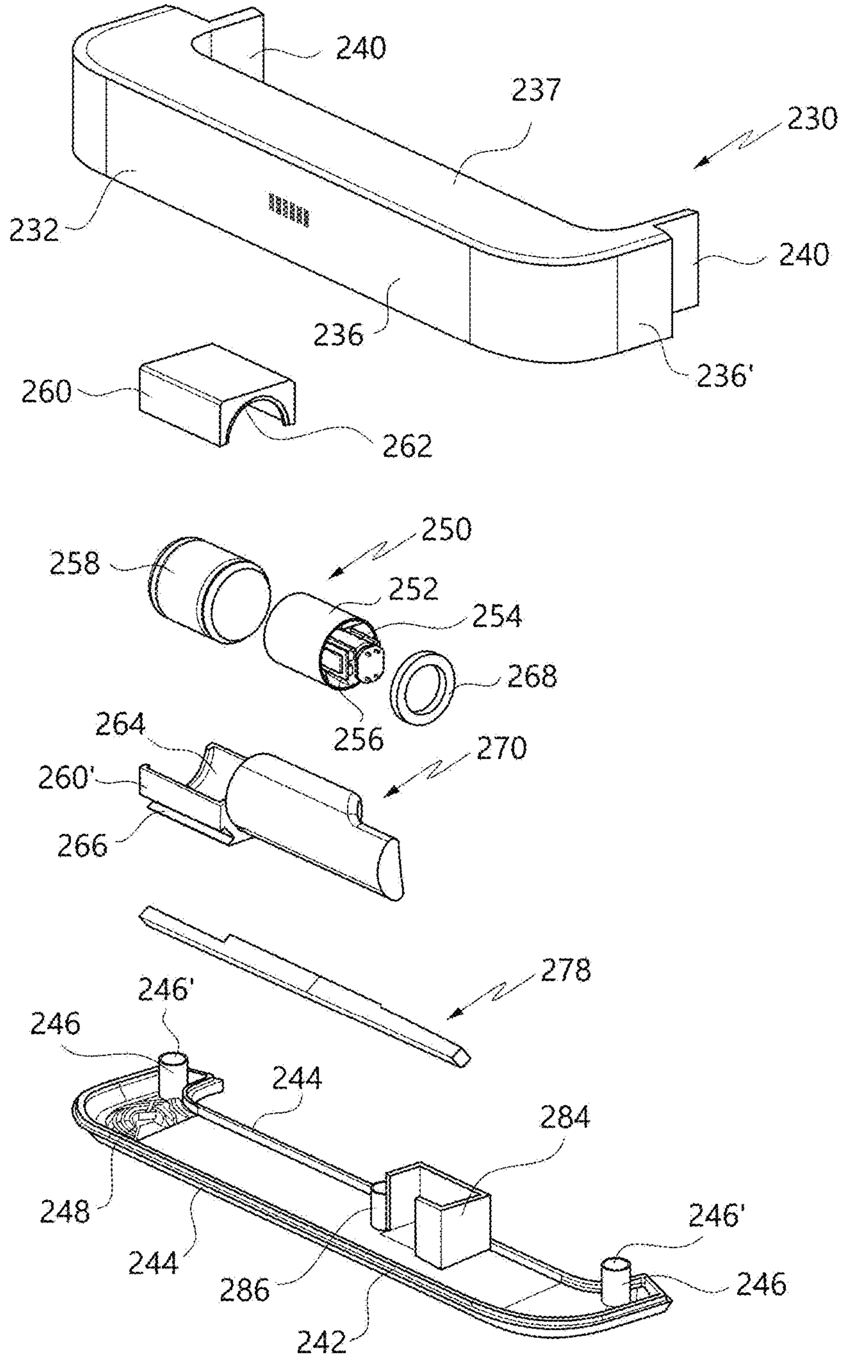

【FIG. 29】
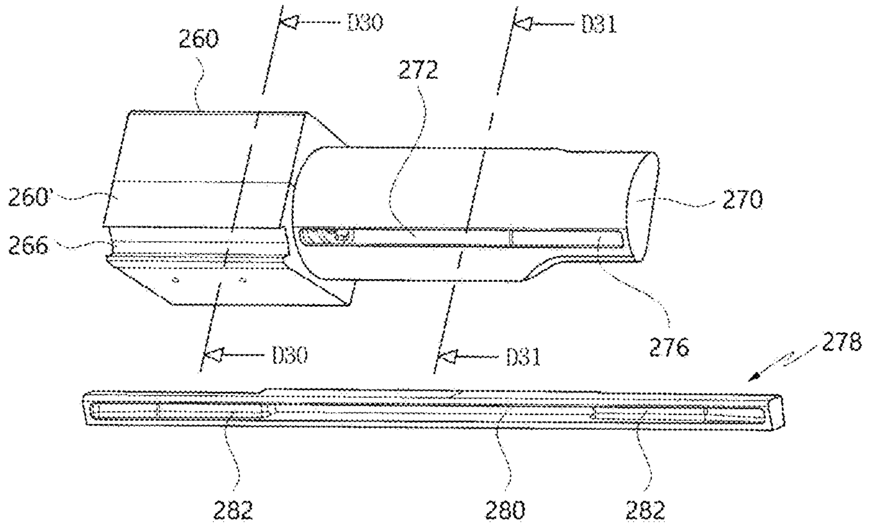
【FIG. 30】
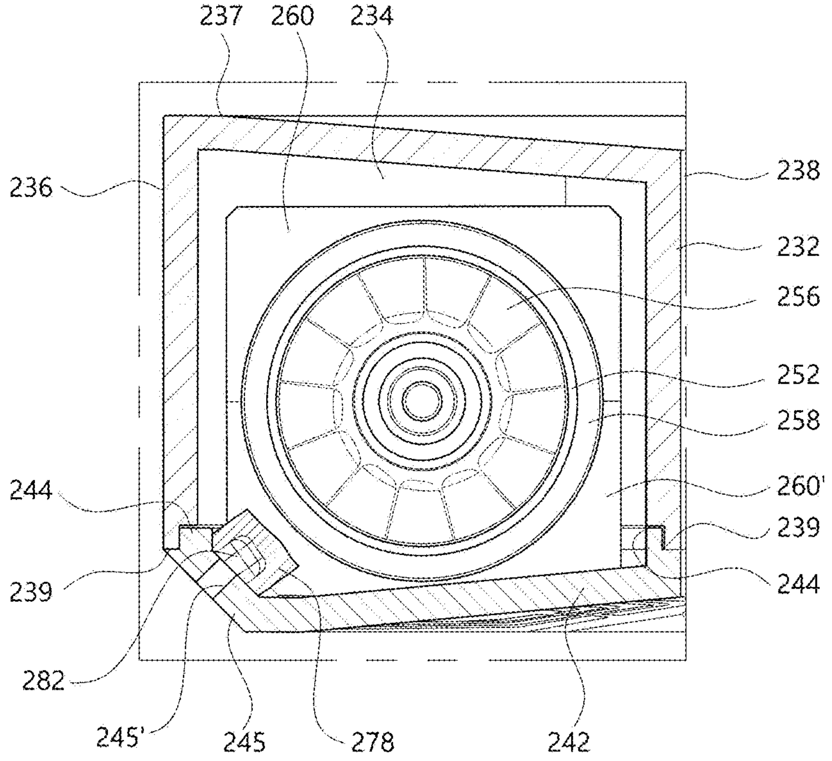

【FIG. 31】
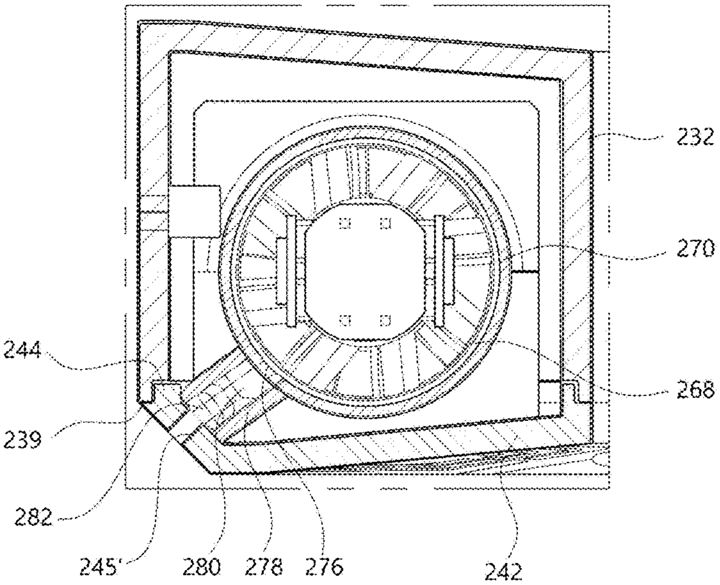
【FIG. 32】
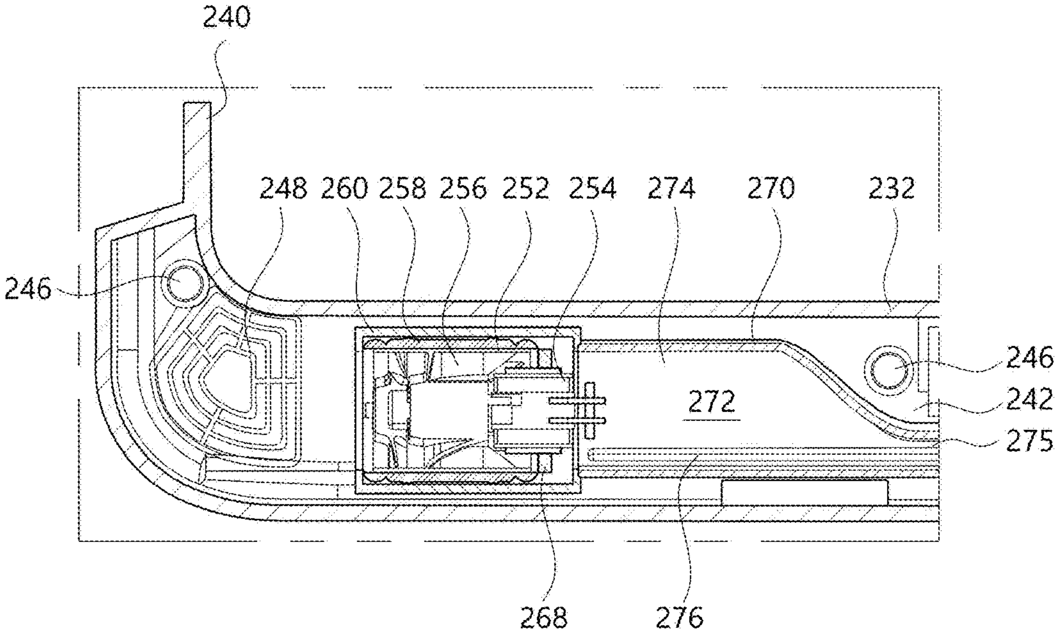

【FIG. 33】
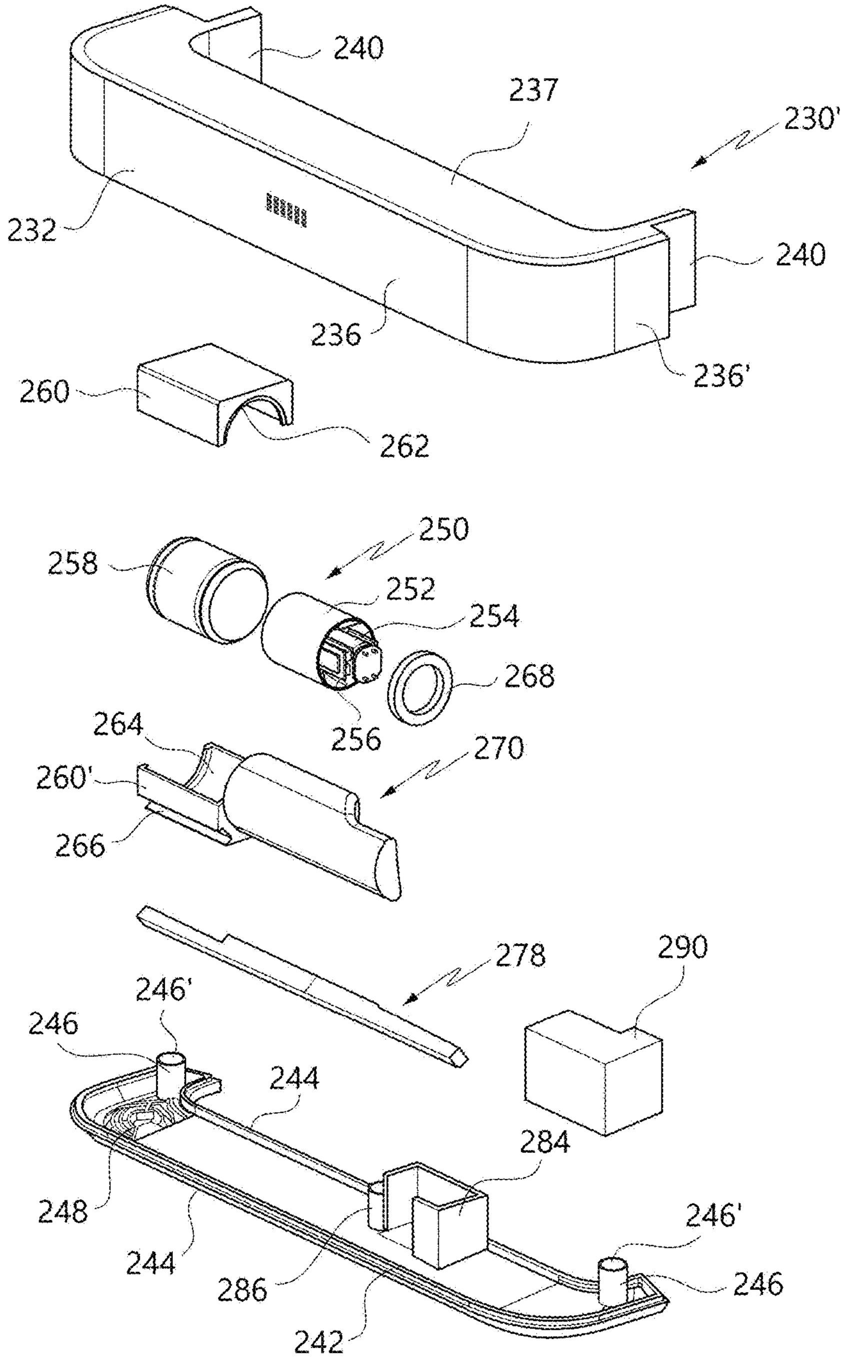

【FIG. 34】
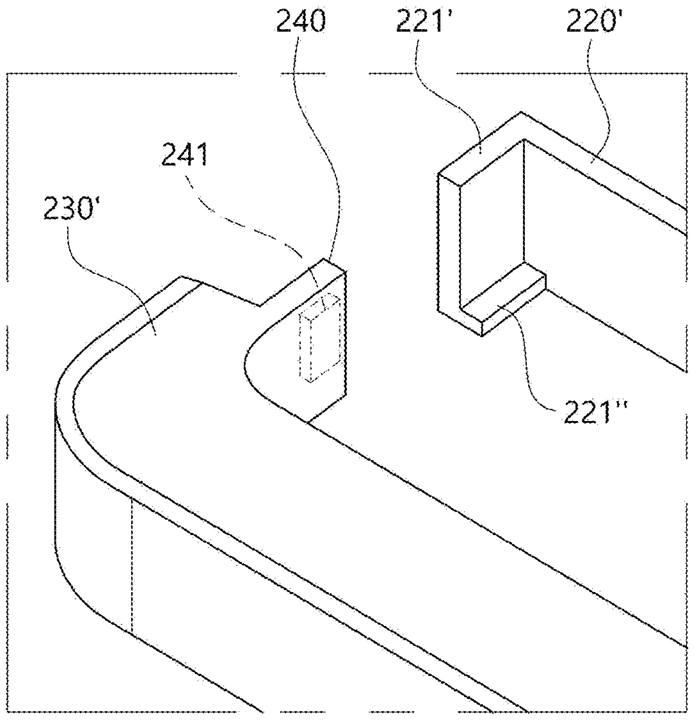

【FIG. 35】
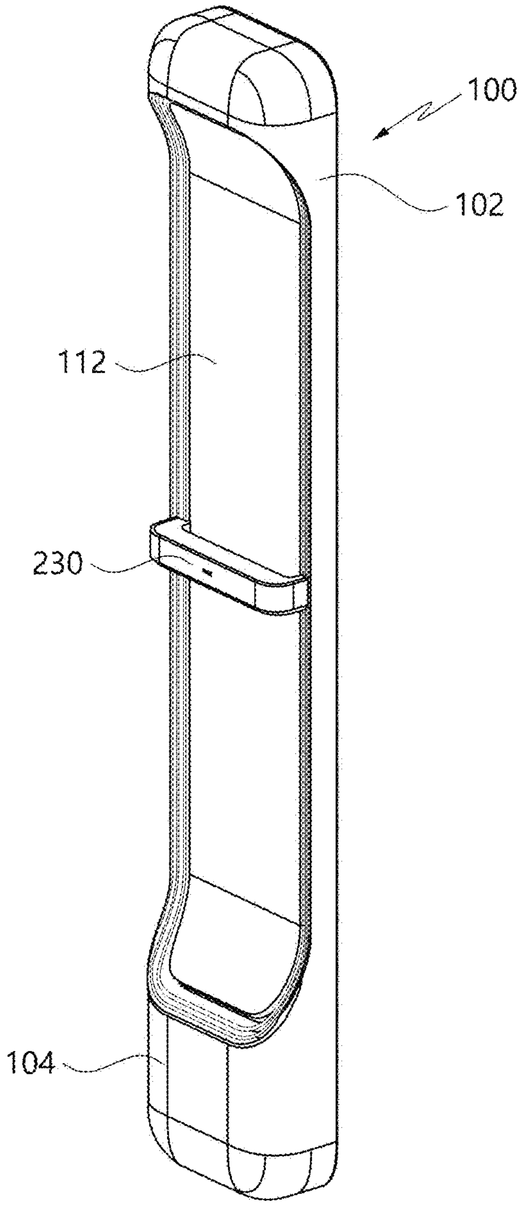

【FIG. 36】
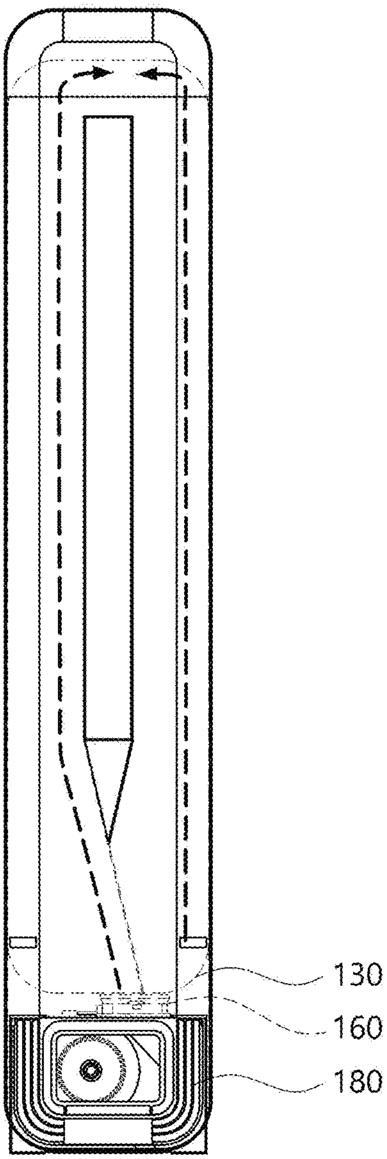

【FIG. 37】
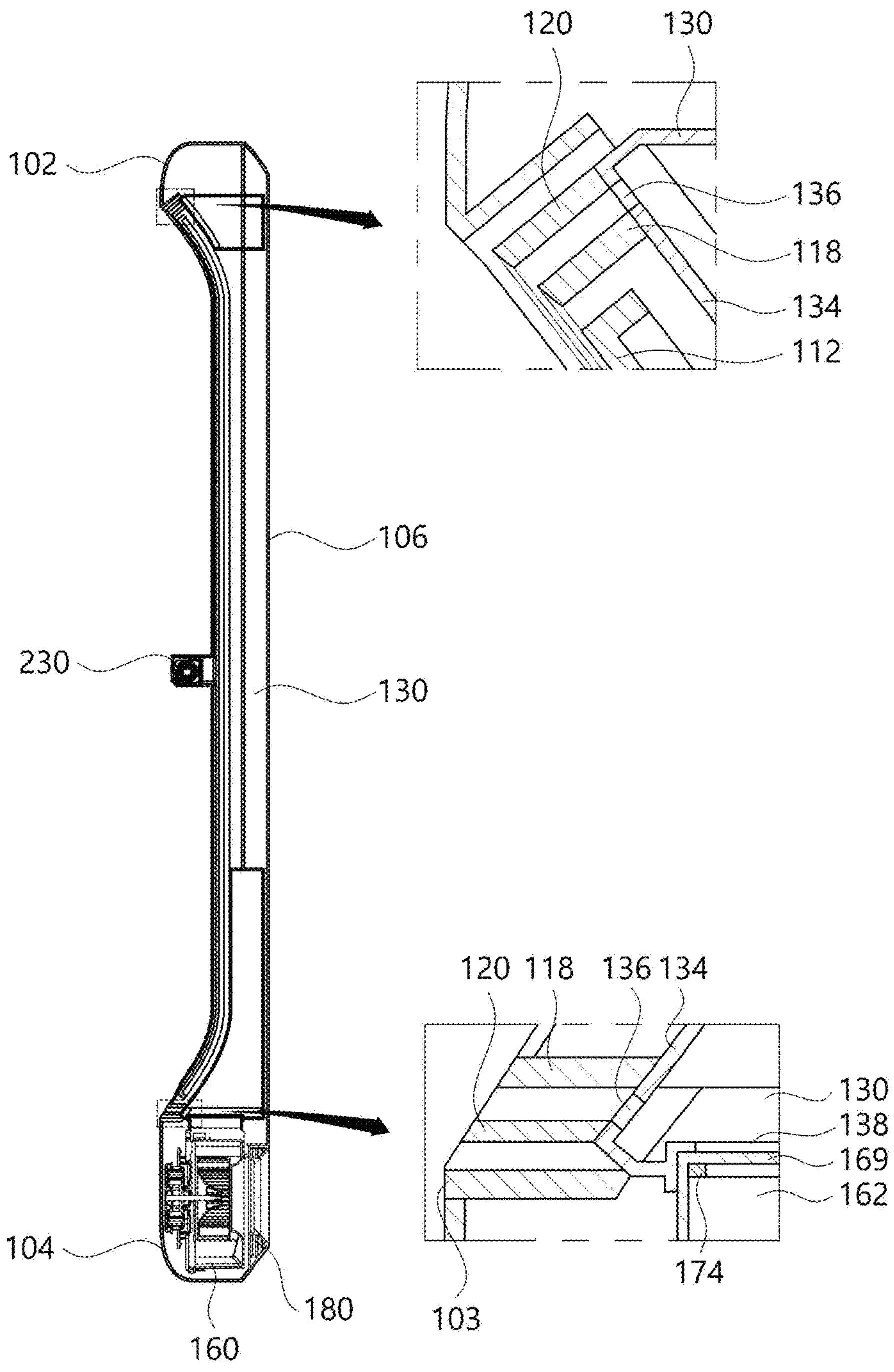

【FIG. 38】
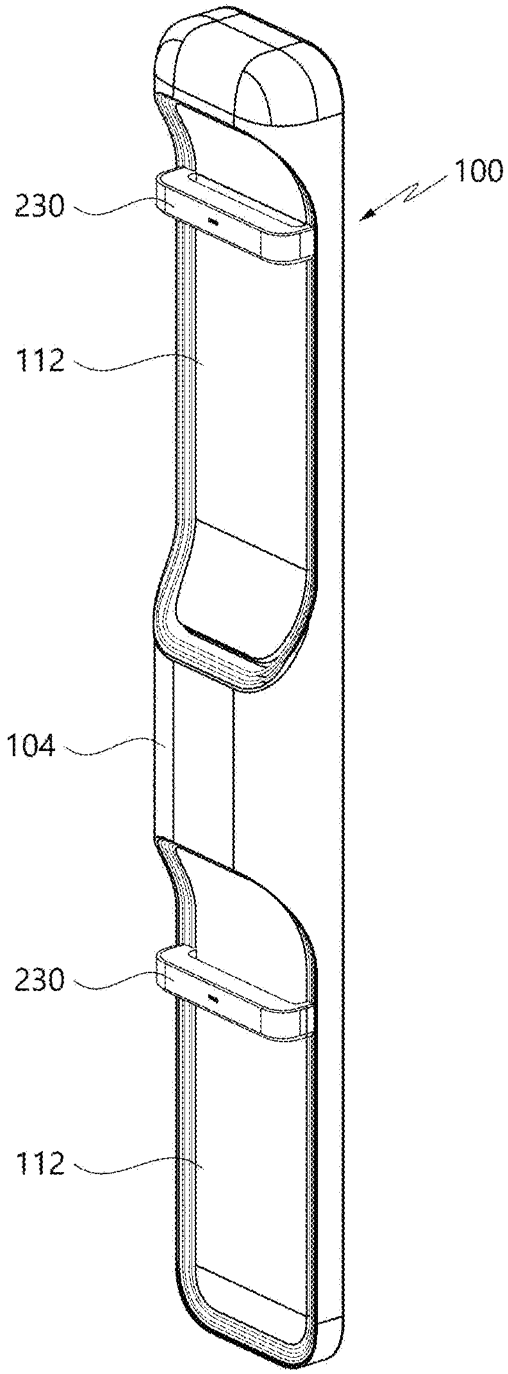

【FIG. 39】
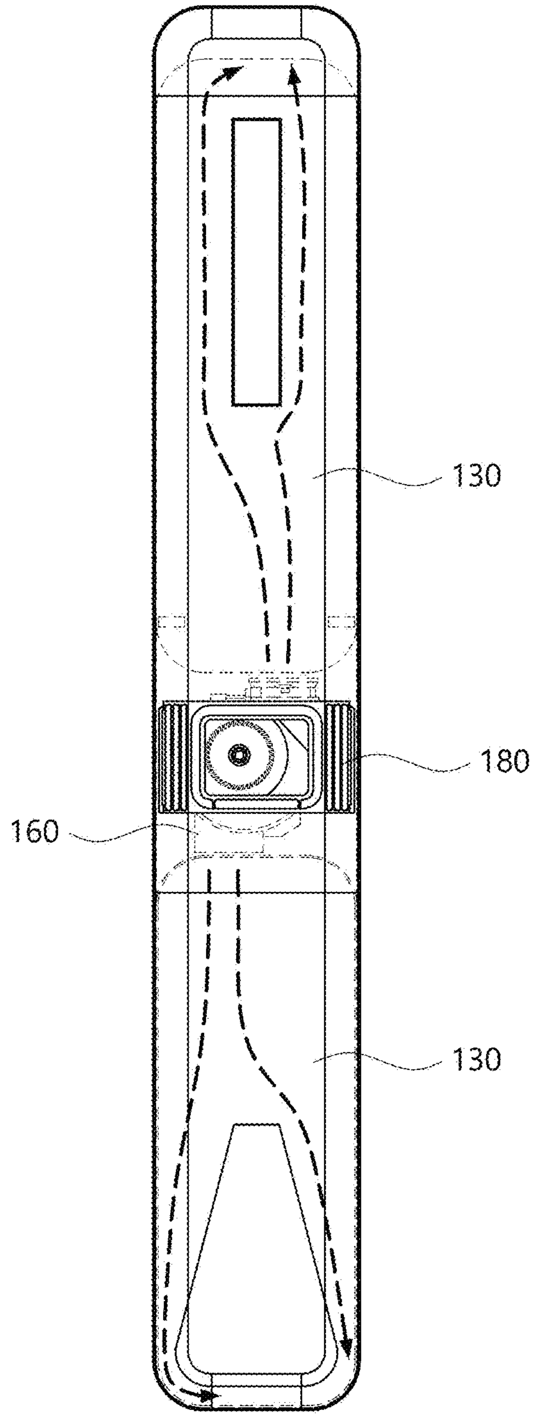

【FIG. 40】
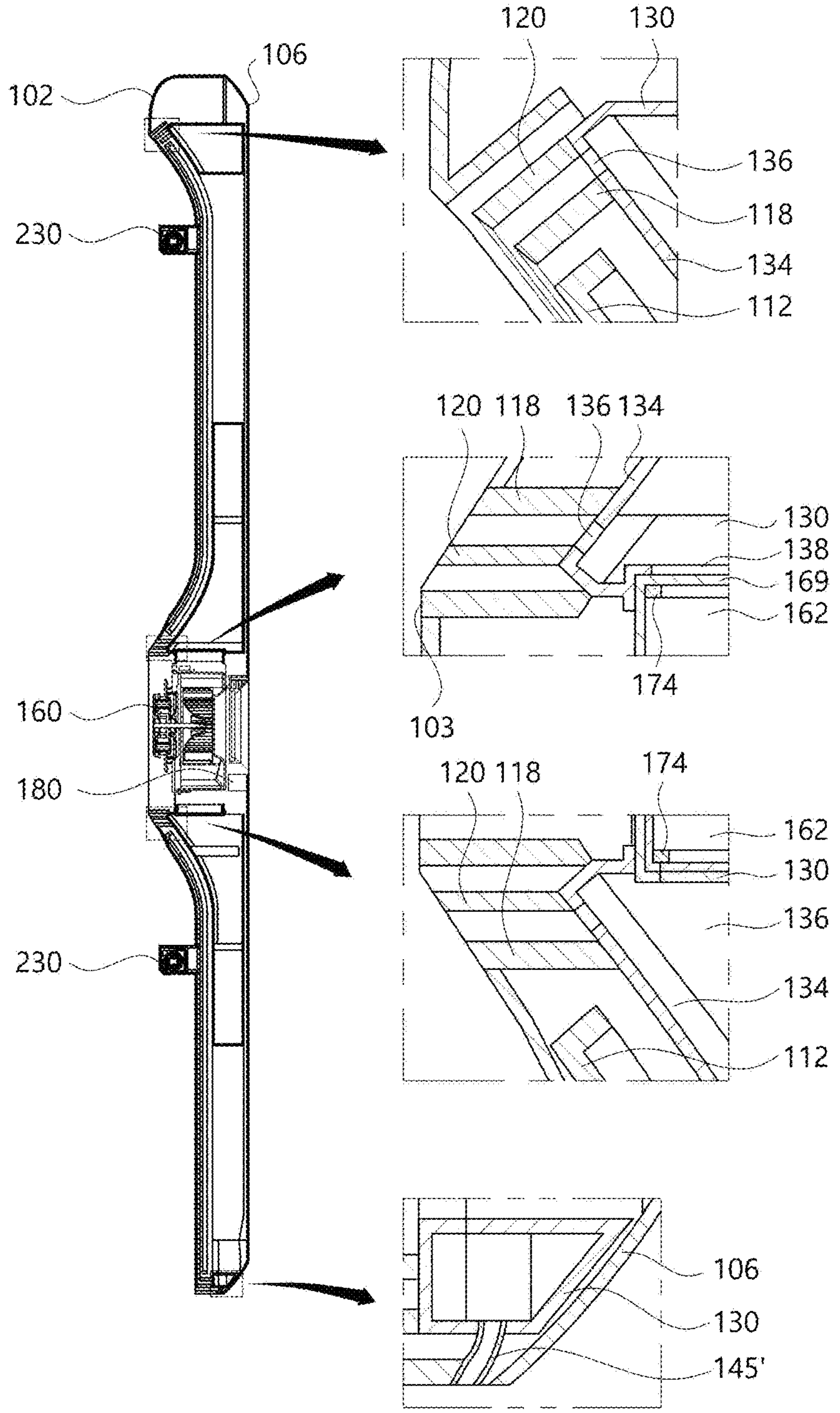

【FIG. 41】
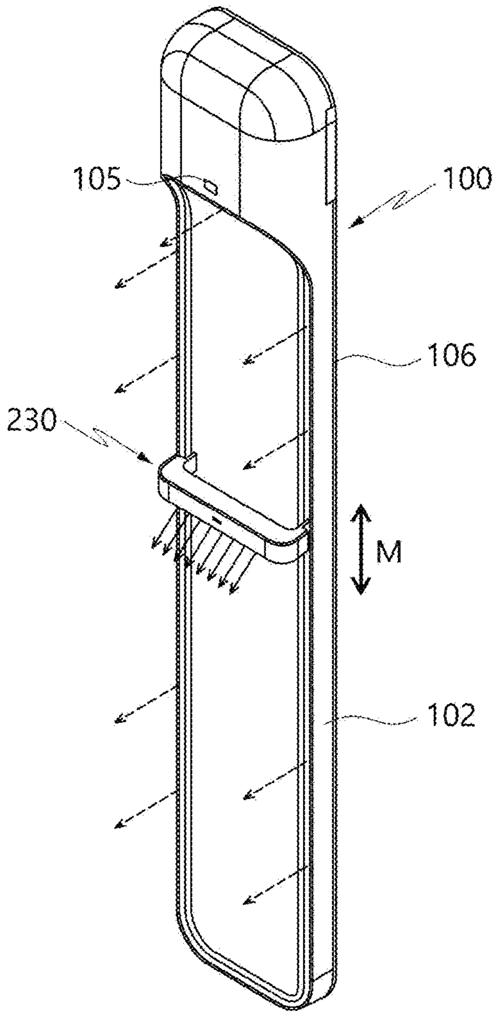

【FIG. 42】
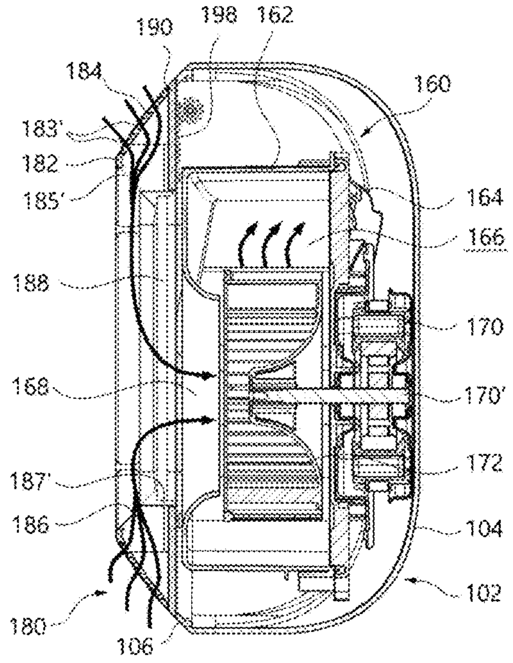
【FIG. 43】
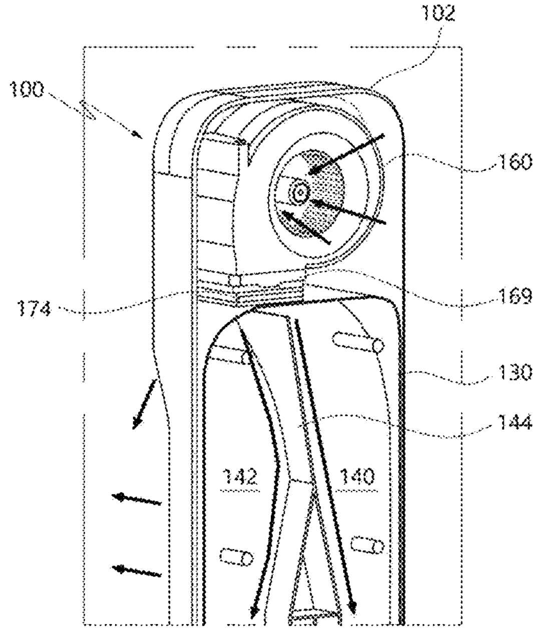

【FIG. 44】
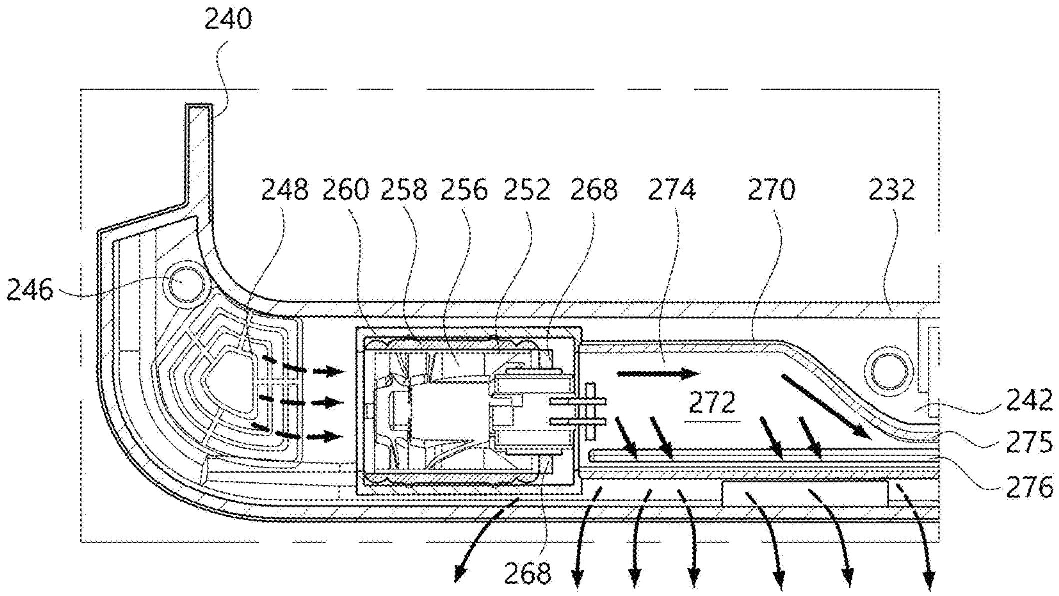
【FIG. 45】
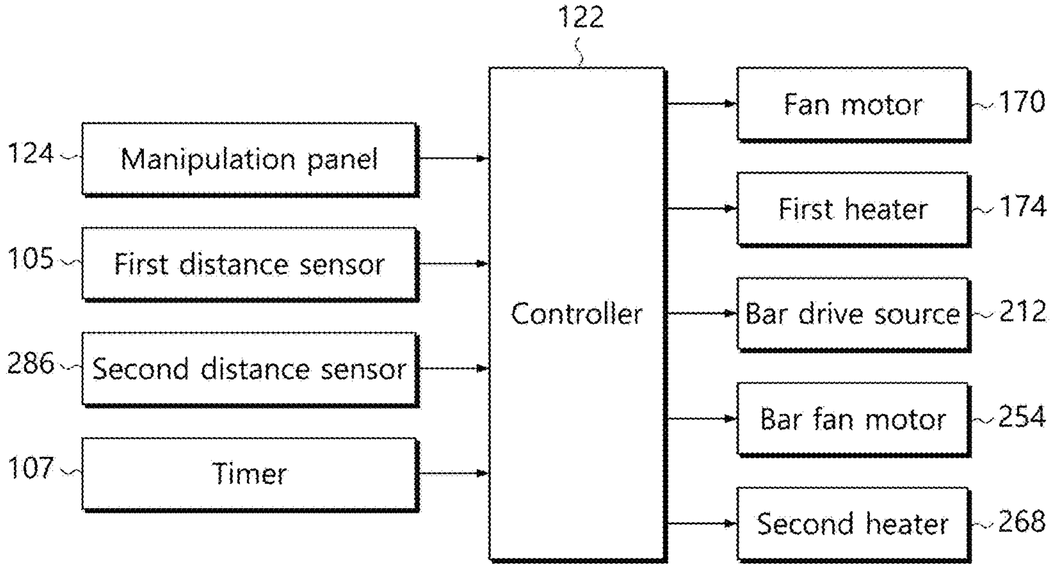

【FIG. 46】
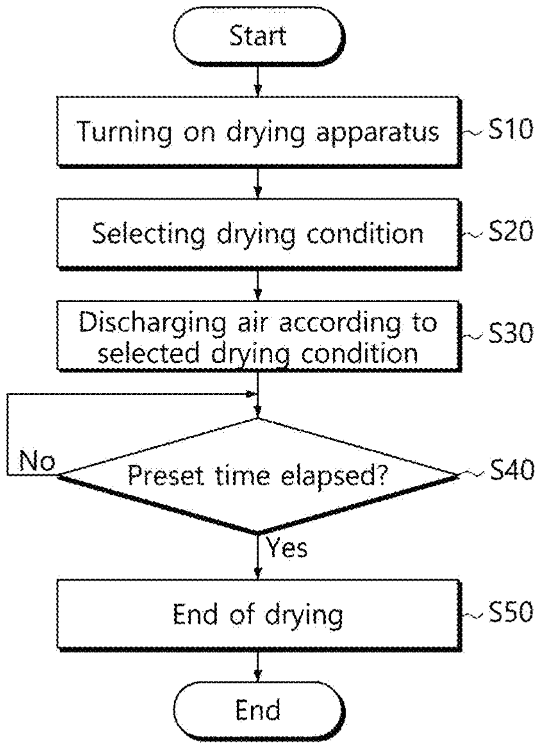

【FIG. 47】
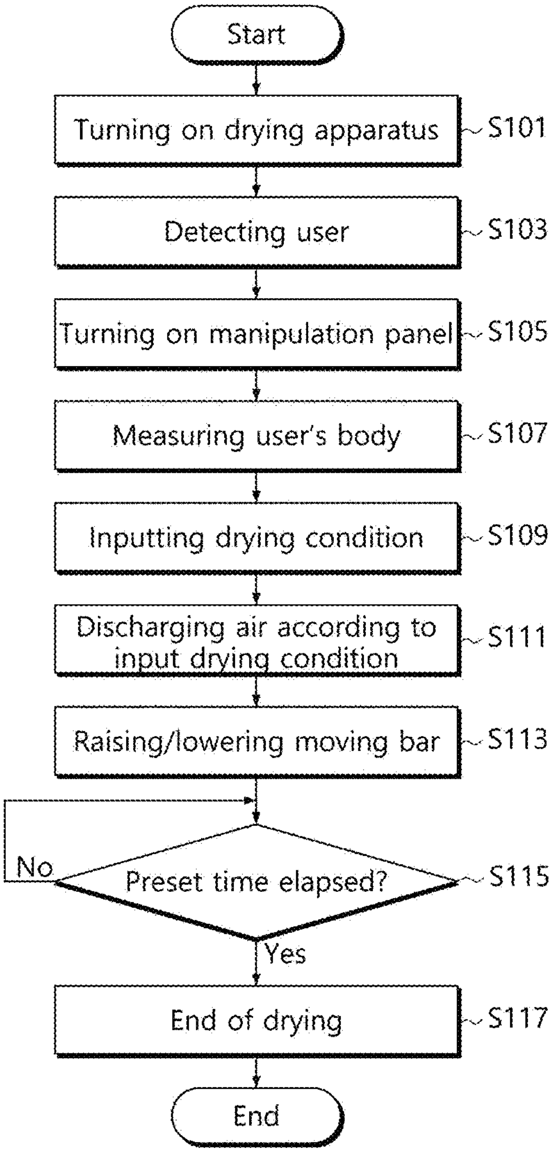

【FIG. 48】
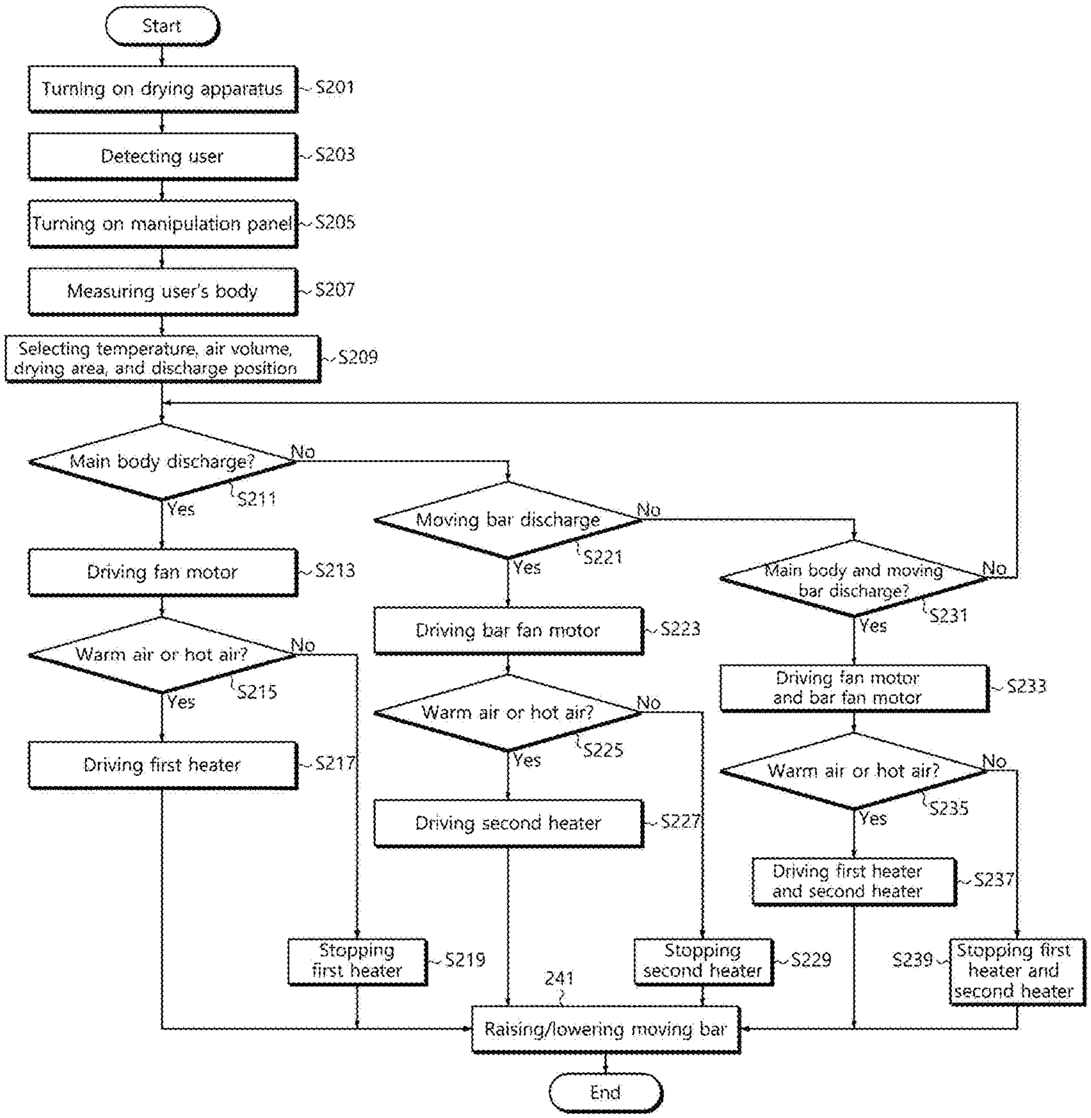

【FIG. 49】
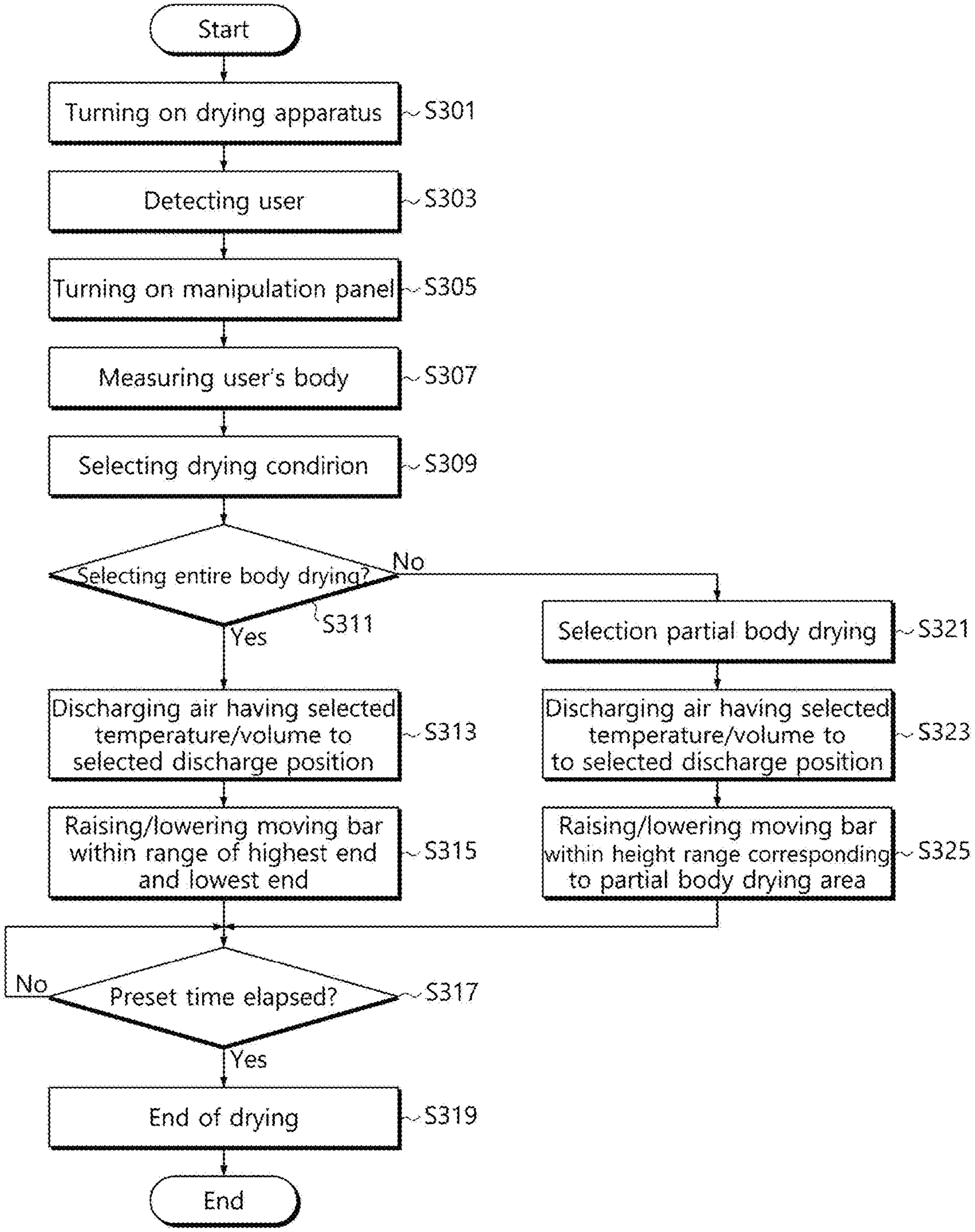

【FIG. 50】
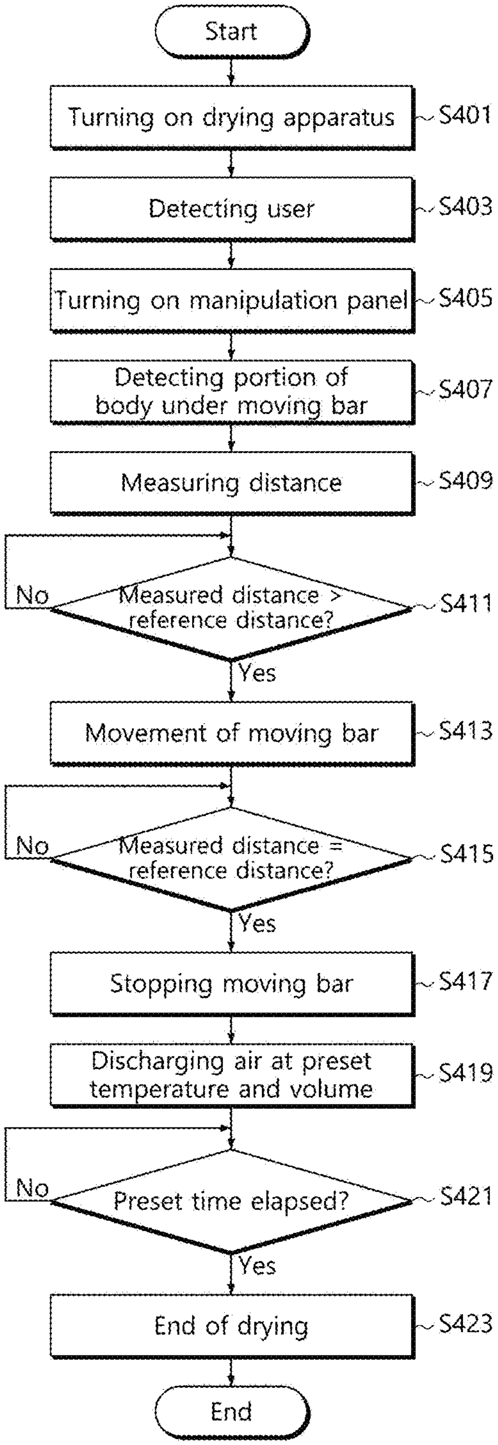

【FIG. 51】
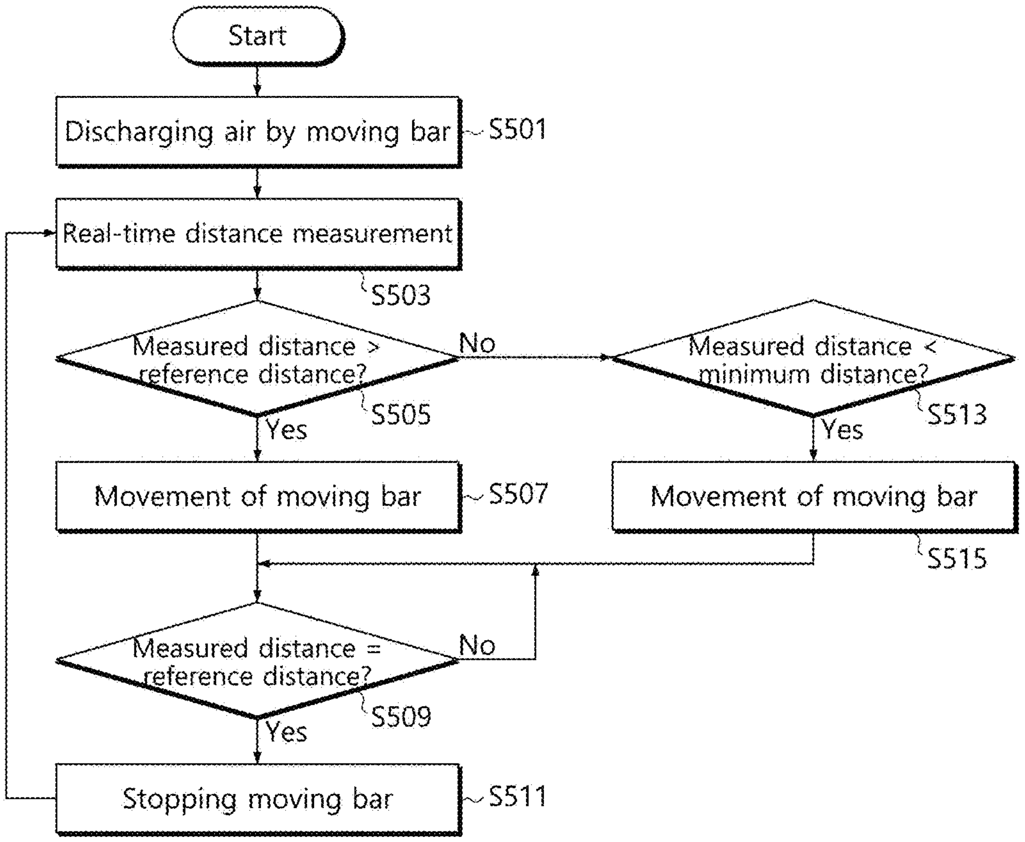

【FIG. 52】
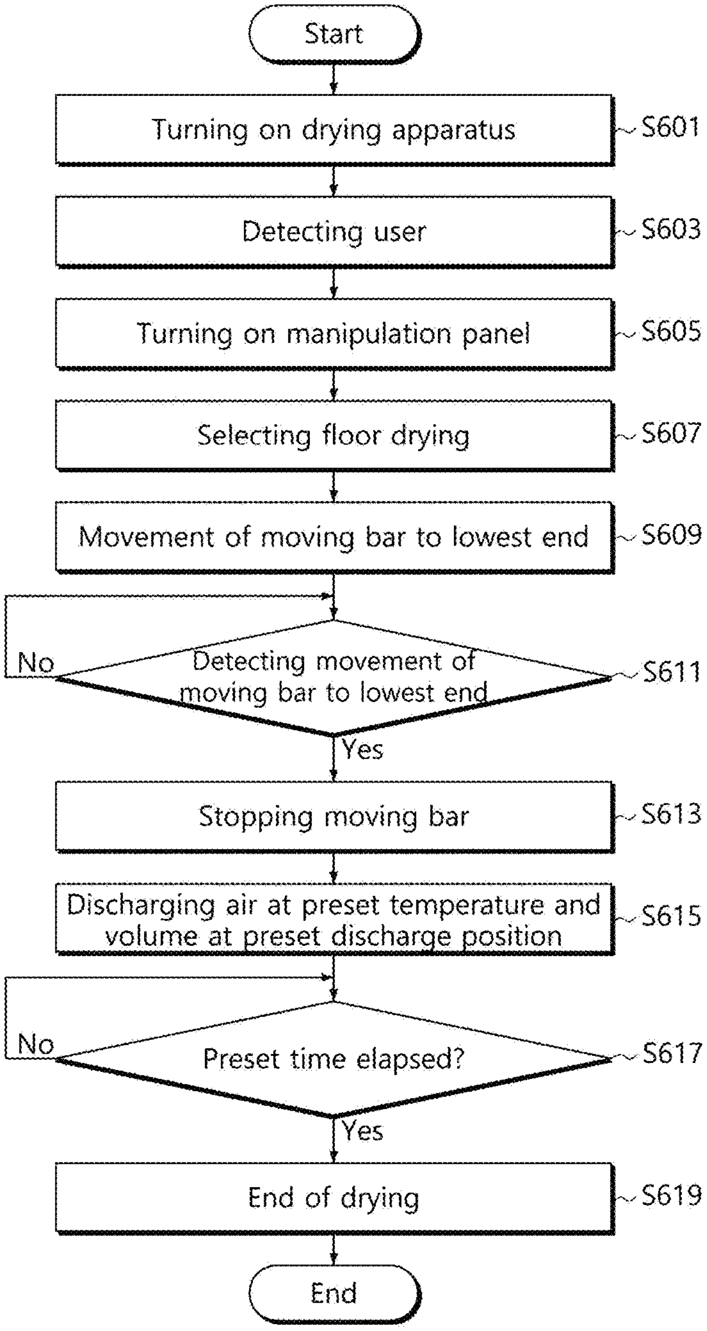

【FIG. 53】
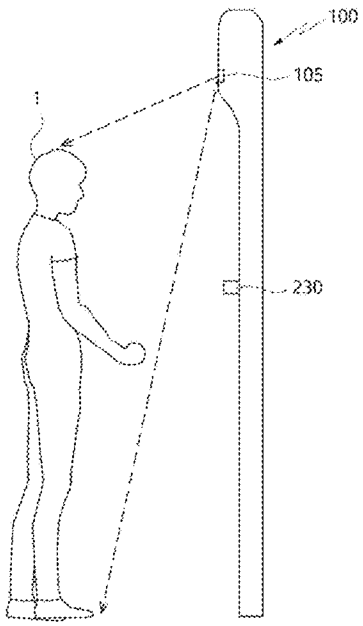
【FIG. 54】
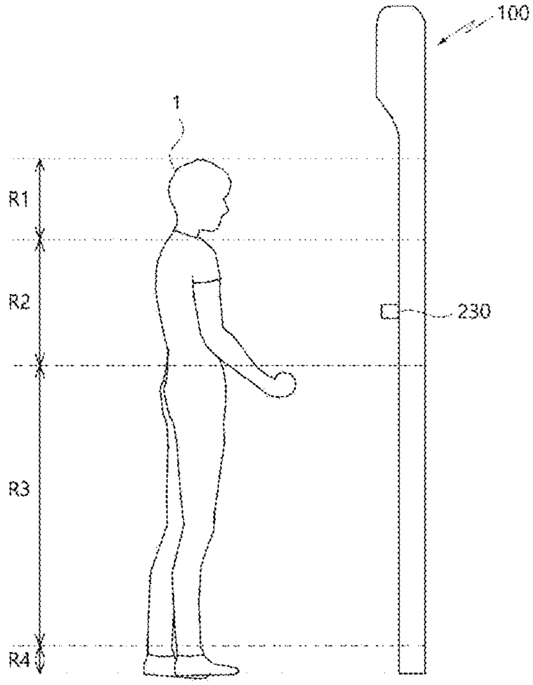

【FIG. 55】
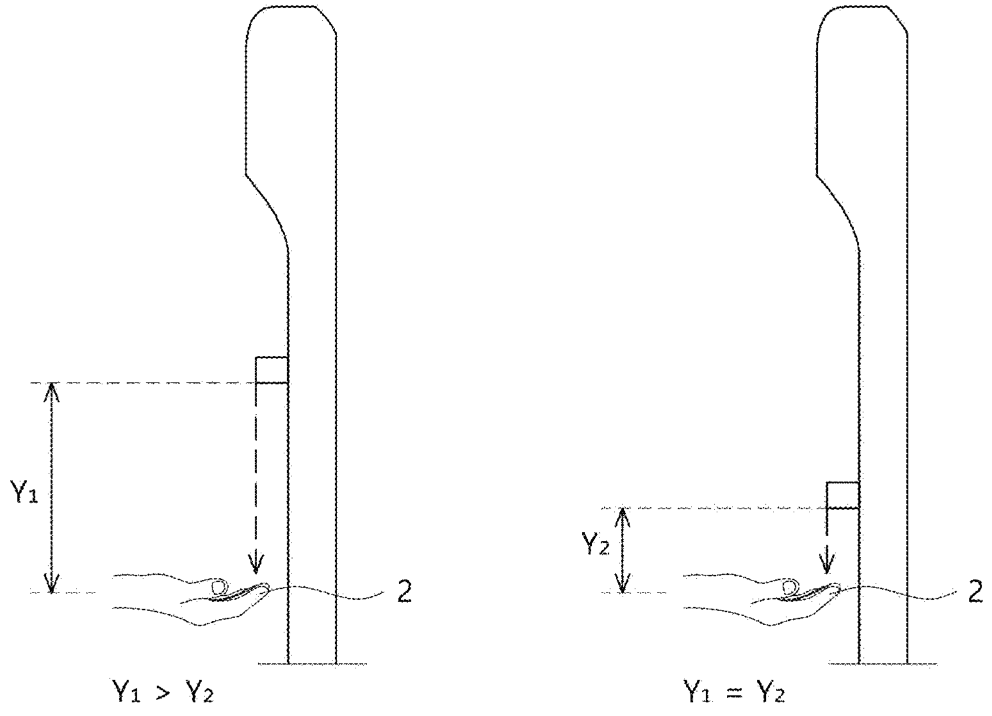

DRYING APPARATUS

CROSS REFERENCE TO RELATED APPLICATION

The present application claims priority to Korean Patent Application No. 10-2020-0110383, filed Aug. 31, 2020, the entire contents of which is incorporated herein for all purposes by this reference.

BACKGROUND

Field of the Disclosure

The present disclosure relates to a drying apparatus.

Description of the Related Art

After bathing, showering, or sweating, moisture may stay on each part of a person's body. When this moisture is properly dried, a person can feel pleasant and it can prevent bacteria and fungi from inhabiting the body.

Generally, after bathing or showering, people use a towel to dry each part of the body. It is a good method to wipe away moisture on the body, but there is inconvenience in that to reuse the towel after the use thereof, the towel is required to be dried by air, or dried after the towel is washed. In hotels or fitness clubs, towels used once are required to be washed before being provided to users, so there is a problem in that a lot of human and material resources and time are required for washing and drying of the towels.

Drying of the body by using a towel is often not done properly depending on a person's knowledge about the influence of unremoved moisture on the body, habits, and body shape. For example, parts between toes, armpits, and hair, etc., are required to be managed more carefully compared to other parts of the body, but there are many cases in which in the parts required to be managed carefully, moisture is insufficiently removed, or is left without being removed at all. In this case, bacteria or fungi may occur in the area where the moisture is not properly removed, or the area may become a better environment in which the existing bacteria or fungi may inhabit.

In order to solve such problems, a body dryer is disclosed in Korean Patent No. 10-0948030 (Patent Document 1), and a human body drying equipment is disclosed in Korean Patent No. 10-1749344 (Patent Document 2). When a user is on a foot rest, these body dryers are designed to remove moisture on the user's feet or lower body by supplying air theretoward to dry the user's feet or lower body without using a towel. However, the body dryers disclosed in the patent document 1 and patent document 2 cannot perform the drying of the entirety of a user's body.

To solve this problem, Korean Utility Model Registration No. 20-0328270 (Patent Document 3) is proposed. A body dryer disclosed therein includes a space in which the entirety of a user's body is received, and performs drying by discharging high temperature air to the entire portion of the body. However, the body dryer supplies a forced air flow regardless of the characteristic of a user's body, which deteriorates drying efficiency.

In addition, a dry booth for a bathroom is disclosed in Korean Patent Application Publication No. 10-2018-0033637 (Patent Document 4), and is installed in the bathroom and used for drying after showering. Here, the inside of the dry booth is separated from the outside thereof by a frame, and a user enters the dry booth through a door for drying themselves. However, the dry booth of patent document 4 occupies too much space in the bathroom.

In addition, stand-type body drying equipment is disclosed in Korean Patent Application Publication No. 10-2009-0109634 (Patent Document 5), and is installed on the floor of a bathroom, where air is supplied to a head portion of a user downward from a position above the user and then is supplied to each portion of the user's body through a different path to perform drying. However, in patent document 5, the stand-type body drying equipment is installed by standing on the floor of a bathroom, and thus occupies much floor space of the bathroom. Further, air is supplied by using a plurality of fans, so the entire size of the drying equipment is increased.

A body dryer disclosed in Korean Patent Application Publication No. 10-1996-0000145 (Patent Document 6) includes a foot rest part on which a user is located, and discharges air toward a user's body through a plurality of outlets, where a blowing means is located in each of the plurality of outlets to discharge the air, whereby the body dryer has a very complicated configuration therein, and is large in size as a whole.

Japanese Patent Application Publication No. Hei 07-008412 (Patent Document 7) discloses a warm air dryer which is moved upward and downward by a raising/lowering mechanism and removes moisture from a user's body. However, the warm air dryer supplies hot air to and dries the user's body while simply moving along the user's body, so a moisture removal effect is relatively decreased.

A warm air dryer disclosed in Japanese Patent Application Publication No. Hei 04-266732, which is patent document 8, is configured to be rotated by a rotation support means and supplies warm air toward a front thereof in which a user is located and toward a rear thereof in which a mirror is located. Accordingly, the warm air dryer is required to rotate in various directions and to move up and down, and thus has a relatively complicated configuration. Furthermore, the warm air dryer dries a user's body only by discharging warm air thereto, and thus has relatively deteriorated moisture removal efficiency.

Furthermore, Korean Patent Application No. 10-2003-0092382 (Patent Document 9) discloses a body dryer which discharges air through a nozzle part fastened to or formed integrally with the end part of a corrugated pipe that can be stretched in a longitudinal direction thereof. However, the body dryer disclosed in patent document 9 discharges air from an introduction fan through the corrugated pipe, and thus dries only a small area. Accordingly, it takes a lot of time to dry the body by using the body dryer. Furthermore, due to the use of the corrugated pipe, the body dryer can perform long-distance drying, but cannot effectively dry parts that are out of reach.

SUMMARY

The present disclosure is intended to propose a drying apparatus in which air is discharged to dry moisture on a user's body.

The present disclosure is intended to propose a drying apparatus in which moisture on a user's body is removed by complex air flows.

The present disclosure is intended to simplify and slim the configuration of a main body in the drying apparatus which removes moisture on the user's body by using complex air flows.

The present disclosure is intended to facilitate the flow of air in the drying apparatus which removes moisture on a user's body.

The present disclosure is intended to propose a drying apparatus removing moisture on a user's body in which air is discharged to various positions of a user's body.

The present disclosure is intended to propose a drying apparatus in which the flow of air introduced by a fan assembly is divided.

The present disclosure is intended to propose a drying apparatus in which the flow distance of air used for drying a user's body by flowing from the outside through the main body of the drying apparatus is short.

The present disclosure is intended to propose a drying apparatus in which the installation structure of the fan assembly allows the flow of air to be facilitated.

The present disclosure is intended to propose a drying apparatus in which air is efficiently discharged to the torso and lower part of a user's body.

The present disclosure is intended to propose a drying apparatus in which air is efficiently delivered to the upper and lower parts of the main body of the drying apparatus through a duct.

The present disclosure is intended to propose a drying apparatus which has a short flow distance and performs air purification by various ways.

The present disclosure is intended to propose a drying apparatus in which the filter assembly is configured to protrude from a side of the main body for the maintenance of the filter assembly.

The present disclosure is intended to propose a drying apparatus in which the movement of the filter assembly relative to the main body is facilitated.

The present disclosure is intended to propose a drying apparatus in which a drive assembly is provided for the movement of a moving bar.

The present disclosure is intended to propose a drying apparatus in which the installation of the drive assembly for the movement of the moving bar is optimized.

The present disclosure is intended to propose a drying apparatus in which the drive assembly for the movement of the moving bar is simplified.

The present disclosure is intended to propose a drying apparatus which is provided with the moving bar which removes moisture on a user's body by discharging air toward the user's body while moving along the main body.

The present disclosure is intended to propose a drying apparatus which is provided with the moving bar which removes moisture on a user's body by slantingly discharging air toward the front lower part of the main body.

The present disclosure is intended to propose a drying apparatus in which the moving bar is not affected by an external environment.

The present disclosure is intended to propose a drying apparatus in which the flow of air is facilitated inside the moving bar to discharge the air toward a user's body while moving along the main body.

The present disclosure is intended to propose a drying apparatus in which noise which may occur in the moving bar discharging air toward a user's body while moving along the main body is minimized.

The present disclosure is intended to propose a drying apparatus in which the moving bar which removes moisture on a user's body by discharging air toward the user's body while moving along the main body may be separated from the main body.

The present disclosure is intended to propose a drying apparatus in which the moving bar is allowed to be used while being completely separated from the main body.

The present disclosure is intended to propose a drying apparatus in which a structure in which the moving bar is disposed at and separated from the main body is simplified.

The present disclosure is intended to propose a drying apparatus which automatically operates when a user is detected for predetermined time and automatically performs drying according to a preset condition.

The present disclosure is intended to propose a drying apparatus which automatically performs drying according to a preset condition when turned on.

The present disclosure is intended to propose a drying apparatus in which a user may select a drying condition by touching a manipulation panel, or when the manipulation panel is untouched for predetermined time, where the drying condition is displayed on the manipulation panel or is preset and may be automatically selected.

The present disclosure is intended to propose a drying apparatus and a control method thereof in which air is discharged toward a user's body in temperature and volume corresponding to the temperature and volume of discharging air demanded by a user.

The present disclosure is intended to propose a drying apparatus in which a position at which air is discharged is selected from the main body or the moving bar.

The present disclosure is intended to propose a drying apparatus and a control method thereof in which the moving bar removes moisture on a user's body while moving within a range corresponding to a drying area demanded by a user.

The present disclosure is intended to propose a drying apparatus and a control method thereof in which the floor of a space in which the drying apparatus is installed is dried.

The present disclosure is intended to propose a drying apparatus and a control method thereof in which the drying apparatus is configured to be capable of separately drying some parts of a user's body such as a user's head, upper body, lower body, and feet.

The present disclosure is intended to propose a drying apparatus and a control method thereof in which the moving bar intensively discharges air toward a portion (for example, hands or feet) of a user's body to intensively dry only the corresponding portion.

The present disclosure is intended to propose a drying apparatus and a control method thereof in which when a portion of a user's body is intensively dried, a distance between the moving bar and the portion of the user's body is controlled to be maintained constant.

The drying apparatus of the present disclosure discharges air introduced by a fan assembly to a user's body through outlets through which the introduced air is discharged toward the front of a main body, and discharges another air flow to the user's body through a moving bar moving up and down relative to the main body.

The drying apparatus of the present disclosure may allow the moving bar to discharge air slantingly toward the front lower part of the main body while moving up and down relative to the main body such that moisture on a user's body is blown down, and may discharge another air flow discharged through the outlets of the front surface of the main body to a user's body so as to dry moisture on the user's body.

In the drying apparatus of the present disclosure, a front end frame and a rear end frame may constitute the exterior of the main body, and a duct may be disposed at a space defined inside the main body, whereby other parts may be disposed at an installation space of the duct, thereby relatively reducing the front to rear width of the main body.

The drying apparatus of the present disclosure may include: the main body having an entrance hole through which air is introduced thereinto and having the outlets through which the air is discharged toward the front of the main body; the fan assembly disposed at the main body to generate the flow of the air; the duct allowing the air flowing through the fan assembly to be discharged through the outlets; the moving bar movably mounted to the main body to discharge air introduced from the outside of the moving bar toward the front lower part of the main body while moving up and down along the main body; and a drive assembly disposed at the main body to supply a driving force to move the moving bar up and down, wherein the main body includes the front end frame and the rear end frame that may constitute the exterior of the main body; a front plate may be disposed at the duct and may be disposed at an open part formed in the front end frame; and first and second vanes may be provided to guide the direction of the air discharged through the outlets.

In the present disclosure, the first vane and the second vane may be integrated with each other. At least a portion of each of the first vane and the second vane may be integrally with the duct. The main body may include a movement channel between each of the opposite edges of the front plate and the first vane corresponding thereto; the moving bar may be includes the connection part at each of the opposite ends of the moving bar; and the drive assembly may be coupled to the connection part through the movement channel to move the moving bar through the movement channel.

In the present disclosure, the main body may include a fan receiving part disposed at the upper part of the front end frame and protruding therefrom, In which the fan assembly may be disposed; and a portion of the outlets are disposed at a curved part of the upper end of the duct which is disposed at the protruding fan receiving part, wherein the portion of the outlets is directed toward the front lower part of the main body. A receiving space in which the duct is disposed may be formed at the inner surface of the rear end frame, and an inclining surface may be formed along each of the opposite end parts of the receiving space.

The drying apparatus of the present disclosure may include: the main body having the entrance hole through which air is introduced thereinto and having the outlets through which the air is discharged toward the front of the main body; the fan assembly disposed inside the entrance hole of the main body to generate the flow of the air; the duct communicating with the fan assembly to allow the flow of the air to be delivered to the outlets; the moving bar movably mounted to the main body to discharge air introduced from the outside of the moving bar while moving up and down along the main body; and the drive assembly disposed at the main body to supply a driving force to move the moving bar up and down.

The drying apparatus of the present disclosure may further include a heater disposed between the fan assembly and the duct to set the temperature of the flow of the air associated with the fan assembly. The drying apparatus may further include a filter assembly installable at the entrance hole of the main body and having filters to purify the air introduced into the main body. The drying apparatus may further include a filter motor disposed at the entrance hole of the main body to advance and withdraw the filter assembly by a predetermined distance from the surface of the main body.

The drying apparatus of the present disclosure may further include a controller configured to control the driving of at least the fan assembly, the moving bar, and the drive assembly. The maximum speed of air discharged by the moving bar may be larger than the maximum speed of air discharged through the outlets.

The drying apparatus of the present disclosure may allow air to flow inside the main body by using the duct, thereby facilitating the flow of air inside the main body.

In the drying apparatus of the present disclosure, a first flow path and a second flow path of the duct may be connected to each other by a connection flow path at a lower flow part thereof, and a lower discharge flow path may be provided such that air may be discharged through the lower part of the main body from the connection flow path.

In the drying apparatus of the present disclosure, the inside of the duct may be configured to be divided into the first flow path and the second flow path, and the air delivered by the fan assembly may flow separately to the first flow path and the second flow path, so that the air may be more evenly and rapidly delivered to the outlets.

The drying apparatus of the present disclosure may include: the main body having the entrance hole through which air is introduced thereinto and the outlets though which the introduced air is discharged toward the front of the main body; the fan assembly located inside the entrance hole of the main body and configured to generate the flow of the air; the duct communicating with the fan assembly to receive the introduced air and configured to have at least two flow paths formed therein to divide the flow of the air such that the air is delivered to the outlets through the duct; and the moving bar movably mounted to the main body and discharging the air introduced from the outside while moving up and down along the main body.

In the drying apparatus of the present disclosure, the duct may have the entrances of the first flow path and the second flow path separated from each other by a partition wall; a duct body having the outer edges of the duct constituted by an outer wall and inner edges constituted by inner walls; and a duct cover covering the duct body and separating the first flow path and the second flow path from the outside. Each of the first flow path and the second flow path may have an inclination part formed at a position adjacent to the outer wall, and thus may have a flow cross-sectional area gradually decreasing toward the outlets. Each of the first flow path and the second flow path of the duct may be connected to each other by the connection flow path at a lower flow part thereof, and the lower discharge flow path may be formed through the lower end part of the main body from the connection flow path.

In the drying apparatus of the present disclosure, the first vane and the second vane guiding air discharged from the outlets may be provided in the duct cover, and may be exposed from the edge of the main body. The first vane and the second vane may extend to have a predetermined inclination toward the center of the front surface of the main body.

The drying apparatus of the present disclosure may include: the main body having the front end frame and the rear end frame constituting the exterior thereof and having the entrance hole through which air is introduced thereinto and having the outlets through which the introduced air is discharged toward the front of the main body; the fan assembly located inside the main body and configured to generate the flow of the air; the duct communicating with the fan assembly to receive the introduced air and configured to have the first flow path and the second flow path formed therein by being separated from each other to divide the flow of the air such that the air is delivered to the outlets through the duct; the moving bar movably mounted to the main body and discharging the air introduced from the outside toward the front lower part of the main body while moving up and down along the main body; and the first and second vanes provided in the main body and guiding the direction of the air discharged through the outlets.

The drying apparatus of the present disclosure may include: the main body having the entrance hole through which air is introduced thereinto and the outlets through which the introduced air is discharged toward the front of the main body; the fan assembly located inside the entrance hole of the main body and configured to generate the flow of the air; the duct communicating with the fan assembly to receive the introduced air and configured to have at least two flow paths formed therein to divide the flow of the air such that the air is delivered to the outlets through the duct.

In the present disclosure, the drying apparatus may include the moving bar movably mounted to the main body and discharging the air introduced from the outside while moving up and down along the main body. The duct may be configured to have the first flow path and the second flow path separated from each other therein, wherein the first flow path may extend along the first side edge of the inside of the main body, and the second flow path may extend along the second side edge of the inside of the main body. The first flow path and the second flow path may be separated from each other by the partition wall formed in the duct.

In the present disclosure, the flow path formed in the duct may have the inclination part formed at a position adjacent to the outer wall, and thus may have the flow cross-sectional area gradually decreasing toward the outlets.

In the drying apparatus of the present disclosure, the fan assembly may be disposed at the lower part of the main body, and may deliver air introduced through the rear part of the main body to the duct located at the upper part of the fan assembly, thereby, minimizing the flow distance of the air flowing inside the main body due to such a configuration.

In the drying apparatus of the present disclosure, an air entrance of a fan housing of the fan assembly which may be located at the lower part of the main body may face the rear surface of the main body, and a fan motor installed outside the fan housing may be located at the front end of the main body, whereby air introduced by a fan from the rear surface of the main body may flow toward the duct located at the upper part of the fan housing of the radial direction of the fan to facilitate the flow of the air.

The drying apparatus of the present disclosure may include: the main body having the entrance hole through which air is introduced thereinto and the outlets through which the introduced air is discharged toward the front of the main body; the fan assembly located inside the entrance hole of the main body and configured to introduce the air from the rear surface of the main body and to generate the flow of the air; the duct communicating with the fan assembly and allowing the introduced air to be delivered to the outlets; and the moving bar movably mounted to the main body and discharging the air introduced from the outside while moving up and down along the main body, wherein the fan assembly may be disposed at the fan receiving part formed by protruding forward from the lower part of the main body.

The drying apparatus of the present disclosure may include the heater installed between the fan housing and the duct to set the temperature of air. The fan of the fan assembly may be configured to introduce air in the direction of the rotational shaft of the fan and discharge the air in the radial directions thereof, whereby the air may be blown in an air flow space of the fan housing by the fan, and may be delivered to an air exit open toward a duct entrance.

The drying apparatus of the present disclosure may include: the main body having the entrance hole through which air is introduced thereinto and the outlets through which the introduced air is discharged toward the front of the main body; the fan assembly provided inside the entrance hole of the main body and configured to introduce the air from the rear surface of the main body and to generate the flow of the air; the duct communicating with the fan assembly and allowing the introduced air to be delivered to the outlets; and the moving bar movably mounted to the main body and discharging the air introduced from the outside while moving up and down along the main body, wherein the fan assembly may be disposed at the fan receiving part formed by protruding forward from a position between the upper part and lower part of the main body.

In the drying apparatus of the present disclosure, the fan assembly may be installed on the upper part of the main body, and deliver air introduced through the rear surface of the main body to the duct located at the lower part of the fan assembly, thereby minimizing the flow distance of the air flowing inside the main body due to such a configuration.

In the drying apparatus of the present disclosure, the air entrance of the fan housing may face the rear surface of the main body, and the fan motor installed outside the fan housing may be located at the front end of the main body, whereby air introduced by a fan from the rear surface of the main body may flow toward the duct located at one part of the fan housing of the radial directions of the fan to facilitate the flow of the air.

The drying apparatus of the present disclosure may include: the main body having the front end frame and the rear end frame constituting the exterior thereof, and having the entrance hole through which air is introduced into the rear end frame the main body allowing the air to be discharged by surrounding the edges of the front surface of the front end frame; the fan assembly disposed inside the entrance hole of the main body to receive the air from the rear end frame of the main body and generate the flow of the air; the duct communicating with the fan assembly and allowing the flow of the air to be delivered to the surrounding edges of the front surface of the front end frame of the main body to be discharged; and the moving bar movably mounted to the main body to discharge the air introduced from the outside of the moving bar while moving up and down along the main body, wherein the main body may include the fan receiving part disposed at the upper part of the front end frame and protruding therefrom toward the front of the main body in which the fan assembly is disposed therein.

The drying apparatus of the present disclosure may include: the main body having the entrance hole through which air is introduced thereinto and the outlets through which the air is discharged toward the front of the main body; the fan assembly disposed inside the entrance hole of the main body to receive the air from the rear surface of the main body and generate the flow of the air; the duct communicating with the fan assembly and allowing the flow of the air to be delivered to the outlets; and the moving bar movably mounted to the main body to discharge the air introduced from the outside of the moving bar while moving up and down along the main body, wherein the main body may include the fan receiving part at an upper part of the main body and protruding forward therefrom in which the fan assembly is disposed therein.

In the drying apparatus of the present disclosure, the fan assembly may include: the fan housing having the air entrance and the air exit, and having the air flow space defined therein; the fan motor disposed outside the fan housing to supply a driving force; and the fan rotated by the fan motor and disposed in the fan housing. The air entrance of the fan housing may communicate with the filter assembly that may purify the air introduced into the main body.

The filter assembly of the present disclosure may allow a filter frame and filters to be moved by a predetermined distance by using a moving plate. Accordingly, the filter assembly may protrude by a predetermined distance from a position at which the filter assembly is used, thereby enabling a user to easily perform the maintenance of the filters.

The filter assembly of the present disclosure has the filter frame in which multiple filters are installed. Accordingly, air is variously purified while flowing through the filters disposed at the filter frame, thereby supplying more pleasant air to a user.

The filter assembly of the present disclosure may include: the filter frame; and the filters mounted to the filter frame to purify air flowing therethrough; wherein the filter frame is removably mountable to the moving plate which is movable together with the filter frame.

In the present disclosure, the filter frame may include: a perimeter frame in which multiple first through holes are formed; an outer window frame integral with the perimeter frame and having multiple second through holes formed therein; and an inner window frame integral with the outer window frame and having a third through hole formed therein. The filters may include: a first filter may be disposed in the first through holes of the perimeter frame to purify the air introduced to the first filter; a second filter may be disposed in the second through holes of the outer window frame to purify the air passing through the first filter; and a third filter may be disposed in the third through hole of the inner window frame to purify the air introduced to the third through hole.

The drying apparatus of the present disclosure may have the filter assembly provided in the main body, the filter assembly being removed from the main body by being moved by a predetermined distance toward a side of the main body. The filter assembly may be moved toward the side surface of the main body of the drying apparatus, so that a user may easily perform the maintenance of the filter assembly.

The drying apparatus of the present disclosure may include: the main body having the entrance hole through which air is introduced thereinto and the outlets through which the air is discharged toward the front of the main body; the fan assembly disposed inside the entrance hole of the main body to generate the flow of the air; the duct communicating with the fan assembly and allowing the flow of the air to be delivered to the outlets; the filter assembly installable at a position corresponding to the entrance hole of the main body and having the filters to purify the air introduced to the fan assembly; and the filter motor disposed at the entrance hole of the main body to advance and withdraw the filter assembly by a predetermined distance from the surface of the main body.

The drying apparatus of the present disclosure may include the moving bar movably mounted to the main body to move up and down along the main body, and to discharge air introduced into the moving bar toward the front lower part of the main body. The filter assembly may include: the filter frame; the filters disposed at the filter frame to purify the air flowing through the filter frame; and the main body may include the moving plate to which the filter frame is removably mountable, the moving plate movably disposed at the front end of the entrance hole of the main body to move together with the filter frame.

In the drying apparatus of the present disclosure, the movement of the moving bar may be performed by the drive assembly having a lead screw and a moving block moving along the lead screw in the main body. According to such a configuration, the moving bar may efficiently move up and down in the main body.

In the drying apparatus of the present disclosure, at least a portion of the drive assembly disposed at the main body may be located in the installation space of the duct. According to such an installation structure of the drive assembly, the front to rear width of the main body may be minimized.

In the drying apparatus of the present disclosure, a raising/lowering unit may move along a raising/lowering guide having a raising/lowering rack gear formed therein and may move the moving bar. When a raising/lowering assembly having such a structure is used, the structure of moving the moving bar up and down may be simplified in the drying apparatus.

The drying apparatus of the present disclosure may include: the main body having the entrance hole through which air is introduce thereinto and the outlets through which the air is discharged toward the front of the main body; the fan assembly disposed inside the entrance hole of the main body to receive the air from the rear surface of the main body and to generate the flow of the air; the moving bar movably mounted to the main body to discharge the air introduced from the outside of the moving bar while moving up and down along the main body; and the drive assembly disposed at the main body to supply a driving force to move the moving bar, wherein the drive assembly may include: the raising/lowering guide having the raising/lowering rack gear disposed therein; the raising/lowering unit to move up and down along the raising/lowering guide together with the moving bar, the raising/lowering unit having a drive gear engaging with the raising/lowering rack gear and a bar drive source to drive the drive gear.

The drying apparatus of the present disclosure may include: the main body having the entrance hole through which air is introduced thereinto and having the outlets through which the air is discharged toward the front of the main body; the fan assembly disposed inside the entrance hole of the main body to receive the air from the rear surface of the main body and to generate the flow of the air; the moving bar movably mounted to the main body to discharge the air introduced from the outside of the moving bar while moving up and down along the main body; and the drive assembly disposed at the main body to supply a driving force for the movement of the moving bar, wherein the drive assembly may include: the bar drive source to supply the driving force; the lead screw disposed at the main body and rotated by the bar drive source; and the moving block movably mounted to the lead screw to move along the lead screw by the rotation of the lead screw.

The drying apparatus of the present disclosure may include the duct disposed at the main body, the duct communicating with the fan assembly to allow the flow of the air to be delivered to the outlets. The duct may include the first flow path and the second flow path separated from each other therein.

The drying apparatus of the present disclosure may include: the main body having the entrance hole through which air is introduced thereinto and having the outlets through which the air is discharged toward the front of the main body; the fan assembly disposed inside the entrance hole of the main body to receive the air from the rear of the main body and to generate the flow of the air; the duct disposed at the main body and communicating with the fan assembly such that the flow of the air is delivered to the outlets through the duct; the moving bar movably mounted to the main body to discharge the introduced air from an outside of the bar while moving up and down along the main body; and the drive assembly disposed at the main body to supply the driving force for the movement of the moving bar, wherein at least a portion of the drive assembly may be disposed in a space defined by the duct.

In the drying apparatus of the present disclosure, the moving bar may discharge air to a user's body while moving up and down along the main body and may remove moisture on the user's body. Particularly, the air flow discharged by the moving bar may move down and remove moisture on a user's body. Accordingly, the moisture on the user's body may be completely removed.

In the drying apparatus of the present disclosure, the nozzle slot located in the moving bar may discharge air slantingly toward the front lower part of the moving bar. Accordingly, moisture on a user's body may be more completely blown down and removed.

In the drying apparatus of the present disclosure, a bar casing having an open lower part and a bar cover covering the open lower part of the bar casing may constitute the exterior of the moving bar. Although external moisture falls on the moving bar having such a configuration, the moisture may be prevented from being introduced into the moving bar such that the inner configuration of the moving bar is not affected by the moisture.

The drying apparatus of the present disclosure may include: the main body having the entrance hole through which air is introduced thereinto and having the outlets through which the air is discharged toward the front of the main body; the fan assembly disposed at the main body to receive the air through the entrance hole and to discharge the air through the outlets; the moving bar movably mounted to the main body to discharge the air introduced from the outside of the moving bar while moving up and down along the main body; and the drive assembly disposed at the main body to move the moving bar, wherein the moving bar may include: an inlet disposed at a side thereof, the inlet allowing air to be introduced into the moving bar; a bar fan assembly disposed at the moving bar to receive the air through the inlet; and a discharge nozzle to discharge the flow of the air generated by the bar fan assembly toward the outside of the moving bar.

In the drying apparatus of the present disclosure, the moving bar may include the nozzle slot to slantingly discharge the air toward the front lower part of the main body. The drying apparatus may further include an air guide to guide the air from the bar fan assembly to the discharge nozzle. A guide flow space may be formed inside the air guide such that the air delivered from the bar fan assembly flows therein, wherein the guide flow space may have a flow cross-sectional area gradually decreasing toward the lower flow part of the guide flow space from an upper flow part thereof.

In the drying apparatus of the present disclosure, the discharge nozzle may extend longitudinally in the side-to-side direction of the moving bar, and a nozzle flow path in which air delivered from the bar fan assembly flows may extend longitudinally in the side-to-side direction of the discharge nozzle.

In the drying apparatus of the present disclosure may further include a heater at the exit of the bar fan assembly to set a temperature of the air discharged through the discharge nozzle.

In the drying apparatus of the present disclosure, the inlet may be disposed at the lower surface of an end portion of a side of the side-to-side direction of the moving bar, and a filter may be installable at the inlet.

The drying apparatus of the present disclosure may include: the main body having the entrance hole through which air is introduced thereinto and having the outlets through which the air is discharged toward the front of the main body; the fan assembly disposed at the main body to receive the air through the entrance hole and to discharge the air through the outlets; the moving bar movably mounted to the main body to discharge the air introduced from the outside of the moving bar while moving along the main body; and the drive assembly disposed at the main body to move the moving bar, wherein the moving bar may include the bar casing having the open lower part and the bar cover covering the open lower part of the bar casing may constitute the exterior of the moving bar.

In the drying apparatus of the present disclosure, the moving bar may include the bar fan assembly disposed at a bar space defined by the bar casing and covered by the bar cover to receive the air outside of the moving bar through the inlet at a side of the bar cover, and the discharge nozzle to discharge the air received by the bar fan assembly to the outside of the moving bar. A casing step may be formed at surrounding the entrance edges of the bar space defined in the bar casing, and a cover step may be formed at surrounding the edges of the bar cover to couple to the casing step. A gasket made of an elastic material may be disposed between the casing step and the cover step.

In the drying apparatus of the present disclosure, the air guide may be disposed between the bar fan assembly and the discharge nozzle to guide a flow of the air. A first communication slot is formed longitudinally from an upper flow part of the air guide to a lower flow part thereof in a longitudinal direction of the air guide to allow the air flowing through the air guide to be delivered to the discharge nozzle. A second communication slot may be formed longitudinally in the longitudinal direction of the discharge nozzle at the discharge nozzle to correspond to a first communication slot, and a nozzle flow path through which the air flowing through the second communication slot is delivered to a nozzle slot may be formed at the outer surface of the moving bar to be longer in directions of opposite end parts of the nozzle flow path than the second communication slot.

The drying apparatus of the present disclosure may include: the main body; the moving bar movably mounted to the main body to discharge air introduced from an outside of the moving while moving along the main body, the moving bar having the inlet at a side thereof, the inlet allowing air to be introduced into the moving bar, and having the nozzle slot at the outer surface of the moving bar, the nozzle slot allowing the air to be discharged slantingly toward the front lower part of the main body, the moving bar discharging the introduced outside air while moving along the main body; and the drive assembly disposed at the main body to move the moving bar.

The drying apparatus of the present disclosure may further include, the bar fan assembly may be disposed at the moving bar, the bar fan assembly to receive the air through the inlet and generate the flow of the air to discharge the air through the nozzle slot.

In the drying apparatus of the present disclosure, the moving bar may include the bar casing having the open lower part and the bar cover covering the open lower part of the bar casing may constitute the exterior of the moving bar, and the moving bar may include the discharge nozzle to deliver the air flow generated by the bar fan assembly to the nozzle slot, and may have the air guide disposed between the bar fan assembly and the discharge nozzle to guide the flow of the air.

In the drying apparatus of the present disclosure, the bar fan assembly supplying a driving force for the air flow in the moving bar may be installed to be spaced apart by a predetermined distance from the inlet of the moving bar, so that the flow of air introduced into the bar fan assembly may be stably formed, and thus generation of noise may be prevented.

In the drying apparatus of the present disclosure, the nozzle slot slantingly discharging air toward the front lower part of the main body may extend longitudinally in the side to side direction of the moving bar and may have a predetermined width in the up to down direction of the nozzle slot, so that the discharge of air through the nozzle slot may be facilitated.

In the drying apparatus of the present disclosure, a buffer cover made of an elastic material may cover the exterior of the bar fan assembly disposed at the moving bar, and a first spacer and a second spacer made of an elastic material may be provided to surround the buffer cover, whereby the transmission of vibration and noise generated in the bar fan assembly to the outside may be minimized.

The drying apparatus of the present disclosure may include: the main body having the entrance hole through which air is introduced thereinto and having the outlets through which the introduced air is discharged toward the front of the main body; the fan assembly disposed at the main body and configured to introduce the air through the entrance hole and to discharge the air through the outlets; the moving bar movably mounted to the main body and discharging the introduced outside air while moving along the main body; and the drive assembly disposed at the main body and configured to move the moving bar, wherein the moving bar may include: the inlet formed in an end part of a first side of the moving bar, the inlet allowing the air to be introduced into the moving bar; the bar fan assembly installed by being spaced apart by a predetermined distance from the edge of a side of the inlet, the bar fan assembly configured to introduce the air through the inlet and to generate the flow of the air toward an end part of a second side of the moving bar; the air guide installed by extending from the first side of the moving bar to the second side thereof and guiding the air flow generated by the bar fan assembly; and the discharge nozzle discharging the air delivered through the air guide toward the outside of the moving bar.

The drying apparatus of the present disclosure may include: the main body having the entrance hole through which air is introduced thereinto and having the outlets through which the introduced air is discharged toward the front of the main body; the fan assembly disposed at the main body and configured to introduce the air through the entrance hole and to discharge the air through the outlets; the moving bar movably mounted to the main body and discharging the introduced outside air through the nozzle slot while moving along the main body; and the drive assembly disposed at the main body and configured to move the moving bar, wherein the bar fan assembly introducing air from the outside of the moving bar and discharging the air to the outside of the moving bar may be disposed at the moving bar; the buffer cover may be installed on the outer surface of a fan casing constituting the exterior of the bar fan assembly; and the first spacer and the second spacer may be disposed at the moving bar to surround the buffer cover.

In the drying apparatus of the present disclosure, the lower flow part having a relatively small flow cross-sectional area in the air guide may be located at a position opposite to the exit of the bar fan assembly. The discharge nozzle may be installed between the air guide and the nozzle slot. A portion of the discharge nozzle may sit in and be fixed to a nozzle groove formed in the second spacer. The nozzle slot may be configured to slantingly discharge air toward the front lower part of the moving bar. The up-to-down width of the nozzle slot may range from 1.8 mm to 2.2 mm.

In the drying apparatus of the present disclosure, the moving bar may be removed from the main body. When the moving bar is removed from the main body, a user may relatively freely move the moving bar and thus may more easily perform drying the various positions of a user's body.

In the drying apparatus of the present disclosure, a separate battery may be provided in the moving bar, and thus although the moving bar is separated from the main body, the moving bar may independently operate. Accordingly, a user may move the moving bar more freely.

In the drying apparatus of the present disclosure, a magnet may be used to couple the moving bar to the drive assembly. Accordingly, the structure in which the moving bar is coupled to and removed from the main body may be simplified.

The drying apparatus of the present disclosure may include: the main body having the entrance hole through which air is introduced thereinto and the outlets through which the introduced air is discharged toward the front of the main body; the fan assembly disposed at the main body and configured to discharge the air introduced through the entrance hole to the outlets; the moving bar removably disposed at the main body and moving along the main body, the moving bar having the bar fan assembly provided therein and discharging the air introduced from the outside; and the drive assembly disposed at the main body and having a connection bracket to which the moving bar is removably coupled such that the connection bracket moves the moving bar.

In the drying apparatus of the present disclosure, a connection piece may be provided on each of the opposite end parts of the moving bar by extending rearward parallelly to each other. A fastening piece may be provided on each of the opposite end parts of the connection bracket by extending forward parallelly to each other, the fastening piece being coupled to the connection piece. Each of the fastening piece and the connection piece may have the magnet provided at a position corresponding to each other. Each of the fastening piece and the connection piece may have the magnet and a metal material provided at a position corresponding to each other. A separate battery may be disposed at the moving bar. Supplying power for driving the bar fan assembly may be performed by a power line connected to the main body through the connection piece of the moving bar.

The drying apparatus of the present disclosure may include: the main body; the moving bar removably disposed at the main body and introducing the outside air through the inlet located at a side of the moving bar by using the bar fan assembly and discharging the air through the nozzle slot, the moving bar having the connection piece extending rearward from each of the opposite end parts thereof; and the drive assembly disposed at the main body and having the connection bracket, to which the moving bar is removably coupled, so as to move the moving bar.

In the drying apparatus of the present disclosure, the fastening piece removably coupled to the connection piece of the moving bar may be provided on each of the opposite end parts of the connection bracket. The magnet may be provided in at least a position at which the fastening piece and the connection piece correspond to each other. A support end may be provided by protruding from each of the upper end part and lower end part of at least one of the fastening piece and the connection piece.

The drying apparatus of the present disclosure may include: the main body; the moving bar mounted removably to the main body and introducing air through the inlet formed in a side of the moving bar to the bar fan assembly and discharging the air through the nozzle slot, the moving bar having the battery therein and the connection piece extending rearward from each of the opposite end parts thereof; and the drive assembly disposed at the main body and having the connection bracket to which the moving bar is removably coupled by the magnetic force of the magnet such that the drive assembly moves the moving bar.

In the drying apparatus of the present disclosure, when a first sensor disposed at the front surface of the main body detects a user for a preset period of time, the drying apparatus may be automatically operated, and may automatically perform drying according to a preset drying condition. Accordingly, when a user stands in front of the drying apparatus, the drying apparatus may operate in an automatic mode, and drying may be automatically performed according to the preset drying condition.

In the drying apparatus of the present disclosure, when the drying apparatus is turned on by a user, drying may be automatically performed according to the preset drying condition. Accordingly, when the user turns on the drying apparatus, the drying apparatus may semi-automatically perform drying according to the preset drying condition.

In the drying apparatus of the present disclosure, when a user selects a drying condition by touching a manipulation panel, the manipulation panel may display the drying condition, or when the manipulation panel is not touched for a preset period of time, the preset drying condition may be automatically selected. A user may be required to touch the manipulation panel only when changing a drying condition.

The drying apparatus of the present disclosure may control the temperature of air discharged therefrom. A user may input or select a desired temperature by using the manipulation panel. To control the temperature of air discharged from the main body, a first heater may be disposed at the main body, and to control the temperature of air discharged by the moving bar, a second heater may be disposed at the moving bar. For example, the discharging air may be input or selected by being divided into multiple levels such as the unheated air, warm air, and hot air according to the temperature of the discharging air. In the case of the unheated air, first and second heaters may not be operated, and in the case of warm air or hot air, the first and second heaters may be operated.

The drying apparatus of the present disclosure may select a discharge position at which air is discharged. The discharge position may be the main body and the moving bar. A user may select the air discharge of the main body and/or the air discharge of the moving bar by using the manipulation panel. A user may select the simultaneous air discharge of the main body and the moving bar, and may select only one thereof.

The drying apparatus of the present disclosure may control the air volume of discharged air. A user may input or select a desired air volume by using the manipulation panel. To control the air volume of air discharged from the main body, the fan may be disposed at the main body, and to control the air volume of air discharged from the moving bar, the bar fan may be disposed at the moving bar. Furthermore, the fan may be rotated by the fan motor, and the bar fan may be rotated by a bar fan motor. For example, the air volume of the discharged air may be input or selected by being divided into various levels such as low air volume, medium air volume, and high air volume.

In the drying apparatus of the present disclosure, the controller may be configured to allow air having a temperature and air volume desired by a user to be discharged by driving the first heater and the second heater, and the fan motor and the bar fan motor corresponding to the temperature and air volume input or selected by the user.

The drying apparatus of the present disclosure may select and dry the drying area of a user's body to be desired. The drying area may be input or selected through the manipulation panel.

In the drying apparatus of the present disclosure, during the discharge of air from the main body and the moving bar, the moving bar may move up and down within a range (height) corresponding to the drying area. Accordingly, only the desired drying area may be dried.

In the drying apparatus of the present disclosure, when entire body drying is selected, the moving bar may discharge air while moving up and down from a user's head to feet. Accordingly, the controller may be configured to drive the bar drive source and may be configured to allow the moving bar to move up and down along the main body within a range between the height of a preset highest end and the height of a preset lowest end. Here, the movement of the moving bar may be repeated preset times or for a preset period of time.

In the drying apparatus of the present disclosure, when partial body drying is selected, the moving bar may discharge air while moving up and down within a range between heights corresponding to the selected partial body drying. Accordingly, the controller may be configured to drive the bar drive source and may be configured to control the moving bar such that the moving bar moves within a corresponding height range. For example, when upper body drying is selected, the moving bar may discharge air while moving from the head or neck down to the waist. Here, the movement of the moving bar may be repeated preset times or for a preset period of time.

In the drying apparatus of the present disclosure, when floor drying is selected, the moving bar may move to a position close to the floor and may discharge air. Accordingly, the controller may be configured to allow the moving bar to be lowered to the height of the preset lowest end by driving the bar drive source, and when the lowering is completed, may allow the moving bar to discharge air.

In the drying apparatus of the present disclosure, air discharged by the moving bar may have higher pressure than air discharged from the main body. Since the moving bar moves along the main body, the moving bar may discharge a high volume of air and may blow down moisture on a user's body while moving from the upper part of the main body to the lower part thereof.

The drying apparatus of the present disclosure may be configured to allow temperature, air volume, the drying area, and/or the discharge position of air to be automatically or manually input or selected. A temperature button, an air volume button, a drying area button, and a discharge position button may be displayed on the manipulation panel, and a user may select temperature, air volume, the drying area, and the discharge position desired by him or her by touching such buttons. Alternatively, temperature, air volume, the drying area, and the discharge position may be displayed on the manipulation panel, and when a preset period of time has elapsed, the displayed temperature, air volume, the drying area, and the discharge position may be selected.

When a portion of a user's body is detected by the lower part of the moving bar, the drying apparatus of the present disclosure may intensively dry the corresponding portion. To this end, a second sensor detecting a portion of a user's body located at a position lower than moving bar may be provided on the lower surface of the moving bar, and the second sensor may detect a distance in real time between the moving bar and the portion of a user's body. The controller may be configured to allow air to be intensively discharged to the corresponding portion of a user's body, and the corresponding portion may be intensively dried.

When the moving bar intensively dries a portion of a user's body, the drying apparatus of the present disclosure may maintain a constant distance between the moving bar and the corresponding portion of the user's body. When a real-time distance detected by the second sensor is longer than a reference distance, the moving bar may be moved to maintain the reference distance. In addition, even when the real-time detected distance is shorter than the preset minimum distance, the moving bar may be moved to maintain the reference distance. Accordingly, a distance between the moving bar and a portion of a user's body may be maintained to be the same as the reference distance, thereby improving a drying effect.

The drying apparatus disclosed in the specification may have at least one of the following effects.

The disclosed drying apparatus can discharge air to a user's body through multiple outlets located on the front surface of the main body, and can discharge air to the user's body through the nozzle slot of the moving bar moving up and down along the main body. Accordingly, the drying apparatus sweeps down and dries moisture on a user's body, thereby drying the entirety of a user's body rapidly and meticulously.

The disclosed drying apparatus uses an air flow supplied from the edge of the front surface of the main body and an air flow supplied from the moving bar moving to the upper and lower sides of a user's body simultaneously or individually, and can dry a user's body. Particularly, the air flow discharged by the moving bar is set to have speed faster than the air flow discharged from the edge of the front surface of the main body, and thus sweeps down moisture on a user's body, thereby more rapidly performing drying.

In the disclosed drying apparatus, the front end frame and the rear end frame may constitute the main body, and the installation space defined in the duct located between the front end frame and the rear end frame may be used to arrange the drive assembly and the controller therein, thereby minimizing the front to rear thickness of the main body, and slimming the entirety of the drying apparatus due to such a configuration.

In the drying apparatus of the present disclosure, the duct constituting the flow path of air may be provided in the main body. In the main body, the air flows through the duct, and thus can flow more efficiently than air flowing inside the main body to the outlets formed by surrounding the edge of the front surface of the main body, thereby facilitating the flow of the air inside the main body.

In the drying apparatus of the present disclosure, the duct is configured by being divided into the first flow path and the second flow path, and each of the first flow path and the second flow path is connected to each other by the connection flow path at the lower flow part thereof. Air delivered to the connection flow path through the first flow path and the second flow path is discharged to the outside through the lower discharge flow path and through the lower part of the main body. Accordingly, moisture on user's feet and moisture on the floor of the installation space of the drying apparatus can be effectively removed.

In addition, in the drying apparatus of the present disclosure, the duct guiding the flow of air inside the main body is divided into the first flow path and the second flow path, and thus from these flow paths, air can be delivered to the outlets of the left edge of the main body and the outlets of the right edge of the main body. Due to such a structure, the air can be more evenly and rapidly delivered to the outlets located at the edges of the front surface of the main body, thereby discharging the air in air volume and wind speed desired by a user and increasing the satisfaction of the user.

In the embodiment of the drying apparatus of the present disclosure, the fan assembly may be disposed at the fan receiving part located at the lower part of the main body, and may deliver air introduced through the rear surface of the main body to the duct located at the upper part of the fan assembly. Particularly, the fan may be located toward the rear surface of the main body, and the fan motor driving the fan may be located at the front end of the main body, whereby air introduced through the rear surface of the main body may flow directly through the fan assembly to the duct. Accordingly, the flow path of the air flowing through the fan assembly of the drying apparatus is minimized, and the air discharged at a position adjacent to the lower part of the main body has constant speed and volume thereof, thereby facilitating the drying of the torso and lower part of a user's body.

In the embodiment of the drying apparatus of the present disclosure, the fan assembly may be disposed at the fan receiving part located between the upper and lower parts of the main body and may deliver air introduced through the rear surface of the main body simultaneously to the duct located at each of the upper and lower parts of the fan assembly. Particularly, the fan may be located to face the rear surface of the main body, and the fan motor driving the fan may be located at the front end of the main body, whereby the air introduced through the rear surface of the main body may flow through the fan assembly directly to the duct. Accordingly, the flow path of the air flowing through the fan assembly of the drying apparatus is minimized, and the air is delivered from the middle part of the main body to the upper and lower parts of the main body, so that the volume and wind speed of air discharged from the entirety of the main body are relatively constant, thereby facilitating the drying of a user's body.

In the drying apparatus of the present disclosure, the air entrance of the fan housing may face the rear surface of the main body, and air introduced to the fan housing in the direction of the rotational center axis of the fan may be delivered to the upper part of the main body which is one of the radial directions of the fan or to the duct located at each of the upper part and lower part of the main body, thereby minimizing pressure loss due to the flow of air and maximizing the efficiency of the fan assembly.

In the drying apparatus of the present disclosure, the fan assembly may be disposed at the fan receiving part located at the upper part of the main body, and generate the flow of air introduced through the rear surface of the main body such that the introduced air is delivered to the duct located at the lower part of the fan assembly. Particularly, the fan may be located to face the rear surface of the main body and the fan motor driving the fan may be located at the front end of the main body, so that the air introduced through the rear surface of the main body may flow through the fan assembly directly to the duct, thereby minimizing the flow path of the air flowing through the fan assembly of the drying apparatus.

In the drying apparatus of the present disclosure, the air entrance of the fan housing may face the rear surface of the main body, and air introduced to the fan housing in the direction of the rotational center axis of the fan may be delivered to the duct located at one of the radial directions of the fan, thereby minimizing pressure loss due to the flow of air and maximizing the efficiency of the fan assembly.

In the filter assembly, air may start the flow thereof at the edges of the filter frame, and flow sequentially through the first filter, the second filter, and the third filter located in the filter frame to be purified, whereby the foreign matter and odor of the air may be easily removed while the air flows through the multiple filters in the short flow path.

In addition, in the drying apparatus in which the filter assembly is used, the filter assembly may be automatically protruded by a predetermined length toward a side of the main body by the manipulation of a user, and the filter frame having the filters may be removed from the main body of the drying apparatus so as to perform the maintenance of the filter frame. Accordingly, while the drying apparatus disposed at a wall surface is maintained without being removed from the wall surface, the filter frame may be easily removed from the drying apparatus to perform the maintenance thereof, thereby maintaining the performance of the filter assembly in an optimized state.

Furthermore, when the filter assembly disclosed in the specification is moved relative to the main body by the driving of a motor, the filter assembly may be stably moved by a pair of a first moving guide and a first guide rail, and by a pair of a second moving guide and a second guide rail, thereby facilitating the movement of the filter assembly relative to the main body and increasing user's convenience.

In the drive assembly used in the drying apparatus of the present disclosure, the moving block may be configured to move along the lead screw disposed at the main body; the connection bracket may be disposed at the moving block; and the opposite ends of the moving bar may be connected to the connection bracket, whereby the moving bar may move up and down together with the moving block according the movement thereof, thereby facilitating the upward/downward movement of the moving bar relative to the main body.

In the drying apparatus of the present disclosure, at least a portion of the drive assembly may be located in the installation space of the duct disposed at the main body. Accordingly, the duct and the drive assembly may be positioned to overlap to each other in the front to rear direction of the main body, thereby decreasing the front to rear directional thickness of the main body and facilitating the installation of parts of the inside of the main body.

In the embodiment of the drying apparatus of the present disclosure, the raising/lowering guide having the raising/lowering rack gear formed at at least a side thereof and the raising/lowering unit moving along the raising/lowering guide may be used as the drive assembly. Accordingly, when the raising/lowering guide having the raising/lowering rack gear formed therein is used, parts constituting the raising/lowering guide may be simplified and the raising/lowering unit may stably move up and down.

Particularly, when the raising/lowering guide is configured by being divided into multiple parts, the manufacturing thereof may become relatively easy, so that the manufacturing of the drying apparatus may become further simplified.

In addition, in the drying apparatus of the present disclosure, when the raising/lowering guide and the raising/lowering unit are used, the raising/lowering unit may be more stably moved along the raising/lowering guide by the pairs of guide rollers located in the raising/lowering unit, thereby facilitating the movement of the moving bar.

In the drying apparatus of the present disclosure, the moving bar may discharge air while moving up and down along the main body. The air discharged by the moving bar may cooperate with air discharged from the edges of the main body, thereby efficiently removing moisture on a user's body.

In the drying apparatus of the present disclosure, air discharged by the moving bar may be discharged slantingly toward the front lower part of the moving bar or the main body. Due to the discharge of air in such a manner, moisture on a user's body may be blown down by the air discharged by the moving bar, thereby more securely removing moisture on the user's body.

In the drying apparatus of the present disclosure, the bar casing having an open lower part and the bar cover covering the open lower part of the bar casing may constitute the exterior of the moving bar. Accordingly, moisture delivered to the moving bar may be prevented from being introduced into the bar casing, and thus the configuration of the inside of the moving bar may not be affected by the moisture. Particularly, when a gasket is placed at a portion to which the bar casing and the bar cover are coupled, moisture may be more efficiently prevented from being introduced into the moving bar.

In the drying apparatus of the present disclosure, the inlet may be formed in an end part of the bar cover corresponding to the lower surface of the moving bar. Accordingly, when the inlet is located at the lower surface of the moving bar, external moisture may be efficiently prevented from being introduced to the moving bar through the inlet through which air is introduced.

In addition, when the air guide is disposed at the moving bar, moisture may be prevented from being introduced to the bar fan assembly or the heater by the air guide blocking the moisture although the moisture is introduced into the moving bar, thereby increasing the durability of the moving bar.

In the drying apparatus of the present disclosure, the moving bar may move up and down along a user's body, and may have the bar fan assembly installed therein, whereby outside air may be introduced into the moving bar, and be discharged in the sufficient speed and volume thereof to the outside through the nozzle slot. Only one bar fan assembly may be provided inside the moving bar, and the inlet located at the end part of the first side of the moving bar may have a gap having a predetermined size, thereby further facilitating air flow and minimizing generation of noise.

In addition, the air guide may be installed at the exit of the bar fan assembly, and may have the flow cross-sectional area gradually decreasing toward a lower flow part thereof from an upper flow part thereof, thereby securing the speed and volume of air discharged through the nozzle slot, facilitating the flow of air discharged from the bar fan assembly, and decreasing generation of noise in the bar fan assembly.

In the drying apparatus of the present disclosure, the nozzle slot may be formed longitudinally side to side in the outer surface of the moving bar, and may have a predetermined up to down width, thereby discharging air in speed and volume desired by a user through the nozzle slot, and decreasing noise. Furthermore, the nozzle slot may be formed by being divided into multiple nozzle slots, and thus the rigidity of the nozzle slot may be maintained, thereby facilitating the discharge of air through the nozzle slots.

In the drying apparatus of the present disclosure, the buffer cover made of an elastic material may cover the exterior of the bar fan assembly disposed at the moving bar, and the buffer cover may be supported by the first spacer and the second spacer made of an elastic material therein, thereby minimizing the transmission of noise and vibration occurring in the bar fan assembly to the outside.

In the drying apparatus of the present disclosure, an end part of the discharge nozzle may sit in and be fixed in the nozzle groove formed in the second spacer made of an elastic material, thereby making the installation state of the discharge nozzle stable, and minimizing the generation of noise and vibration in the discharge nozzle due to such a configuration.

In the drying apparatus of the present disclosure, the moving bar may be removed from the main body. When the moving bar is removed from the main body, the position of the moving bar may be variously set, thereby more carefully drying various parts of the body.

In the drying apparatus of the present disclosure, the moving bar may receive power through the main body and a power line, or may have a separate battery therein such that the moving bar is operated in the state of being removed from the main body. In this case, the use of the moving bar may become easier. In the case of the use of the power line, the range of the use of the moving bar may be increased up to a position corresponding to the length of the power line, and in the case of the use of the battery, the range of the use of the moving bar may be further increased, thereby making the drying of a user's body performed more efficiently.

In the drying apparatus of the present disclosure, the moving bar may be coupled to the connection bracket of the drive assembly of the main body by the magnet. When the connection bracket and the moving bar are coupled to each other by the magnet, the moving bar may be removed from the connection bracket by a user separating the moving bar from the connection bracket by using a force larger than a magnetic force, thereby further facilitating the mounting and removal of the moving bar.

In the drying apparatus of the present disclosure, the moving bar may discharge air while moving up and down along the main body or the front surface of the main body. The air discharged by the moving bar may cooperate with air discharged from the edges of the main body, thereby removing moisture on a user's body more effectively.

The drying apparatus of the present disclosure may automatically operate and perform drying when a user positioned in front of the drying apparatus is detected for a preset period of time.

The drying apparatus of the present disclosure may automatically perform drying according to a preset drying condition when a user turns on the drying apparatus.

In the drying apparatus of the present disclosure, the drying condition may be displayed on the manipulation panel, and when the drying condition is touched within predetermined time, the touched drying condition may be selected, and when the drying condition is not touched for the predetermined time, the displayed drying condition may be automatically selected, thereby providing convenience to a user.

In the drying apparatus of the present disclosure, air discharged by the moving bar may be discharged slantingly toward the front lower part of the moving bar of the main body. Due to such air discharge, moisture on a user's body may be blown down by the air discharged by the moving bar, thereby more clearly removing moisture on a user's body.

In the drying apparatus of the present disclosure, the temperature and volume of discharging air may be inputted or selected. Accordingly, a user may allow air having desirable temperature and volume to be discharged, and thus may receive more pleasant air.

In the drying apparatus of the present disclosure, the drying area may be input or selected. Accordingly, a user may select a portion of the user's body to be dried, and may dry only the corresponding portion. For example, in a case in which legs are dried after only the legs are washed, only the legs may be dried without drying the entire body. In addition, in a case in which only hair is washed, only the hair may be dried.

In the drying apparatus of the present disclosure, air may be discharged from the main body and the moving bar, and a user may select at least one of the main body and the moving bar to discharge the air, thereby effectively drying a portion desired by the user.

In the drying apparatus of the present disclosure, unlike the main body, the moving bar may discharge air compressed after being introduced thereinto, and thus may discharge high-pressured air, thereby intensively drying a specific portion by using air discharged by the moving bar after being compressed therein during the drying of the specific portion of a user's body.

In the drying apparatus of the present disclosure, the moving bar may detect a portion (for example, the hands or feet) of a user's body located at a position lower than the moving bar which can move up and down along the main body; may adjust a distance between the moving bar and the corresponding portion; and may dry the corresponding portion, thereby improving a drying effect thereof.

In the drying apparatus of the present disclosure, although hands are moved up and down during the drying of the hands at a position lower than the moving bar, the moving bar may also move by corresponding to the movement of the hands such that a distance between the moving bar and the hands are maintained to be constant, thereby performing rapid drying and improving a drying effect.

The drying apparatus of the present disclosure may also dry the floor of a space in which the drying apparatus is installed. Since the drying apparatus may move down and remove moisture on a user's body, the floor of the space in which the drying apparatus is installed may have the remaining moisture. If the moisture remains on the floor for a long time, the moisture may cause a harmful environment in which fungi occurs, so the moisture may be required to be dried rapidly. Accordingly, in the drying apparatus, the moving bar may discharge air after being lowered to a position close to the floor, thereby rapidly performing floor drying.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a front perspective view illustrating a drying apparatus according to an embodiment of the present disclosure;

FIG. 2 is a rear perspective view illustrating the drying apparatus according to the embodiment;

FIG. 3 is an exploded perspective view illustrating a configuration of the drying apparatus illustrated in FIG. 1;

FIG. 4 is an exploded perspective view illustrating a duct constituting the drying apparatus;

FIG. 5 is a cross-sectional perspective view taken along line D5-D5 of FIG. 1;

FIG. 6 is a front view illustrating an area of D6 of FIG. 1 in an arrow direction;

FIG. 7 is a sectional view illustrating an example of a configuration of a first vane, a second vane, and a perimeter wall of the drying apparatus;

FIG. 8 is a sectional perspective view taken along D8-D8 line of FIG. 1;

FIG. 9 is an exploded perspective view illustrating a configuration of a main body of the drying apparatus which is mounted to a wall surface;

FIG. 10 is a perspective view illustrating a configuration of a fan assembly constituting the drying apparatus;

FIG. 11 is a cross section illustrating a configuration of the filter assembly and fan assembly of the drying apparatus, the fan assembly being located in a fan receiving part;

FIG. 12 is a vertical sectional view illustrating the configuration of the filter assembly and the fan assembly of the drying apparatus, the fan assembly being located in the fan receiving part;

FIG. 13 is a perspective view illustrating a configuration of the filter assembly of the drying apparatus;

FIG. 14 is an exploded perspective view illustrating the configuration of the filter assembly illustrated in FIG. 13;

FIG. 15 is a sectional view illustrating a coupling relation of a filter frame and a moving plate relative to each other in the filter assembly of the drying apparatus;

FIG. 16 is an exploded perspective view illustrating a configuration of the drying apparatus for the movement of the filter assembly;

FIG. 17 is a perspective view illustrating a configuration of the moving plate for the movement of the filter assembly;

FIG. 18 is a perspective view illustrating a state of the moving plate protruding to a side surface of the main body of the drying apparatus;

FIGS. 19A and 19B are views illustrating an operation state of the moving plate for the movement of the filter assembly;

FIG. 20 is a perspective view illustrating an inside of the drying apparatus including a drive assembly, with a front plate removed from the drying apparatus;

FIG. 21 is a front view illustrating a configuration of the drive assembly to move a moving bar up and down in the drying apparatus;

FIG. 22 is a perspective view illustrating another example of the drive assembly to move the moving bar up and down in the drying apparatus;

FIG. 23 is a rear view illustrating an inner configuration of the drive assembly illustrated in FIG. 22 by using dotted lines;

FIG. 24 is a front view illustrating a raising/lowering unit and a raising/lowering guide coupled to each other in the drive assembly illustrated in FIG. 22;

FIG. 25 is a rear view illustrating an inner configuration of a drive assembly in still another example of the drive assembly using the raising/lowering guide and the raising/lowering unit by using dotted lines;

FIG. 26 is a perspective view illustrating a configuration of the moving bar used in the drying apparatus;

FIG. 27 is a bottom perspective view illustrating a configuration of the moving bar used in the drying apparatus;

FIG. 28 is an exploded perspective view illustrating a configuration of the moving bar illustrated in FIG. 26;

FIG. 29 is an exploded perspective view illustrating an air guide and a discharge nozzle provided in the moving bar of the drying apparatus;

FIG. 30 is a cross-sectional view illustrating the moving bar taken along D30-D30 line of FIG. 29;

FIG. 31 is a cross-sectional view illustrating the moving bar taken along D31-D31 line of FIG. 29;

FIG. 32 is a cross-sectional view illustrating an inner structure of the moving bar used in the drying apparatus;

FIG. 33 is an exploded perspective view illustrating another example of the moving bar used in the drying apparatus;

FIG. 34 is an exploded perspective view illustrating a structure in which the moving bar illustrated in FIG. 33 is coupled to a connection bracket;

FIG. 35 illustrates a front perspective view of the drying apparatus in which a fan receiving part is located at a lower part of the main body according to another embodiment of the present disclosure;

FIG. 36 is a rear view marking an inner configuration of the drying apparatus illustrated in FIG. 35 by using dotted lines;

FIG. 37 illustrates a side view and enlarged partial sectional views of the configuration of the drying apparatus illustrated in FIG. 35;

FIG. 38 illustrates a front perspective view of the drying apparatus in which the fan receiving part is located at the middle part of the main body according to still another embodiment of the present disclosure;

FIG. 39 is a rear view marking an inner configuration of the drying apparatus illustrated in FIG. 38 by using dotted lines;

FIG. 40 illustrates a side view and enlarged partial sectional views of the configuration of the drying apparatus illustrated in FIG. 38;

FIG. 41 is a view illustrating operation states of the main body and the moving bar of the drying apparatus discharging air;

FIG. 42 is a view illustrating operation states of the filter assembly and the fan assembly of the drying apparatus in which air flows;

FIG. 43 is a view illustrating an operation state of the drying apparatus in which air flows, with a portion of each of a rear end frame and a duct body of the drying apparatus removed therefrom;

FIG. 44 is an operation state view of the moving bar illustrating the flow of air in the moving bar of the drying apparatus;

FIG. 45 is a block diagram of parts connected to a controller controlling the drying apparatus;

FIGS. 46 to 52 are flowcharts illustrating control methods of the drying apparatus according to the embodiments;

FIG. 53 is a view illustrating a detection of a user by a first sensor of the drying apparatus;

FIG. 54 is a view illustrating height ranges in the drying apparatus corresponding to partial body drying; and FIG. 55 is a view illustrating a movement of the moving bar in the drying apparatus to correspond to the position of a portion of a user's body.

DETAILED DESCRIPTION OF THE EXEMPLARY EMBODIMENTS

Hereinbelow, exemplary embodiments of the present invention will be now described in detail with reference to the accompanying drawings. Throughout the drawings, the same reference numerals will refer to the same or like parts. The drying apparatus disclosed herein is primarily intended to dry moisture on a user's body after bathing or showering. The disclosed drying apparatus may be provided as a supplement to drying the body after using a towel. Alternatively, the disclosed drying apparatus may be provided as a replacement for the towel.

FIG. 1 is a front perspective view illustrating a drying apparatus according to an embodiment of the present disclosure; FIG. 2 is a rear perspective view illustrating the drying apparatus according to the embodiment; and FIG. 3 is an exploded perspective view illustrating a configuration of the drying apparatus according to the embodiment.

In the drying apparatus according to the present embodiment, a main body 100 may constitute the frame of the drying apparatus. The main body 100 may be mounted to a wall surface F of an indoor space such as a bathroom. The main body 100 may be made to have a relatively thin thickness in a front to rear direction such that the main body does not occupy much of the indoor space. The front to rear thickness of the main body 100 may be thinner than the width of the main body 100 viewed from the front surface of the main body, so the main body may have a shape of a plate except for at least a portion of the main body. In the embodiment, except for a fan receiving part 104 of the upper end of the main body, the remaining portion of the main body may have the shape of a plate.

A front end frame 102 and a rear end frame 106 may constitute the exterior of the main body 100. The front end frame 102 may mainly constitute the front, side, upper, and lower surfaces of the main body 100, and the rear end frame 106 may mainly constitute the rear surface of the main body 100. Alternatively, the front end frame 102 and the rear end frame 106 constituting the outer surfaces of the main body 100 may be formed by being separated from each other in a manner different from the outer surfaces of the main body as illustrated. In the illustrated embodiment, the rear end frame 106 mainly constitutes only the rear surface of the main body, but the rear end frame 106 may constitute at least a portion of each of the side, upper, and lower surfaces of the main body.

In the embodiment, the front end frame 102 may include an open part 102'. A front plate 112 to be described below may be located in the open part 102'. Air may be discharged through the edges of the open part 102' to remove moisture on a user's body. The discharge of air through the edges of the open part 102' may be performed through outlets 136 of a duct 130 to be described below. The outlets 136 may be considered to be substantially formed in the main body 100. In the illustrated embodiment, the open part 102' may have a rectangular shape formed vertically longitudinally. The open part 102' may have a rectangular shape extending vertically longitudinally when the main body 100 is viewed from the front thereof, and may have four curved corners. In this case, the upper end edge of the open part 102' may be located at a position protruding more forward than the remaining parts thereof.

A perimeter wall 103 may be formed to separate the edge of the open part 102' from a surrounding area. The perimeter wall 103 may constitute at least a portion of the side and lower surfaces of the main body 100. In the illustrated embodiment, the perimeter wall 103 constitutes the exteriors of the opposite side surfaces of the main body 100 and the lower surface thereof. The upper end part of the edge of the open part 102' may be adjacent to the fan receiving part 104 to be described below. The fan receiving part 104 may relatively protrude forward, and thus the upper end edge of the open part 102' corresponding thereto may protrude more forward than the remaining part of the open part 102'.

The fan receiving part 104 may be provided on the upper end of the front end frame 102. A fan assembly 160 to be described below may be installed in the fan receiving part 104. The fan receiving part 104 may have predetermined space formed therein in which the fan assembly 160 is installed. The front surface of the fan receiving part 104 may protrude more forward than the perimeter wall 103. The fan receiving part 104 may have an approximately hexahedral shape as a whole. The corners of the fan receiving part 104 may have curved surfaces. Alternatively, the fan receiving part 104 may have various shapes such as a cylindrical or polyhedral shape.

A first sensor 105 may be mounted to the upper front surface of the front end frame 102 so as to detect a user located in front of the main body 100. The first sensor 105 may detect a person located in front of the drying apparatus, and may also detect a distance between the drying apparatus and the person. As the first sensor 105, a LiDAR, an ultrasonic sensor, a laser sensor, or an infrared sensor may be used. Furthermore, the first sensor 105 can rotate vertically and horizontally. The vertical rotation is for detecting not only a tall adult, but also a relatively small child or a sitting person, and the horizontal rotation is for detecting a user in a wider area. A driving unit may be coupled to the first sensor for the vertical and horizontal rotations of the first sensor. When a person is detected in front of the drying apparatus, the first sensor 105 may automatically rotate vertically and detect the person's height. The first sensor 105 may rotate vertically multiple times to accurately detect the height. The first sensor 105 may detect the height by rotating vertically multiple times and obtain height information as an average value of the detected heights. Alternatively, the first sensor 105 may rotate vertically at a small angle relative to a user's head. This is because the first sensor can detect the height of a user by measuring only the height of the head since the position of the first sensor 105 is fixed, and a controller 122 already has information on the height of the first sensor 105. Such information detected by the first sensor 105 may be delivered to the controller 122 to be described later.

In addition, the controller 122 may extract approximate height information of the user's head, upper body, lower body, and feet by using the information on the detected height. The controller 122 may prestore the height information of the head, upper body, lower body, and feet for various heights of people, and whenever a user's height is measured, the controller 122 may extract the height of each of the user's body part by mapping with the prestored information.

A communication module (not shown) capable of performing wired/wireless communication may be installed in the drying apparatus. The controller 122 may perform wired/wireless communication with an external device through the communication module. For example, the communication module may operate in cooperation with a home network system. The controller 122 can receive the user's command through the home network system. Accordingly, the controller 122 may control the drying apparatus according to the user's command received through the communication module. For example, a user may preset the temperature and volume of air to be discharged by using the home network system, and the controller may allow the drying apparatus to discharge the air without the detection of the user. Accordingly, the user can increase the temperature of the inside of a bathroom before entering the bathroom, for example, during the cold winter. Furthermore, the communication module may communicate with the user's smart mobile terminal. As a communication method, for example, 4G LTE and 5G communication networks may be used. The user may transmit a command to the communication module through their mobile terminal.

An entrance hole 108 may be formed in the upper part of the rear end frame 106. The entrance hole 108 may be formed at a position corresponding to the position of the fan receiving part 104. The entrance hole 108 may be the entrance of the space defined inside the fan receiving part 104. Outside air may be introduced to the fan assembly 160 located in the fan receiving part 104 through the entrance hole 108. As illustrated in FIG. 16, a seat end 108' may be formed along the edge of the lower end of the entrance hole 108. The lower end of a filter assembly 180 to be described later may be located on the seat end 108'. The seat end 108' may be formed by being stepped on the rear surface of the rear end frame 106.

In the rear end frame 106, except for the entrance hole 108, each of the edges of the remaining parts may be an inclining surface or curved surface 109. The inclining surface 109 is illustrated in FIGS. 2 and 5. The inclining surface 109 may allow the rear end frame 106 to have a neat appearance. Predetermined space may be defined between the inclining surface 109 and the wall surface F. Due to the presence of the inclining surface 109, when the main body 100 is in close contact with the wall surface F, a gap may be defined between the main body 100 and the wall surface F. An installer may use the gap such that the main body 100 is easily mounted to or removed from the wall surface F.

A receiving space 110 may be formed concavely in the front surface of the rear end frame 106. The duct 130, the controller 122, a manipulation panel 124, and a drive assembly 210 to be described below may be located in the receiving space 110. The inclining surface 109 may be located surrounding the edge of the receiving space 110, and thus the receiving space 110 may be configured to have a side to side width gradually decreasing toward the edge of the rear end frame 106. This configuration is illustrated in FIG. 5.

The front plate 112 may be located at the open part 102' of the front end frame 102. The front plate 112 may cover the open part 102', and allow parts located in the receiving space 110 to be prevented from being exposed to the outside. The shape of the front plate 112 may be the same as the shape of the open part 102'. The front plate 112 may include a flat part 114 and a curved part 116. The flat part 114 may function to cover the space corresponding to the inner side of the perimeter wall 103.

In the embodiment, the curved part 116 may be located on the upper end of the front plate 112. The curved part 116 may be located at a position corresponding to the position of the lower part of the fan receiving part 104 of the front end frame 102. Since the fan receiving part 104 of the front end frame 102 protrudes more than the perimeter wall 103, the curved part 116 may be configured to protrude more than the flat part 114 to correspond to the fan receiving part.

The front plate 112 may be mounted to the front of the duct 130 to be described later. The upper and lower end parts of the front plate 112 may be connected to and fixed to the duct 130. Predetermined space may be defined between the middle part of the front plate 112 and the duct 130 such that parts for the movement of a moving bar 230 to be described below are not interfered.

A first vane 118 may be installed by surrounding the edge of the open part 102' corresponding to the inner side of the perimeter wall 103. The first vane 118 may function to guide discharged air. A second vane 120 may be installed by surrounding the edge of the open part 102' corresponding to the inner side of the first vane 118. Air delivered through the duct 130 to be described below may be discharged to the outside through the first vane 118 and the second vane 120.

The first vane 118 and the second vane 120 may be made almost identical to each other in shape, but may have different dimensions. The second vane 120 may be formed to be smaller than the first vane 118 such that the second vane 120 is located inside the first vane 118. Each of the first vane 118 and the second vane 120 may have a part corresponding to the flat part 114 of the front plate 112 and a part corresponding to the curved part 116. The part in which each of the first vane 118 and the second vane 120 corresponds to the flat part 114 of the front plate 112 may have the same shape as the shape of the perimeter wall 103. The part in which each of the first vane 118 and the second vane 120 corresponds to the curved part 116 of the front plate 112 may be formed to protrude more than the flat part 114 in the same shape as the protruding shape of the curved part 116.

In the illustrated embodiment, the first vane 118 and the second vane 120 may be formed separately from each other, but may be connected to each other to be integrated with each other. Alternatively, the first vane 118 and the second vane 120 may be formed integrally with the duct 130 to be described below. More particularly, the first vane 118 and the second vane 120 may be formed integrally with a duct cover 134 of the duct 130. The entirety of the first vane 118 and the second vane 120 may be formed integrally with the duct 130, but only a portion of each of the first vane 118 and the second vane 120 may be formed integrally with the duct 130. The remaining sections of the first vane 118 and the second vane 120 which are not integrated with the duct 130 may be formed integrally with each other or may be formed separately from each other.

Referring to FIGS. 5 and 6, since the outlets 136 are between the first vane 118 and the second vane 120, air may be discharged toward a user's body through the outlets. A movement channel 121 may be provided between the second vane 120 and each of the edges of the front plate 112. The movement channel 121 may be a part in which each of the opposite end parts of the moving bar 230 to be described below is located such that the moving bar can be moved.

In the embodiment, the outlets 136 located between the first vane 118 and the second vane 120 may be configured to be seen from the front of the main body 100. However, in the embodiment illustrated in FIG. 7, the first vane 118 and the second vane 120 may extend slantingly toward the front of the main body 100. That is, the extending direction (the direction of arrow B) of the front end of each of the first vane 118 and the second vane 120 may have a predetermined angle with respect to the front direction (the direction of arrow A) of the main body 100. Here, the direction of arrow B may incline toward the center of a user's body. Accordingly, the outlets 136 located between the first vane 118 and the second vane 120 may not be seen from the front of the main body 100. A dotted line C shown in FIG. 7 is a line in which in a mold in which the perimeter wall 103, the first vane 118, and the second vane 120 are manufactured integrally with each other, cores of the opposite sides of the mold are in contact with the perimeter wall 103, the first vane 118, and the second vane 120. For reference, although the perimeter wall 103, the first vane 118, and the second vane 120 are not integrated with each other, when the perimeter wall 103, the first vane 118, and the second vane 120 are manufactured and assembled with each other in the shape illustrated in FIG. 7, the outlets 136 may be prevented from being exposed to the front of the main body 100. The controller 122 may be installed in the receiving space 110. For example, the controller 122 may be a substrate to which various chips and elements are mounted. Alternatively, the controller 122 may include a microprocessor. The controller 122 may be located in the lowest part of the installation space 150 of the duct 130 to be described below in the receiving space 110.

The controller 122 may include a power supply circuit, a microcomputer circuit, a drive circuit of the fan assembly 160, a drive circuit of the drive assembly 210, a drive circuit of a first heater 174, a drive circuit of a bar fan assembly 250, a drive circuit of a second heater 268, a speaker circuit, the drive circuit and communication circuit of the manipulation panel 124, and a sensor drive circuit.

The manipulation panel 124 for user's input and the status indication of the drying apparatus may be installed in the receiving space 110. The manipulation panel 124 may be mounted to the rear surface of the front plate 112. The manipulation panel 124 may be located at a position of about at least 1600 mm upward from the floor of the installation space of the drying apparatus. This value may be set by considering the eye level of a user with average height.

The manipulation panel 124 may display the operation state of the drying apparatus. Furthermore, at least one manipulation button through which a command can be inputted for the operation of the drying apparatus may be provided in the manipulation panel 124. For example, the manipulation button may include a temperature button, an air volume button, a drying area button, a discharge position button, a drying start button, a drying end button, and a moving bar raising/lowering button. The temperature button is intended to select (adjust) the temperature of discharging air, and for example, may allow the unheated air, warm air, or hot air to be selected. Here, the warm air and hot air may mean the discharge of air heated by the heater to be described later, and the unheated air may mean the discharge of the introduced outside air (for example, unheated air or cool air) without the operation of the heater. The air volume button is intended to select (adjust) the volume of discharging air, and for example, may allow high volume, medium volume, or low volume to be selected. The drying area button is intended to select a portion of the body to be dried, and for example, may allow the entire body, the head, the upper body, the lower body, the hands, the feet, or the floor to be selected. The discharge position button may be intended to select air discharge from the main body 100 or air discharge from the moving bar 230. The discharge positions of air may be selected, and only one of the discharge positions of air may be selected in one example. The drying start button and the drying end button may be a button touched to start drying and a button touched to end drying, respectively, after the items are selected as described above. Each of these buttons may be touched at any time during the use of the drying apparatus, and the touched button may transmit a signal to the controller to be described later.

The drying start button and the drying end button may be selectively provided. In the case of the absence of the drying start button, when a predetermined time (for example, 3 seconds) has elapsed after the items are selected, drying may be automatically performed. As for the temperature button, the air volume button, the drying area button, and the discharge position button, specific items may be initially selected as default items. For example, when the manipulation panel 124 is turned on, the temperature of the discharging air may be defaulted as hot temperature, the volume thereof may be defaulted as low volume, a drying area thereof may be defaulted as an entire body, and the discharge position thereof may be defaulted as the main body 100 and the moving bar 230. A user may change the defaulted items by touching each button. When a preset period of time has elapsed or the drying start button is touched in the defaulted state or the state in which the items are selected, drying may start according to the defaulted or selected items. When ending the drying, the drying end button may be touched, or drying may automatically end when the drying process is performed for a preset period of time.

Each item of these buttons may be displayed on the manipulation panel 124 to be selected, and with every touch, each item may be displayed in turn to be selected. For example, when a temperature selection button is touched one time, the unheated air may be displayed; when the temperature selection button is touched once more, the unheated air may be changed to warm air and the warm air may be displayed; and when the temperature selection button is touched once more, the warm air may be changed to hot air and the hot air may be displayed. When a preset period of time (for example, 3 seconds) has elapsed in the displayed state, the displayed item may be selected.

The manipulation panel 124 may pass through the front plate 112, and the front surface thereof may be exposed. Of course, in the state in which the manipulation panel 124 is installed on the rear surface of the front plate 112, a part of the front plate 112 corresponding to the manipulation panel 124 may be transparent, and thus may be seen from the outside. Input of manipulation signals through the manipulation panel 124 may be performed by a touch method. The manipulation panel 124 may be a device having an input device and a display device embodied integrally with each other. The input device may be embodied as a touch pad or a touch screen.

The duct 130 may be installed in the receiving space 110. The duct 130 may be located in the receiving space 110 and at a position corresponding to the open part 102'. The front of the duct 130 may be located at the open part 102' and a portion of the duct may be covered by the front plate 112.

The duct 130 may have a duct body 132 and the duct cover 134. The duct cover 134 may be mounted to the front end of the duct body 132. The outlets 136 may be formed in the duct cover 134. In the embodiment, the multiple outlets 136 may be formed by surrounding the edges of the duct cover 134. As illustrated in FIG. 4, the multiple outlets 136 may be formed along the edges of the duct cover 134. In the embodiment, the outlets 136 may be formed at heights corresponding to each other at opposite edges of the duct cover 134. The outlets 136 may be formed at the upper edge and opposite edges of the duct cover 134. The outlets 136 formed at the upper edge of the duct cover 134 may discharge air toward a user's head. The outlets 136 formed at the opposite edges of the duct cover 134 may discharge air toward a user's body such as the user's upper and lower bodies. The air discharged through the outlets 136 may be discharged in a direction of a middle line of a user's body from the opposite sides of a width direction thereof.

The outlets 136 may be formed to be spaced apart by predetermined distances from each other along the edges of the duct cover 134. Since air discharged from the outlets 136 spreads during the process of being delivered to a user's body, there may be predetermined distances between adjacent outlets 136.

Outlets 136 may be located in the duct 130 constituting the main body 100, and may be configured to be exposed to the outside to some extent by surrounding the edges of the main body 100, so the outlets 136 may be considered to be substantially located in the main body 100.

An entrance plate 137 may be provided at a side of the duct body 132. A duct entrance 138 may be formed in the entrance plate 137 such that air is introduced to the inside of the duct 130. The entrance plate 137 may be located at a lower part of the fan receiving part 104. The entrance plate 137 may have a shape corresponding to the cross section of the lower end part of the fan receiving part 104. The fan assembly 160 to be described below may be mounted to the entrance plate 137.

A first flow path 140 and a second flow path 142 may be formed inside the duct 130 by being separated from each other. In the illustrated embodiment, the first flow path 140 and the second flow path 142 may be formed at a left side and a right side of the duct, respectively, inside the duct 130 by being separated from each other. Air flowing through the first flow path 140 may be discharged to the outside through the outlets 136 formed along the left edge of the duct cover 134. Air flowing through the second flow path 142 may be discharged to the outside through the outlets 136 formed along the right edge of the duct cover 134.

Each of the first flow path 140 and the second flow path 142 may be configured to have a flow cross-sectional area gradually decreasing toward a lower flow part thereof from an upper flow part thereof starting at the duct entrance 138. The flow cross-sectional area of each of the first flow path 140 and the second flow path 142 may not decrease linearly, but may gradually decease at a predetermined section toward the lower flow part thereof from the upper flow part thereof. In the illustrated embodiment, the flow cross-sectional area may gradually decrease at the lower flow part of each of the first flow path 140 and the second flow path 142. In the lowest flow part of each of the first flow path 140 and the second flow path 142, the flow cross-sectional area may further decrease. The first flow path 140 and the second flow path 142 may be connected to each other by a connection flow path 145 to be described below at the lower flow part. The flow cross-sectional area of the connection flow path 145 may be almost the same as the flow cross-sectional area of the lowest flow part of each of the first flow path 140 and the second flow path 142. Accordingly, the flow cross-sectional area may be smaller at the lower flow part than at the upper flow part such that although air delivered from the fan assembly 160 flows to the lower flow part, the volume and speed of the air may be discharged constantly as a whole through the outlets 136.

The first flow path 140 and the second flow path 142 may be separated from each other by the partition wall 144. In the duct body 132, the partition wall 144 may extend toward the lower flow part by starting from the duct entrance 138. The partition wall 144 may divide the duct entrance 138 into two areas. The first flow path 140 and the second flow path 142 may start at the duct entrance 138 divided by the partition wall 144. The position at which the duct entrance 138 is divided by the partition wall 144 may be changed according to the volume and flow direction of air discharged through the fan assembly 160 to be described below.

The connection flow path 145 connecting the first flow path 140 to the second flow path 142 may be provided at the duct 130. The connection flow path 145 may connect the lower flow part of the first flow path 140 and the lower flow part of the second flow path 142 therebetween. A lower discharge flow path 145' may be provided to discharge air toward the lower part of the main body 100 from the connection flow path 145. As illustrated in FIG. 8, the lower discharge flow path 145' may communicate the connection flow path 145 with the outside. The lower discharge flow path 145' may be formed through an outer wall 146 of the duct body 132, and may be formed through the perimeter wall 103 of the front end frame 102. The lower discharge flow path 145' may be formed in a predetermined section of the connection flow path 145 when the main body 100 is viewed from the front thereof. A width in which the lower discharge flow path 145' is formed may have a size to discharge air toward a user's feet.

The duct body 132 may include the outer wall 146 and the inner walls 148 such that the first flow path 140, the second flow path 142, and the connection flow path 145 are formed therein. The outer wall 146 may constitute the outer edges of the duct body 132. The outer wall 146 may extend along the opposite outer edges of the duct body 132 by starting from the entrance plate 137 to constitute the outer side of the connection flow path 145. The inner walls 148 may constitute the inner sides of the first flow path 140, the second flow path 142, and the connection flow path 145. The inner walls 148 may define the installation space 150 in the duct body 132 by forming a closed curve.

The entire width of the duct 130 may be constant as a whole. Each of the first flow path 140 and the second flow path 142 formed inside the duct 130 may have the flow cross-sectional area gradually decreasing toward the lower flow part thereof. Accordingly, a distance between the inner walls 148 may increase toward a section forming the lower flow part of each of the first flow path 140 and the second flow path 142 such that the installation space 150 may be defined more widely. The installation space 150 may have a relatively small volume in a part in which the flow cross-sectional area of each of the first flow path 140 and the second flow path 142 is large, and may have a relatively large volume in a part in which the flow cross-sectional area thereof is small.

Multiple coupling bosses 152 may be provided in the first flow path 140 and the second flow path 142 of the duct body 132 by protruding therefrom. The coupling bosses 152 may be used to couple the duct cover 134 to the duct body 132. When a screw passes through the duct cover 134 and is fastened to each of the coupling bosses 152, the duct cover 134 may be coupled to the duct body 132.

An inclination part 154 may be located in each of the first flow path 140 and the second flow path 142 of the duct body 132. The configuration of the inclination part 154 is illustrated in FIGS. 3 to 5. In the duct 130, the inclination part 154 may be formed to incline toward the outlets 136 formed in each of the edges of the duct cover 134. Accordingly, the inclination part 154 may extend vertically longitudinally at the opposite ends of the duct body 132. The inclination part 154 may cause the flow cross-sectional area to gradually decrease toward the outlets 136, thereby securing the appropriate volume and speed of air discharged through the outlets 136.

The configuration of the duct cover 134 constituting the front of the duct 130 will be described. The shape of each of the outer edges of the duct cover 134 may be almost the same as the shape of each of the outer edges of the front plate 112. A part of the duct cover 134 facing the flat part 114 of the front plate 112 may have a shape of a flat plate, and may be a flat part 156. A curved part 157 may be provided on the upper end of the flat part 156. The curved part 157 may be formed as a shape corresponding to the shape of the curved part 116 of the front plate 112 at a position corresponding to the curved part 116 thereof. The outlets 136 formed in the flat part 156 of the duct cover 134 may allow air to be discharged toward the opposite sides of a user's body, and the outlets 136 formed in the curved part 157 of the duct cover 134 may allow the air to be discharged toward a user's head. This is because the curved part 157 is formed slantingly toward the front lower part of the duct cover.

Referring to FIG. 9, a bracket 158 may be fixed to the rear surface of the rear end frame 106. The bracket 158 is intended to hold the main body 100 of the drying apparatus on the wall surface F. The bracket 158 may include a fixing piece 158' fixed to the rear surface of the rear end frame 106. A holding piece 158" may be provided by being connected to the fixing piece 158'. The holding piece 158" may be connected to the fixing piece 158' through a connection step **158*s*. Due to the presence of the connection step 158*s*, the holding piece 158" may be located at a position stepped to the fixing piece 158'. The virtual extension surfaces of the holding piece 158" and the fixing piece 158' may have a predetermined interval therebetween. Accordingly, a predetermined space may be defined between the rear surface of the rear end frame 106 to which the fixing piece 158' is fixed and the holding piece 158"**.

The holding piece 158" may include at least one holding groove **158*r*. An anchor 159 fixed to the wall surface F may be held in the holding groove 158*r*. The head of the anchor 159 may be located in space between the holding piece 158" and the rear surface of the rear end frame 106**.

When the main body 100 is mounted to the wall surface F, a distance between the lower end part of the main body 100 and the floor may be set to approximately 300 mm. When the lower end part of the main body 100 is located at a position apart by a predetermined distance from the floor, the influence of moisture on the floor of a bathroom on the main body 100 may be minimized.

The fan assembly 160 will be described with reference to FIGS. 10 to 12. The fan assembly 160 may introduce outside air into the main body 100, and may allow the air to flow through the duct 130 and be discharged through the outlets 136. The fan assembly 160 may be located in the fan receiving part 104 of the main body 100. A fan housing 162 may constitute the exterior of the fan assembly 160. A housing cover 164 may be provided at a side of the fan housing 162. The housing cover 164 may cover the side of the fan housing 162. An air flow space 166 may be defined inside the fan housing 162. The air flow space 166 may function to guide the air introduced by the fan 172 to the duct 130. A fan motor 170 to be described below may be mounted to the housing cover 164.

An air entrance 168 may be located at a first side of the fan housing 162. Air flowing through the filter assembly 180 to be described below may be introduced into the air flow space 166 through the air entrance 168. The air entrance 168 may be open toward the wall surface F. An air exit 169 may be located at a second side of the fan housing 162. The air exit 169 may be a part through which air introduced into the fan housing 162 is delivered to the duct 130. In the embodiment, the direction of the air entrance 168 and the open direction of the air exit 169 may be orthogonal to each other. That is, with the air entrance 168 facing the wall surface F, the air exit 169 may be configured to be directed toward the lower part of the main body 100.

As illustrated in FIG. 10, the air exit 169 may be located at the second side of the fan housing 162. That is, the air exit 169 may be located at a position apart in a side direction of the fan housing from the rotation center of the fan 172 to be described below. In the embodiment, when the main body 100 is viewed from the front thereof, the air exit 169 may be located at a right side of the main body. This is because the direction of an air flow formed in the air flow space 166 is set in the right side of the main body. The air exit 169 may communicate directly with the duct entrance 138 of the duct 130. Alternatively, the air exit 169 and the duct entrance 138 may be connected to each other by a separate connection hose.

The fan motor 170 may be mounted to the housing cover 164. The fan motor 170 may drive the fan 172 allowing outside air to be introduced and be discharged through the outlets 136. The fan motor 170 may be located in the fan receiving part 104, and in the embodiment, may be located between the fan housing 162 and the front end frame 102 as illustrated in FIG. 11. Accordingly, the fan 172 mounted to a motor shaft 170' of the fan motor 170 may be located in the fan housing 162 such that the air entrance 168 of the fan housing 162 faces the wall surface F. The fan 172 may introduce air in the longitudinal direction of the rotation center thereof and discharge the air in the radial direction thereof. Due to such arrangement of the fan 172, the air entrance 168 of the fan housing 162, and the air exit 169, outside air may flow through a relatively short path to the duct 130 from the outside of the main body 100.

The first heater 174 may be provided to set a temperature of air flowing to the duct 130 to be described below by flowing through the fan assembly 160. The first heater 174 may be installed at a position adjacent to the air exit 169 of the fan housing 162. For example, the first heater 174 may be installed in the air exit 169. Particularly, the first heater 174 may be located between the air exit 169 of the fan housing 162 and the entrance hole 108 of the duct 130. As the first heater 174, a coil heater or a PTC (positive temperature coefficient) heater may be used.

The filter assembly 180 will be described with reference to FIGS. 13 to 17. The filter assembly 180 may be installed in the entrance hole 108 of the rear end frame 106. The filter assembly 180 may function to purify air introduced to the fan housing 162. The filter assembly 180 may be configured to sit on the seat end 108' illustrated in FIG. 16, and block the entrance hole 108.

A filter frame 182 may constitute the frame of the filter assembly 180. In the rear end frame 106, the filter frame 182 may be located at an area corresponding to the upper part of the seat end 108' and the front of the entrance hole 108, and may be configured to have a surface continuous to the rear surface of the rear end frame 106.

A perimeter frame 183 surrounding the outermost edges of the filter frame 182 may be provided. The outer edges of the perimeter frame 183 may be in close contact with a side surface of a moving plate 190 to be described below. The perimeter frame 183 may be configured having the same plane as the inclining surface 109 of the rear end frame 106. The perimeter frame 183 may be considered as an extended form of the inclining surface 109 of the rear end frame 106. The perimeter frame 183 may have a rectangular shape as a whole, or a rectangular shape having curved upper opposite corners when viewed from the rear surface of the rear end frame 106. Such a configuration is intended to make the shape of the rear surface of the main body 100 neat due to the cooperation of the perimeter frame 183 with the rear end frame 106.

Multiple first through holes 183' having the shapes of long slots may be formed in the perimeter frame 183. In the embodiment, the first through holes 183' may be formed side by side in a portion of the right upper end part of the perimeter frame 183 and a right side thereof, and in a portion of the left upper end part of the perimeter frame 183 and a left side thereof. A first filter 184 may be located in each of the first through holes 183'. As the first filter 184, a prefilter that filters foreign matter such as dust may be used. The first filter 184 may be fixed integrally with the filter frame 182. The first through hole 183' may be formed in the entire area of the perimeter frame 183. As illustrated in FIG. 13, an area in which the first through hole 183' is not formed may be provided in the middle part of the upper end of the perimeter frame 183.

An outer window frame 185 may be provided to form the inner edge of the perimeter frame 183. The outer window frame 185 may be the most protruding part from the filter frame 182 when viewed from the rear surface of the rear end frame 106. The outer window frame 185 may have the same shape as the shape of the perimeter frame 183, but may have a size smaller than the size of the perimeter frame 183. An inner window frame 187 may be provided in the inner rear part of the outer window frame 185 (when viewed from the rear surface of the rear end frame 106). The inner window frame 187 may have a shape corresponding to the shape of a through hole 192 formed in the moving plate 190 to be described below.

The connection portion of the outer window frame 185 and the inner window frame 187 may be formed slantingly, and second through holes 185' may be formed in the connection portion. A second filter 186 may be installed in each of the second through holes 185'. The second filter 186 may use a prefilter like the first filter 184. Alternatively, the second filter 186 may have a function different from the function of the first filter 184. When the fan assembly 160 is operated, air introduced from the outside may flow through the first filter 184 of the first through hole 183', and then may flow through the second filter 186 of the second through hole 185'. Of course, in the case in which the outer window frame 185 is in close contact with the wall surface F, the air may flow sequentially through the first filter 184 and the second filter 186 as described above. However, the air flow may be performed differently. For example, air may flow directly through a third filter 188 to be described below through the inner area of the outer window frame 185. This is applied to the case in which the outer window frame 185 is not in close contact with the wall surface F.

A third through hole 187' may be formed in the inner window frame 187. The third through hole 187' is seen well in FIG. 14. The third through hole 187' may be a path through which air flowing through the first filter 184 and the second filter 186 is introduced into the fan assembly 160. The third filter 188 may be installed in the third through hole 187'. For example, the third filter 188 may have a deodorizing function. Of course, the third filter 188 may also have the same function as the first filter 184 or the second filter 186, or may have a function similar thereto. The air flowing through the third filter 188 may be introduced into the fan housing 162 of the fan assembly 160. In the case in which outside air flows through the third filter 188 without flowing through the first filter 184 and the second filter 186, the third filter 188 may perform multiple functions. That is, the third filter 188 may have a dust removal function and the deodorizing function, for example.

Parts may be provided in the filter frame 182 such that the filter frame is mounted to the moving plate 190 to be described below. A first holding piece 189 may be provided on the upper end of the filter frame 182. As illustrated in FIG. 14, the first holding piece 189 may be formed by extending longitudinally in the width direction of the filter frame 182. A holding step **189*h* may be formed in the front end of the first holding piece 189** by protruding therefrom.

A second holding piece 189' may be provided on the lower end of the filter frame 182. The second holding piece 189' may extend parallel to the first holding piece 189. A holding step **189'*h* may be formed evenly in the front end of the second holding piece 189'** by protruding therefrom.

The configuration of the moving plate 190 will be described with reference to FIGS. 16 and 17. The moving plate 190 may be installed in the entrance hole 108 of the rear end frame 106. The moving plate 190 may have a shape of a plate. The moving plate 190 may have a shape corresponding to the shape of the upper end of the rear end frame 106. The through hole 192 may be formed in the moving plate 190. The through hole 192 may function to communicate the air entrance 168 of the fan housing 162 with the third through hole 187' of the filter frame 182. The through hole 192 may have the same shape and size as the shape and size of the third through hole 187'.

A first holding rib 194 may be formed by extending on a first surface of the moving plate 190 in a horizontal direction thereof. The first holding rib 194 may extend longitudinally in the horizontal direction of the moving plate 190, and the front end of the first holding rib may be formed by protruding downward. A predetermined gap may be defined between the first holding rib 194 and the surface of the moving plate 190, and a first holding channel 196 may be formed in the gap. The holding step **189*h* located in the first holding piece 189 of the filter frame 182 may be inserted into the first holding channel 196 and be moved therein. The first holding channel 196 may be formed up to a side edge of the moving plate 190**.

A second holding rib 194' may be formed by extending on the first surface of the moving plate 190 in the horizontal direction thereof so as to be parallel to the first holding rib 194. The second holding rib 194' may be located at a position lower than the first holding rib 194. A gap may be defined between the second holding rib 194' and the moving plate 190, and a second holding channel 196' may be formed in the gap. The second holding channel 196' may be formed up to the side edge of the moving plate 190. The first holding rib 194 and the second holding rib 194' may be formed on the surface of the moving plate facing the filter frame 182.

A first rack gear 198 and a second rack gear 198' may be formed in a second surface of the moving plate 190. The first rack gear 198 and the second rack gear 198' may extend parallel to each other. The first rack gear 198 and the second rack gear 198' may receive power to move the moving plate 190. Each of the sections in which the first rack gear 198 and the second rack gear 198' are formed may be formed to have a length slightly longer than the moving distance of the moving plate 190.

Each of a first moving guide 200 and a second moving guide 200' may be provided on the surface opposite to the surface in which the first holding rib 194 and the second holding rib 194' are formed. The first moving guide 200 may move by being guided along a first guide rail 202 installed in the rear end frame 106. The second moving guide 200' may move by being guided along a second guide rail 202' installed in the rear end frame 106. Each of the first moving guide 200 and the second moving guide 200' may be configured to surround in the width direction on opposite sides of each of the first guide rail 202 and the second guide rail 202'. Each of the first guide rail 202 and the second guide rail 202' may be formed to have a length slightly longer than the moving distance of the moving plate 190.

Unlike the illustrated embodiment, the first moving guide 200 and the second moving guide 200' may be installed in the rear end frame 106, and the first guide rail 202 and the second guide rail 202' may be installed in the moving plate 190. The first guide rail 202 and the second guide rail 202' may be configured to be parallel to each other and to be spaced apart by a predetermined distance from each other. This is intended for the moving plate 190 to move more stably. Particularly, the installed positions of the first moving guide 200 and the second moving guide 200' may be different from each other in the width direction of the moving plate 190. In the illustrated embodiment, in the width direction of the moving plate 190, the first moving guide 200 may be located at a position closer to the first and second rack gears 198 and 198' than the second moving guide 200', and the second moving guide 200' may be located at a position farther from the first and second rack gears 198 and 198' than the first moving guide 200. Each of the first moving guide 200 and the second moving guide 200' may be located at a position opposite to each other on the moving plate 190 in the width direction thereof.

To move the filter assembly 180 relative to the rear end frame 106, a filter motor 204 may be used. In the embodiment, the moving plate 190 to which the filter assembly 180 is mounted may be moved. Alternatively, the filter assembly 180 may be directly moved. In this case, the first rack gear 198 and the second rack gear 198' receiving the driving force of the filter motor 204 may be provided in the filter frame 182, and the configuration for guiding the movement of the filter frame 182 may be provided in the rear end frame 106 or the fan housing 162.

An electric motor may be used as the filter motor 204. A first pinion gear 206 may be mounted to the output shaft of the filter motor 204. The first pinion gear 206 may be operated in engagement with the first rack gear 198. An interlocking shaft 208 may be provided to rotate integrally with the first pinion gear 206 concentrically with the output shaft of the filter motor 204, and a second pinion gear 206' may be mounted to the interlocking shaft 208. The second pinion gear 206' may be operated in engagement with the second rack gear 198'.

While the first and second pinion gears 206 and 206' are rotated by the operation of the filter motor 204, the first and second pinion gears 206 and 206' may operate in cooperation with the first and second rack gears 198 and 198'. In this case, when the main body 100 is viewed from the front thereof, the moving plate 190 may be moved horizontally relative to the rear end frame 106. In the illustrated embodiment, as illustrated in FIG. 18, when the main body 100 is viewed from the front, the moving plate 190 may protrude by a predetermined distance from the right side surface of the main body 100. The protruding length of the moving plate 190 from the main body 100 may be approximately 30 mm. This may be considered as a minimum value in which a user can apply force to the filter frame 182 to remove the filter frame 182 from the moving plate 190 by holding the filter frame 182.

At normal time, the moving plate 190 may be located at a position corresponding to the entrance hole 108 of the rear end frame 106 (see FIG. 19A). When the maintenance of the filter assembly 180 is required, by a user's manipulation, the moving plate 190 may be moved to protrude by a predetermined length from the side of the main body 100 by the control of the controller 122 (see FIG. 19B)

The filter frame 182 may be mounted to the moving plate 190, and when the moving plate 190 protrudes from the side of the main body 100, the removal of the filter frame 182 from the main body may be performed. When the filter frame 182 is removed from the main body, the maintenance of the first filter 184, the second filter 186, and the third filter 188 may be performed.

Removal of the filter frame 182 from the moving plate 190 may be performed by the removal of the holding steps **189*h* and 189'*h* of the filter frame 182 from the first and second holding channels 196 and 196' of the moving plate 190. When the user pulls the filter frame 182 in the protruding direction of the moving plate 190 from the main body 100, the holding steps 189*h* and 189'*h* may move along the first and second holding channels 196 and 196' of the moving plate 190, and may be removed from the first holding rib 194 and the second holding rib 194'. In this case, the filter frame 182 may be removed from the moving plate 190**.

When the maintenance of the filters 184, 186, and 188 located in the filter frame 182 is completed, the filter frame 182 may be mounted back to the moving plate 190. The mounting of the filter frame 182 to the moving plate 190 may be performed by moving the holding step **189*h* and the holding step 189'*h* after the holding step 189*h* is fitted to the first holding channel 196, and the holding step 189'*h* is fitted to the second holding channel 196'. When the filter frame 182 is moved to a position at which the holding step 189*h* is held in the first holding rib 194, and the holding step 189'*h* is held in the second holding rib 194', the filter frame 182 may be mounted to the moving plate 190**.

Moving the moving plate 190 such that the moving plate is brought back to the state thereof illustrated in FIG. 19A may be performed by the operation of the filter motor 204 by the controller 122 after a user manipulates the manipulation panel 124. When the filter motor 204 moves the first and second pinion gears 206 and 206' in the direction opposite to the direction of the movement of the moving plate described above, the moving plate 190 may be moved to a position corresponding to the entrance hole 108 by the engaged operation of the first and second pinion gears 206 and 206' with the first and second rack gears 198 and 198'. This state is the same as the state illustrated in FIG. 19A.

FIG. 20 illustrates the main body 100 from which the front plate 112 is removed. FIG. 21 illustrates a configuration of the drive assembly 210. The drive assembly 210 moving the moving bar 230 to be described below may be mainly installed in the installation space 150 of the duct 130. The installation space 150 may have a relatively small width in the middle and upper parts of the duct 130, and may have a relatively large width in the lower part of the duct 130. The controller 122 may also be located in the installation space 150 having the large width, in this case the lower part of the duct 130.

The drive assembly 210 installed in the installation space 150 may have a bar drive source 212. An electric motor may be used as the bar drive source 212. A first support 214 may be located adjacent to the bar drive source 212, and a second support 214' may be located at a position opposite to the first support 214. A lead screw 216 may be rotatably supported by the first support 214 and the second support 214'. Each end part of the lead screw 216 may be rotatably supported by the first support 214 and the second support 214'. The second support 214' may be fixed to the rear end frame 106 at a position adjacent to the controller 122. In another embodiment, the bar drive source 212 may be located at the lower end of the lead screw 216 and thus may be located adjacent to the controller 122.

The moving bar 230 to be described below may move up and down in the section of a threaded part formed in the lead screw 216. The threaded part may be formed surrounding the outer surface of the lead screw 216, and a moving block 218 may be provided to move in cooperation with the threaded part. When the lead screw 216 rotates, the moving block 218 may move linearly along the lead screw 216.

A connection bracket 220 may be mounted to the moving block 218. The connection bracket 220 may extend longitudinally in a direction orthogonal to the moving direction of the moving block 218. The connection bracket 220 may have the shape of a plate extending longitudinally side to side. The middle part of the connection bracket 220 may be coupled to the moving block 218. The connection bracket 220 may move up and down together with the moving block 218. The connection bracket 220 may move in the space between the front plate 112 and the duct 130, and each of the opposite end parts of the connection bracket 220 may move along a position corresponding to the movement channel 121.

FIGS. 22 to 24 illustrate a drive assembly 210' of an example different from the example of the drive assembly 210 described above. The drive assembly 210' illustrated herein may allow the raising/lowering unit 225 to be moved up and down by the engaged operation of a raising/lowering rack gear 224 formed in a raising/lowering guide 222 with drive gears 228 and 228' provided in a raising/lowering unit 225.

The raising/lowering guide 222 may be installed vertically longitudinally in the installation space 150. The raising/lowering rack gear 224 may be formed along at least one side surface of the raising/lowering guide 222. A section in which the raising/lowering rack gear 224 is formed may be a part in which the moving bar 230 moves up and down. The raising/lowering guide 222 may be installed by being fixed to the rear end frame 106. The raising/lowering guide 222 may be formed to have an integrated raising/lowering guide as a whole, or may be formed by being divided into several raising/lowering guides. The raising/lowering unit 225 to be described below may be located between the raising/lowering guide 222 and the front plate 112. Alternatively, the raising/lowering guide 222 may be coupled to a side of the front plate 112.

The raising/lowering unit 225 may be provided to move up and down along the raising/lowering guide 222. The raising/lowering unit 225 may move up and down along the raising/lowering guide 222, and the connection bracket 220 may be connected to a side of the outer surface of the raising/lowering unit 225. Due to the connection of the connection bracket 220 to the raising/lowering unit 225, the connection bracket 220 may cause the moving bar 230 to be described below to move up and down while the raising/lowering unit 225 is moving up and down.

A unit casing 225' may constitute the exterior of the raising/lowering unit 225. A guide channel 225" may be formed vertically longitudinally in the outer surface of a side of the unit casing 225'. The guide channel 225" may be formed to be open toward the outer surface of the side of the unit casing 225'. However, the guide channel 225" may be formed through the unit casing 225'.

Each of a pair of first guide rollers 226 and a pair of second guide rollers 226' may be provided to have a portion thereof exposed to the inner surfaces of the opposite sides of the guide channel 225". The pair of first guide rollers 226 may be located at a first end part of the guide channel 225", and the pair of second guide rollers 226' may be located at a second end part of the guide channel 225". A distance between the pair of first guide rollers 226 and the pair of second guide rollers 226' should be set maximally apart in the unit casing 225'. This is intended to allow the raising/lowering unit 225 to stably move without shaking relative to the raising/lowering guide 222.

A first bar drive source 227 and a second bar drive source 227' may be provided inside the unit casing 225'. The first bar drive source 227 may include an output gear (not shown) and a first drive gear 228 engaging with the output gear. The first drive gear 228 may operate in engagement with the raising/lowering rack gear 224 located at a first side of the raising/lowering guide 222. The second bar drive source 227' may include an output gear (not shown) and a second drive gear 228' engaging with the output gear. The second drive gear 228' may operate in engagement with the raising/lowering rack gear 224 located at a second side of the raising/lowering guide 222. To this end, a portion of the gear teeth of each of the first drive gear 228 and the second drive gear 228' may protrude toward the guide channel 225", and may engage with the raising/lowering rack gear 224 located in the guide channel 225".

The first bar drive source 227 and the first drive gear 228, and the second bar drive source 227' and the second drive gear 228' may be installed symmetrically to each other at opposite sides of the guide channel 225" relative thereto. Accordingly, when the first bar drive source 227 and the first drive gear 228, and the second bar drive source 227' and the second drive gear 228' are installed symmetrically to each other, the engagement of the first drive gear 228 and the raising/lowering rack gear 224 at the first side of the raising/lowering guide 222, and the engagement of the second drive gear 228' and the raising/lowering rack gear 224 at the second side thereof may be performed in a more balanced way, thereby generating a larger driving force for moving the raising/lowering unit 225 up and down.

In FIG. 22, the guide channel 225" may be located at a side of the raising/lowering unit 225 at which the connection bracket 220 is connected to the raising/lowering unit 225. Alternatively, the guide channel 225" may be located at a side of the raising/lowering unit 225 opposite to the side thereof at which the connection bracket 220 is connected to the raising/lowering unit 225, and the raising/lowering guide 222 may be located in the guide channel 225". In this case, the raising/lowering guide 222 may be located in the installation space 150 of the duct 130. Accordingly, the front to rear thickness of the main body 100 may be reduced.

Meanwhile, FIG. 25 illustrates still another example of the drive assembly in which the raising/lowering unit 225 is moved up and down by using only one raising/lowering rack gear 224 located at a side of the raising/lowering guide 222. Here, the pair of first guide rollers 226 and the pair of second guide rollers 226' are used in the same way as the pair of first guide rollers 226 and the pair of second guide rollers 226' according to the example described above, and supplying a driving force for raising and lowering the raising/lowering unit 225 may be performed only by the first bar drive source 227. Accordingly, when the driving force is supplied only by the first bar drive source 227 and the first drive gear 228 in the raising/lowering unit 225, the width of the unit casing 225' of the raising/lowering unit 225 may be reduced.

To reduce the front-to-rear thickness of the main body 100 in the embodiment in which the raising/lowering unit 225 moves up and down along the raising/lowering guide 222, at least a portion of the front-to-rear thickness of the raising/lowering unit 225 should be located in the installation space 150. To this end, compared to the case in which the drive assembly 210 illustrated in FIG. 20 is used, the width of the installation space 150 of the duct 130 may be larger. That is, the width of the installation space 150 may be such that the raising/lowering unit 225 is located therein and moved. Of course, the installation space 150 may have a shape thereof in which the raising/lowering guide 222 is located in the installation space 150, or a portion of the front-to-rear thickness of the unit casing 225' of the raising/lowering unit 225 is located in the installation space 150. When a part corresponding to a portion of the front-to-rear thickness of the raising/lowering unit 225 is located in the installation space 150, the remaining portion of the front-to-rear thickness of the raising/lowering unit 225 may be located between the duct 130 and the front plate 112. In this case, the front-to-rear thickness of the duct 130 should be relatively small.

The moving bar 230 will be described with reference to FIGS. 26 to 32. The moving bar 230 may introduce and discharge outside air apart from the air discharged after being introduced by the fan assembly 160. The maximum speed of the air discharged by the moving bar 230 may be set to be faster than the maximum speed of the air discharged through the outlets 136. The difference between the speeds of air may be approximately two times. For example, the speed of air discharged by the moving bar 230 may be approximately 10 m/s, and the speed of air discharged through the outlets 136 may be approximately 6 m/s. Of course, the speed of the air discharged by the moving bar 230 and the speed of the air discharged through the outlets 136 may be controlled by being divided into several levels.

FIGS. 26 and 27 illustrate an exterior of the moving bar 230. The moving bar 230 may be located by being spaced apart by a predetermined distance from the front plate 112. When the main body 100 is viewed from the front thereof, the moving bar 230 may extend horizontally longitudinally. Each of the opposite end parts of the moving bar 230 may be connected to the connection bracket 220 through the movement channel 121. In the illustrated embodiment, the moving bar 230 may be configured to have a hexahedral shape except for the opposite end parts thereof. However, the exterior of the moving bar 230 may be configured to have various shapes in addition to the shape illustrated. For example, the moving bar 230 may be configured to have a cylindrical shape except for the opposite end parts thereof. Alternatively, the moving bar 230 may be configured to have a polygonal column shape except for the opposite end parts thereof.

A bar casing 232 may constitute the exterior of the moving bar 230. The bar casing 232 may constitute the front, upper, rear, and opposite side surfaces of the moving bar 230. A bar space 234 in which various parts to be described below can be located may be defined inside the bar casing 232. The bar space 234 may be open toward the lower part of the bar casing 232. The open part of the bar space 234 may be covered by a bar cover 242 to be described below.

The bar space 234 may be open toward other parts of the bar casing 232 except toward the lower part thereof. For example, the bar space 234 may be open toward the rear surface of the bar casing 232, and may be covered by the bar cover corresponding to the open shape of the bar space. The open part of the bar space 234 may be configured to be insignificantly influenced by the moisture present in the space in which the main body 100 is installed. The open direction of the bar casing 232 may be set so as to minimize the introduction of water delivered from the vicinity of the moving bar 230 into the bar space 234 located inside he moving bar 230.

The front surface 236 of the bar casing 232 may constitute the exterior of the front surface of the moving bar 230. When viewed from the front of the main body 100, the front surface 236 may have a rectangular shape longitudinal from side to side. Each of the opposite ends of the front surface 236 may have a curved surface, and may be connected to the side surfaces 236' of the bar casing 232. The upper surface 237 of the bar casing 232 may be almost orthogonal to the front surface 236. The upper surface 237 may constitute the exterior of the upper surface of the moving bar 230. As illustrated in FIG. 30, the upper surface 237 may have a downward inclination toward the rear surface 238 of the bar casing 232. When the upper surface 237 has the downward inclination toward the rear of the moving bar 230, moisture delivered to the upper surface 237 may not move toward a user, but may be moved toward the rear of the moving bar 230. The planar shape of the upper surface 237 may be the same as the planar shape of the bar cover 242 to be described below.

The rear surface 238 of the bar casing 232 may constitute the exterior of the rear surface of the moving bar 230. The shape of the rear surface 238 may be the same as the shape of the combination of the front surface 236 and the side surfaces 236'. That is, the front surface 236, side surfaces 236', upper surface 237, and rear surface 238 of the bar casing 232 may allow the bar space 234 to be open at the lower part of the bar casing 232, so that water delivered from the outside may be effectively prevented from being introduced into the bar space 234.

A casing step 239 may be formed at a lower end part of each of the front surface 236, the side surfaces 236', and the rear surface 238 of the bar casing 232. The casing step 239 and a cover step 244 of the bar cover 242 to be described below may have a step structure to be coupled to each other. The protruding part of the casing step 239 may be located at the outer side of the bar casing 232. The protruding part of the cover step 244 may be located at the inner side of the casing step 239. Accordingly, when the protruding part of the casing step 239 is located at the outer side of the bar casing, moisture may be prevented from being introduced into the bar casing through the combined part of the bar casing 232 and the bar cover 242.

A separate gasket may be provided between the casing step 239 and the cover step 244. The gasket may be made of an elastic material, and thus when the bar casing 232 and the bar cover 242 are coupled to each other, the gasket may allow the bar casing 232 and the bar cover 242 to be in close contact with each other and be watertight therebetween.

A connection piece 240 may be provided on each of the opposite end parts of the bar casing 232. The connection piece 240 may extend from each of the opposite end parts of the bar casing 232 toward the movement channel 121 of the main body 100. The connection piece 240 may be formed to be integrated with the bar casing 232. The connection piece 240 may have a part to be coupled to the connection bracket 220. The coupling of the connection piece 240 and the connection bracket 220 may be performed in various ways. For example, the connection piece 240 and the connection bracket 220 may be coupled to each other by using screws or using a snap coupling structure.

The bar cover 242 may be installed on the lower part of the bar casing 232. The bar cover 242 may shield the bar space 234 defined inside the bar casing 232 from the outside. The bar cover 242 may have a shape of a plate, and may have a shape corresponding to the entrance of the bar space 234 of the bar casing 232. The cover step 244 may be formed along the edge of the bar cover 242. The cover step 244 may be coupled to the casing step 239, and the protruding thereof may be located at the inner side of the bar cover 242. Accordingly, the protruding part of the cover step 244 may be coupled to the protruding part of the casing step 239 located at the outer side than the protruding part of the cover step.

An inclining surface 245 may be formed on the front end of the bar cover 242. The inclining surface 245 may be formed up to the opposite ends of the bar cover 242. When the moving bar 230 is mounted to the main body 100, the inclining surface 245 may be configured to be directed toward the front lower part of the main body 100. A nozzle slot 245' may be formed in the inclining surface 245. The nozzle slot 245' may be formed along the inclining surface 245 at an area corresponding to the front surface 236 of the moving bar 230. Due to the formation of the inclining surface 245, the nozzle slot 245' may be open toward the front lower part of the main body 100. Air introduced into the moving bar 230 may be discharged through the nozzle slot 245'.

In the illustrated embodiment, the nozzle slot 245' is formed by being divided into four nozzle slots. However, the nozzle slot 245' may be formed as one nozzle slot as a whole. Alternatively, the nozzle slot 245' may be formed by being divided into the appropriate number of nozzle slots in consideration of the rigidity of the inclining surface 245. The interval between the nozzle slots 245' may be set such that the flow of discharging air is not prevented, and the rigidity of the inclining surface 245 is maintained.

The side-to-side width of the nozzle slot 245' may be approximately 200 mm. The side-to-side width of the nozzle slot 245' may be set in consideration of the width of a user's body. The side-to-side width of the nozzle slot 245' may be set such that the air discharged through the nozzle slot 245' may spread and be delivered to a user's body located in the front of the main body 100 to blow down moisture on the user's body.

The up-to-down width of the nozzle slot 245' may be ranged between 1.8 mm and 2.2 mm, and may be appropriately 2 mm. The up-to-down width of the nozzle slot 245' may be set in consideration of noise occurring when the air is discharged through the nozzle slot 245'. When the up-to-down width of the nozzle slot 245' is smaller than 1.8 mm, the noise of the discharging air may be increased. When the up-to-down width of the nozzle slot 245' is larger than 2.2.mm, the speed of the discharging air may be decreased, and thus the function of sweeping down moisture on a user's body may be deteriorated.

In the illustrated embodiment, the inclining surface 245 is formed on the bar cover 242. Alternatively, the inclining surface 245 may be configured to be integrated with the bar casing 232. The inclining surface 245 may be manufactured separately from the bar casing 232 or the bar cover 242. The inclining surface 245 may be slantingly formed in a section corresponding to the width of the front surface 236 on the lower end of the front surface 236 of the moving bar 230.

Instead of forming the nozzle slot 245' in the inclining surface 245, the structure of the nozzle slot allowing the air to be slantingly discharged toward the front lower part of the main body 100 may be variously employed on the outer surface of the moving bar 230. For example, the nozzle slot 245' may be formed in a structure protruding forward from the outer surface of the moving bar 230, and may slantingly discharge air toward the front lower part of the main body 100. Alternatively, the inner surface of the nozzle slot 245' may be formed slantingly on the front surface 236 of the moving bar 230 such that the air is slantingly discharged toward the front lower part of the main body 100. Alternatively, the inner surface of the nozzle slot 245' may be slantingly formed on the bar cover 242 which is the lower surface of the moving bar 230 such that the air is slantingly discharged toward the front lower part of the main body 100.

Multiple fastening bosses 246 may be formed on the upper surface of the bar cover 242 by protruding therefrom. Each of the fastening bosses 246 is intended to fasten the bar cover to the bar casing 232. For example, a screw may be inserted to the lower surface of the bar cover 242, which passes through the fastening boss 246, and be fastened to the bar casing 232. To this end, a fastening hole 246' may be formed through the fastening boss 246. The fastening hole 246' may be open to the lower surface of the bar cover 242, and the upper part of the fastening boss 246 may be open to the inside of the bar space 234, so that moisture from the outside may be prevented from being introduced to the bar casing.

An inlet 248 may be formed at a side of the bar cover 242. In the embodiment, the inlet 248 may be located at a position corresponding to the left side of the moving bar 230 relative to the drawing (see FIG. 27). The formed position of the inlet 248 may be determined in consideration of the flow distance of the air inside the bar space 234. To prevent external moisture from being introduced to the moving bar through the inlet 248, the inlet 248 may be configured to be directed toward the direction of gravity downward from the moving bar 230. In the illustrated embodiment, the inlet 248 is formed in the bar cover 242 such that the inlet is directed toward the floor surface.

In addition, the inlet 248 may be formed to be adjacent to an end part of a first side of the moving bar 230 which extends longitudinally side to side. This is intended to install the bar fan assembly 250, an air guide 270, and a discharge nozzle 278 to be described below inside the moving bar 230 such that the air flows and is discharged through the nozzle slot 245' of the moving bar 230. That is, the formation of the inlet at the first side of the moving bar is intended to slimly design the moving bar 230, to arrange necessary parts in the bar space 234, and to facilitate the flow of air. To this end, the inlet 248 may be formed in the lower surface of the end portion of the moving bar 230.

As for an alternative configuration of the moving bar 230 in relation to the inlet 248, the inlet 248 may be formed in a lower surface corresponding to the end part of the right side of the moving bar 230. In this case, the bar fan assembly 250 and the air guide 270 installed in the bar space 234 are arranged at positions opposite to the positions of the bar fan assembly and the air guide according to the illustrated embodiment.

Filters may be provided in the inlet 248 to purify the introduced air. Various kinds of filters may be installed in the inlet 248. For example, a filter for removing foreign matter such as dust, and a filter for removing odor in the air may be installed in the inlet. The filters may be removably installed in the inlet 248.

The bar fan assembly 250 may be installed to be adjacent to the inlet 248 in the bar space 234. The bar fan assembly 250 may introduce outside air through the inlet 248 and may discharge the air to the outside of the moving bar 230 through the nozzle slot 245'.

There may be a predetermined distance between the bar fan assembly 250 and the inlet 248. As illustrated in FIG. 32, an interval may be defined between an entrance of the bar fan assembly 250 and a side edge of the inlet 248. Due to the presence of the interval, outside air introduced through the inlet 248 by the bar fan assembly 250 may flow to the bar fan 256 in parallel to the direction of the shaft of the bar fan 256 of the bar fan assembly 250. Such a flow may decrease generation of noise in the bar fan 256.

A fan casing 252 may constitute the exterior of the bar fan assembly 250. The fan casing 252 may be configured to have a cylindrical shape. The fan casing 252 may be open at opposite ends thereof and air may be introduced to a first side of the fan casing and may be discharged to a second side thereof. A bar fan motor 254 may be installed inside the fan casing 252. The bar fan motor 254 may supply a rotational force to the bar fan 256. The bar fan 256 may be connected to the rotating shaft of the bar fan motor 254. The bar fan 256 may be located inside the fan casing 252. The bar fan 256 may introduce air in the direction of the axis of a rotational center thereof, and discharge the air in the same direction. That is, air may be introduced through an end portion of the fan casing 252 and may be discharged through an opposite end portion thereof.

A buffer cover 258 surrounding the outer surface of the fan casing 252 may be provided. The buffer cover 258 may be made of an elastic material such as rubber. The buffer cover 258 may be configured to have a cylindrical shape at least in an inner surface thereof so as to surround the fan casing 252. That is, the inner surface of the buffer cover 258 may be configured to have a shape corresponding to the shape of the outer surface of the fan casing 252 such that the outer surface of the fan casing 252 may be in close contact with the inner surface of the buffer cover 258. In the illustrated embodiment, the outer surface of the buffer cover 258 is also configured to have a cylindrical shape. Alternatively, the outer surface of the buffer cover 258 may be configured to have a shape allowing the outer surface of the buffer cover to be in close contact with the inner surface of the bar space 234. A protrusion may be provided on the outer surface of the buffer cover 258 to minimize a contact area with the inner surface of each of first and second spacers 260 and 260' to be described below.

The first spacer 260 and the second spacer 260' surrounding the buffer cover 258 may be used in the moving bar 230. A first seat groove 262 may be formed in the first spacer 260, and a second seat groove 264 may be formed in the second spacer 260'. Each of the first seat groove 262 and the second seat groove 264 may be formed to have a shape being in close contact with the outer surface of the fan casing 252. For example, the shape of the combination of the first seat groove 262 and the second seat groove 264 may correspond to the shape of the fan casing 252 or the buffer cover 258. The first spacer 260 and the second spacer 260' may be made of an elastic material such as rubber. The first spacer 260 and the second spacer 260' may be bonded to each other by adhesive. The first spacer 260 and the second spacer 260' may be fixed to the bar casing 232 or the bar cover 242 in various ways. For example, adhesive may be used, or a separate fastening bracket surrounding the first spacer 260 and the second spacer 260' may be used.

A nozzle groove 266 may be formed at a side of the second spacer 260'. The nozzle groove 266 may be a part in which a section of the discharge nozzle 278 to be described below sits. The shape of the nozzle groove 266 may be formed such that the discharge nozzle 278 is press-fitted and installed therein. At least a portion of the remaining surfaces except for the front surface of the discharge nozzle 278 may be in close contact with the inner surface of the nozzle groove 266. A portion of the discharge nozzle 278 may sit in and be supported by the nozzle groove 266, so that the vibration and noise occurring during the discharge of air through the discharge nozzle 278 may be reduced.

The second heater 268 may be mounted to an end part of the bar fan assembly 250. The second heater 268 may supply heat to set the temperature of air introduced by the bar fan assembly 250. The second heater 268 may be installed inside the end part of the fan casing 252 by being made in a circular shape. Alternatively, the second heater 268 may be located between the fan casing 252 and the air guide 270 to be described below.

The air guide 270 may be mounted to the second end part of the bar fan assembly 250 by being connected thereto. The air guide 270 may function to guide the air discharged through the bar fan assembly 250. The air guide 270 may include a guide flow space 272 formed therein. The guide flow space 272 may be a space in which the air flows. The flow cross-sectional area of the guide flow space 272 may decrease toward a position gradually while becoming farther from the bar fan assembly 250. In the illustrated embodiment, a portion of the air guide 270 may have a cylindrical shape, and the remaining portion thereof may have a semi-cylindrical shape. However, the air guide 270 may have any shape as long as the flow cross-sectional area of the guide flow space 272 is gradually decreased toward the lower flow part 275 after having a predetermined section of the upper flow part 274.

Here, the flow cross-sectional area of the upper flow part 274 of the guide flow space 272 adjacent to the bar fan assembly 250 may be formed to be larger than the flow cross-sectional area of the lower flow part 275 of the guide flow space 272 such that the air delivered to a nozzle flow path 282 of the discharge nozzle 278 by passing through the guide flow space 272 flows in almost the same air volume and speed in the entire section of the nozzle flow path 282. Furthermore, the air flow generated by the bar fan assembly 250 may be facilitated in the guide flow space 272 such that the generation of noise can be reduced in the bar fan assembly 250. The structure of the guide flow space 272 having the flow cross-sectional area gradually decreasing toward the lower flow part 275 of the guide flow space 272 may cause the air flow to be facilitated.

A first communication slot 276 may be formed in the air guide 270 so as to deliver air from the guide flow space 272 to the discharge nozzle 278. As illustrated in FIG. 29, the first communication slot 276 may be formed in the area of the entire length of the air guide 270. The area in which the first communication slot 276 is formed may correspond to the area of a second communication slot 280 of the discharge nozzle 278. That is, the first communication slot 276 of the air guide 270 and the second communication slot 280 of the discharge nozzle 278 may correspond to each other. Alternatively, the formation area of the first communication slot 276 may be wider than the formation area of the second communication slot 280. The first communication slot 276 may be open toward the front lower part of the moving bar when the moving bar 230 is viewed from the front thereof.

Air flowing through the first communication slot 276 by flowing through the air guide 270 may be delivered to the discharge nozzle 278. The discharge nozzle 278 may allow the air to be discharged to the outside through the nozzle slot 245' of the moving bar 230. The discharge nozzle 278 may extend longitudinally side to side, and have a cross section having an approximately rectangular shape. The discharge nozzle 276 may guide the air such that the air is discharged through the entirety of the nozzle slot 245'.

The second communication slot 280 communicating with the first communication slot 276 may be provided in the discharge nozzle 278. The second communication slot 280 may be formed through the discharge nozzle 278. The second communication slot 280 may be formed by extending by a predetermined length in the side-to-side direction of the nozzle slot 245' from the center thereof.

The nozzle flow path 282 may be formed in the entire area of the front surface of the discharge nozzle 278. The nozzle flow path 282 may be connected to the second communication slot 280, and may be formed in the entire area of the front surface of the discharge nozzle 278. A predetermined area of the middle of the nozzle flow path 282 may be directly connected to the second communication slot 280. The opposite end parts of the nozzle flow path 282 may not be connected directly to the second communication slot 280, but the nozzle flow path 282 may be connected to the second communication slot 280 through the other part of the nozzle flow path 282 communicating with the second communication slot 280. The up-to-down width and side-to-side width of the nozzle flow path 282 may be the same as the up-to-down width and side-to-side width of the nozzle slot 245', respectively.

The middle of the side-to-side direction of the first communication slot 276 of the air guide 270, the middle of the side-to-side direction of the second communication slot 280, and the middle of the side-to-side direction of the nozzle slot 245' may correspond to each other. The middle of the side-to-side direction of the first communication slot 276 may correspond to a part in which the flow cross-sectional area starts decreasing in the guide flow space 272.

The partition wall 284 may be provided at a side of the upper surface of the bar cover 242. The partition wall 284 may define hexahedral space having at least one open side. In FIG. 33, the partition wall 284 defines a hexahedral space being open in an upper part, a lower part, and a side surface thereof. For example, a second sensor 286 may be installed at a position adjacent to the space defined by the partition wall 284, the second sensor performing detection for information to control the movement of the moving bar 230.

The second sensor 286 may be arranged to face a position lower than the moving bar 230, and may detect whether there is an object under the moving bar 230 and may detect a distance between the moving bar and the object. For example, when the user's hands are placed under the moving bar 230, the second sensor 286 may detect the hand, and may detect a distance between the moving bar and the hand. As the second sensor 286, a LiDAR, an ultrasonic sensor, or a laser sensor may be used. Information detected by the second sensor 286 may be transmitted to the controller 122.

The controller 122 may drive the bar drive source 212 on the basis of a distance detected by the second sensor 286, and may adjust the position of the moving bar 230. The moving bar 230 may be moved up and down by the bar drive source 212, and thus the position thereof may be adjusted. For example, when a detected distance between the moving bar and the hands is longer than a preset reference distance, the position of the moving bar 230 may be adjusted such that the moving bar is located within the range of the reference distance. Further, when a detected distance between the moving bar and the hands is within the reference distance, the present detected distance may be maintained, or the position of the moving bar 230 may be adjusted such that the present detected distance meets the reference distance. The second sensor 286 may be installed by protruding from the lower surface of the moving bar 230, or may be installed in a mounting groove formed in the lower surface of the moving bar. Here, the controller 122 may drive the bar drive source 212 to allow the moving bar 230 to be moved up and down. Throughout the present disclosure, "the controller 122 moves, or raises/lowers the moving bar 230" means "the controller 122 moves the moving bar 230 up and down by driving or operating the bar drive source 212". Furthermore, "raises/lowers" may include "moves up" and "moves down".

In the moving bar 230, the inlet 248 may be configured to have a flow cross-sectional area larger than the flow cross-sectional area of the entrance of the bar fan assembly 250. The flow cross-sectional area of the exit of the bar fan assembly 250 may be larger than the flow cross-sectional area of the nozzle slot 245'. Accordingly, since the flow cross-sectional area of the nozzle slot 245' is smaller than the flow cross-sectional area of the exit of the bar fan assembly 250, it may be easy to set the speed and volume of the air discharged through the nozzle slot 245' at desired values.

FIGS. 33 and 34 illustrate another embodiment of the moving bar 230'. The moving bar 230' may be removed from the main body 100 and may be used individually. Like a hair dryer, the moving bar 230' may be used by being removed from the main body 100 by a user. To use the moving bar 230' individually, a power source for the operation of the bar fan assembly 250 is required.

Of course, a power line (not shown) extending from the main body 100 may be configured to supply the power to the moving bar 230' from the main body 100. In this case, when the moving bar 230' is removed from the main body 100, the power line may extend long from the main body, and a user may freely use the moving bar within the range of the extending length of the power line by removing the moving bar 230' from the main body 100. In this case, the power line may pass through the connection piece 240 and extend to the bar space 234. The power line may pass through the movement channel 121 and extend to the inside of the main body 100. A cord reel for automatically winding and unwinding the power line may be located inside the moving bar 230' or the main body 100.

As illustrated in FIG. 33, a battery 290 may be installed inside the bar space 234 such that a user may freely carry and use the moving bar with the moving bar 230' removed completely from the main body 100. In the bar space 234, the battery 290 may be installed at a position opposite to the installation position of the bar fan assembly 250.

The moving bar 230' mounted removably to a connection bracket 220' in the main body 100 will be described with reference to FIG. 34. An entirety or a portion of the connection bracket 220' may be made of metal. The connection bracket 220' may move together with the moving bar 230', and may be light weight. To reduce the weight of the connection bracket 220', the entirety of the connection bracket 220' may be made of synthetic resin, and metal or a magnet may be placed inside a portion of the connection bracket 220'. A fastening piece 221' may be located at each of the opposite ends of the connection bracket 220'. The fastening piece 221' may be arranged approximately orthogonally to the end of the connection bracket 220'. A distance between the fastening pieces 221' located on the opposite ends of the connection bracket 220' may be slightly shorter than a distance between the connection pieces 240 located on the opposite ends of the moving bar 230'. The connection pieces 240 may be coupled to the fastening pieces 221' by press fit.

In addition, a support end 221" may be provided on the lower end of the fastening piece 221'. The support end 221" may support the lower end of the connection piece 240 of the moving bar 230' such that the moving bar 230' may be supported by the connection bracket 220'. In another example of the support end 221", the support end 221" may have an L-shaped section, and the connection piece 240 of the moving bar 230' may be coupled to a position between the fastening piece 221' and the support end 221" by press fit.

Although not shown, alternatively, a part similar to the support end 221" may be provided even on the upper end of the fastening piece 221'. In this case, the part similar to the support end 221" and the support end 221" of the fastening piece 221' may be located on the upper end and lower end of the connection piece 240, respectively, and may secure the connection piece 240. Alternatively, the support end 221" and the part similar thereto may be located on at least one side of the upper end and the lower end of the fastening piece 221'. Further alternatively, the support end 221" and the part similar thereto may be provided on the connection piece 240, and may be used to couple the connection piece 240 to the fastening piece 221'.

Meanwhile, with the support end 221" or without the support end 221", the fastening piece 221' and the connection piece 240 may be coupled to each other by a magnetic force. For example, metal may be provided in the entirety or portion of the fastening piece 221', and a magnet 241 may be provided in the connection piece 240. Alternatively, the magnet 241 may be provided in each of the fastening piece 221' and the connection piece 240. Further alternatively, metal may be provided in the connection piece 240, and the magnet 241 may be provided in the fastening piece 221'. Since the magnet is provided such a manner, mounting and removing the moving bar 230' to and from the connection bracket 220' may be simply performed.

In the illustrated embodiment, the magnet 241 is installed inside the connection piece 240, and the fastening piece 221' is made of metal. For example, locating the magnet 241 inside the connection piece 240 may be performed by using an insert mold process. Alternatively, the magnet may be fixed in a groove formed at a side of the connection piece 240.

FIGS. 35 to 37 illustrate another embodiment of the drying apparatus. In the description of the embodiment, for convenience, parts having the same functions as the functions of the parts of the above-described embodiment may have the same reference numerals even though the structures are different from each other.

FIG. 35 illustrates a front perspective view of the drying apparatus according to another embodiment of the present disclosure; FIG. 36 is a rear view of an inner configuration of the drying apparatus illustrated in FIG. 35; and FIG. 37 illustrates a side view and enlarged partial sectional views of the configuration of the drying apparatus illustrated in FIG. 35.

In the embodiment, the fan receiving part 104 may be located at the lower part of the main body 100. As illustrated in FIG. 35, the fan receiving part 104 may be located at the lower part of the main body 100, and each of the lower part of the front end frame 102 at which the fan receiving part 104 is located and the upper part of the front end frame 102 may protrude forward.

As illustrated in the upper enlarged view of FIG. 37, the upper part of the front end frame 102 protrudes forward such that air is discharged toward the front lower part of the main body from the upper part of the front end frame 102, and the first vane 118 and the second vane 120 may extend at the lower portion of the upper part of the front end frame 102 by inclining toward the front lower part of the main body. Air flowing through the duct 130 may be discharged between the first vane 118 and the second vane 120 and may be discharged to a user's head. The air may be discharged between the first vane 118 and the second vane 120 through the outlets 136 formed in the duct cover 134 of the duct 130. The air discharged through the outlets 136 may be guided by the first vane 118 and the second vane 120, and may be discharged toward the front lower part of the main body. Here, as illustrated in FIG. 35, the front plate 112 may be configured to have the curved part 116 formed on each of the upper and lower ends thereof.

The fan assembly 160 may be installed in the fan receiving part 104. The fan housing 162 of the fan assembly 160 may have the air exit 169 directed toward the upper part of the main body 100. Air flowing through the fan assembly 160 may flow into the duct 130 through the air exit 169. In the embodiment, the duct entrance 138 of the duct 130 may be located at the lower part of the main body 100. Compared to the duct 130 used in the embodiment described above, the duct 130 may be installed upside down in the main body 100.

In the embodiment, the configuration of the duct 130 may be almost the same as the configuration of the duct according to the embodiment described above, except the direction of the installation of the duct may be reversed. As illustrated in FIG. 37, the duct 130 according to the embodiment may be made to have a relatively large front-to-rear width by corresponding to the protrusion of the front end frame 102 at the upper part of the main body. This is because the outlets 136 protrude more forward such that the air is delivered to the space between the first vane 118 and the second vane 120.

In this embodiment, the fan assembly 160 is the same as the fan assembly of the embodiment described above, except that the air exit 169 is directed to the upper part of the main body 100 from the lower part thereof. The filter assembly 180 may be installed on the rear surface of the fan receiving part 104. This may be no different from the case of the embodiment described above.

The moving bar 230 may be installed to move up and down along the front plate 112 of the main body 100. The configuration of the moving bar 230 may be the same as the configuration of the moving bar according to the embodiment described above. The configuration of the drive assembly 210 or 210' moving the moving bar 230 may be the same as the configuration of the drive assembly according to the embodiment described above.

The moving bar 230 may move up and down along the main body 100 due to the driving of the drive assembly 210 or 210'. The moving bar 230 may discharge air to a user's body. The moving bar 230 may be coupled to the connection bracket 220 of the drive assembly 210, and may move up and down together with the upward and downward movement of the connection bracket 220.

Meanwhile, in the embodiment, a structure in which the air is discharged at a position adjacent to the fan receiving part 104 will be described with reference to the lower enlarged view of FIG. 37. As illustrated in the enlarged view, the air exit 169 of the fan housing 162 may communicate directly with the duct entrance 138 of the duct 130. As illustrated in the enlarged view, the first vane 118 and the second vane 120 guiding air discharged through the outlets 136 adjacent to the duct entrance 138 may be configured toward the front of the main body to be parallel to each other. Alternatively, the first vane 118 and the second vane 120 may be configured to incline downward toward the front lower part of the main body 100. This is intended for the discharging air to be maximally delivered to a user's feet since the fan receiving part 104 is located at the lower part of the main body 100.

In the embodiment, the drying of a user's feet may be performed when the moving bar 230 is moved to the lowest part of the main body. The inclining surface 245 of the moving bar 230 may be directed toward the front lower part of the main body, and the air may be discharged toward the front lower part of the main body through the nozzle slot 245' located at the inclining surface 245.

FIG. 38 to FIG. 40 illustrate still another embodiment of the drying apparatus.

FIG. 38 illustrates a front perspective view of the drying apparatus according to the still another embodiment of the present disclosure; FIG. 39 is a rear view showing an inner configuration of the drying apparatus illustrated in FIG. 38; and FIG. 40 illustrates a side view and enlarged partial sectional views of the configuration of the drying apparatus illustrated in FIG. 38.

In the embodiment, the fan receiving part 104 may be located at a part corresponding to a position between the upper and lower parts of the main body 100. In the embodiment, as illustrated in FIG. 38, the fan receiving part 104 may be located at the middle part of the main body 100. In the embodiment, when the fan receiving part 104 is located at the middle portion of the main body 100, each of the middle part and the upper part of the front end frame 102 may protrude forward.

In the embodiment, a separate front plate 112 may be located on the front surface of the main body 100 in each of the upper and lower parts of the main body 100 relative to the fan receiving part 104. A separate duct 130 may be installed inside each of the upper and lower parts of the main body 100 relative to the fan receiving part 104 corresponding to the rear surface of the front plate 112.

In addition, the fan housing 162 of the fan assembly 160 installed in the fan receiving part 104 may have the air exit 169 formed therein in each of upward and downward directions. That is, the fan assembly may deliver the air simultaneously to the duct 130 located at the upper part of the main body 100 and to the duct 130 located at the lower part of the main body 100. Of course, according to the operation mode of the drying apparatus, the fan assembly may deliver air only to the duct 130 of the upper part, only to the duct 130 of the lower part, or to the duct 130 of each of the upper and lower parts.

As illustrated in the upper enlarged view of FIG. 40, the upper part of the front end frame 102 may protrude forward such that the air discharged through the upper part of the front end frame 102 is discharged toward the front lower part of the main body 100, and the first vane 118 and the second vane 120 may extend at the lower portion of the upper part of the front end frame by inclining toward the front lower part of the main body. Air flowing through the duct 130 may be discharged between the first vane 118 and the second vane 120 and may be discharged to a user's head. The air may be discharged between the first vane 118 and the second vane 120 through the outlets 136 formed in the duct cover 134 of the duct 130. The air discharged through the outlets 136 may be guided by the first vane 118 and the second vane 120 and may be discharged toward the front lower part of the main body.

Here, as for the configuration of the front plate 112 installed on the upper part of the main body 100, the curved part 116 may be formed on each of the upper and lower ends of the front plate 112 installed on the upper part of the main body as illustrated in FIG. 38. The front plate 112 installed on the lower part of the main body 100 may have the curved part 116 formed only on the upper end thereof as in the configuration of the front plate 112 used in the embodiment illustrated in FIG. 1.

Air flowing through the fan assembly 160 may flow into the duct 130 through the air exit 169. In the embodiment, the duct 130 may be arranged at each of the upper and lower parts of the main body 100 relative to the fan assembly 160. The duct 130 located at the upper part of the main body 100 may have the same structure and arrangement as the duct according to the embodiment illustrated in FIG. 35. The duct 130 located at the lower part of the main body 100 may have the same structure and arrangement as the duct according to the embodiment illustrated in FIG. 1.

In the embodiment, the filter assembly 180 may be mounted to the rear surface of the fan receiving part 104. That is, the filter assembly 180 may be mounted to the rear surface of the middle part of the main body 100. This is not different from the embodiment described above.

The moving bar 230 may be installed to move up and down along the front plate 112 of the main body 100. That is, the moving bar 230 may be installed to move along the front plate 112 installed on the upper part of the main body 100, and a separate moving bar 230 may be installed to move along the front plate 112 installed on the lower part of the main body 100. The configuration of the moving bar 230 may be the same as the configuration of the moving bar according to the embodiment described above. The configuration of the drive assembly 210 or 210' moving the moving bar 230 may be the same as the configuration of the drive assembly according to the embodiments described above.

Meanwhile, in the embodiment, a structure in which the air is discharged at a position adjacent to the upper part of the fan receiving part 104 will be described with reference to the second enlarged view of FIG. 40. As illustrated in the enlarged view, the air exit 169 of the fan housing 162 and the duct entrance 138 of the duct 130 may communicate directly with each other. The first vane 118 and the second vane 120 guiding the air discharged through the outlets 136 adjacent to the duct entrance 138 may extend toward the front of the main body to be parallel to each other as illustrated in the enlarged view. Alternatively, the first vane 118 and the second vane 120 may be configured to incline downward toward the front lower part of the main body 100.

In the embodiment, a structure in which the air is discharged at a position adjacent to the lower part of the fan receiving part 104 will be described with reference to the third enlarged view of FIG. 40. The first vane 118 and the second vane 120 may extend toward the front of the main body 100 to be parallel to each other. Air discharged through the outlets 136 of the duct 130 installed on the lower part of the main body 100 may be discharged toward the front of the main body 100 through the space between the first vane 118 and the second vane 120.

In the embodiment, the lower discharge flow path 145' discharging the air toward the outside of the main body 100 from the lower part of the duct 130 installed in the lower part of the main body 100 may be provided in the lowest part of the main body 100. Since the lower end part of the main body 100 is located at a position apart by predetermined height from the floor, the lower discharge flow path 145' may intensively discharge the air toward a user's feet.

In the embodiment, the moving bar 230 located at the lower part of the main body may be used to dry a user's feet. That is, when the moving bar 230 located at the lower part of the main body is moved to the lowest part of the main body 100, the moving bar may discharge the air and dry a user's feet.

The operation of the drying apparatus disclosed in the specification will be described. In the drying apparatus illustrated in the drawings, air discharged through the outlets 136 may be discharged to a user's body through the space between the first vane 118 and the second vane 120 surrounding the edges of the front plate 112 of the main body 100 and dry moisture on the user's body. As indicated by dotted arrows in FIG. 41, the air discharged through the outlets 136 may dry a user's body while flowing in the direction of the center of a user's body from the opposite sides thereof relative to the front or rear of the user's body. The air discharged through the outlets 136 may function to dry moisture on the user's body and to move the moisture to the center of the user's body.

Discharging air through the outlets 136 may be performed by the operation of the fan assembly 160 located in the fan receiving part 104 of the main body 100. When the fan assembly 160 is operated, outside air is introduced into the main body 100. As illustrated in FIG. 42, the outside air may be purified while flowing through the filter assembly 180. The outside air may flow to the inside of the fan housing 162 of the fan assembly 160. The air blown by the fan 172 located in the fan housing 162 may flow through the air exit 169 and the first heater 174 and into the duct 130. The first heater 174 may set the temperature of the air flowing into the duct 130 to the value of the temperature desired by a user.

The flow of air from the fan assembly 160 to the duct 130 is illustrated in FIG. 43. In the duct 130, the air may flow to the first flow path 140 and the second flow path 142 which are separated from each other. Due to the division of the flow of the air through the first flow path 140 and the second flow path 142 separated from each other, the speed and volume of the air discharged through the outlets 136 formed along the left edge of the main body 100 and the right edge thereof may be generated in a balanced way.

The first flow path 140 and the second flow path 142 may be connected to each other by the connection flow path 145 in the lower flow part. Accordingly, air may be delivered from the connection flow path 145 to the lower discharge flow path 145' and may be discharged to the outside. The air discharged through the lower discharge flow path 145' may be discharged to user's feet to dry the feet.

In the process in which the air is delivered to the first flow path 140 and the second flow path 142 and is discharged to the outlets 136, the flow cross-sectional area may be decreased toward the outlets 136 from the first flow path 140 and the second flow path 142 due to the inclination part 154 present in each of the first flow path 140 and the second flow path 142. Accordingly, since the air is more intensively discharged through the outlets 136, it is possible to provide more than predetermined volume and speed of the air.

The flow of air through the filter assembly 180 will be described by referring back to FIG. 42. When the main body 100 is mounted to the wall surface F, the filter assembly 180 may be in close contact with or adjacent to the wall surface F. When the rear surface of the filter assembly 180 is in close contact with the wall surface F, the air may not flow through the rear surface of the filter assembly 180, but may flow through the first through hole 183' formed in the perimeter frame 183 of the filter frame 182. Accordingly, the air may flow through the first filter 184 located in the first through hole 183' and be purified.

The air flowing through the first filter 184 may flow into the filter frame 182, and flow through the second filter 186 located in the second through hole 185' of the outer window frame 185 and be purified. Next, the air may flow through the third filter 188 located in the third through hole 187' of the inner window frame 187 and be deodorized, and may flow through the air entrance 168 into the inside of the fan housing 162. The air flowing into the fan housing 162 may flow into the duct 130 through the air exit 169 and the first heater 174.

Next, the discharge of air by the moving bar 230 will be described. As indicated by the solid arrows of FIG. 41, in the moving bar 230, the air may be discharged through the nozzle slot 245' of the inclining surface 245. The nozzle slot 245' may be formed by extending longitudinally side to side, and thus may discharge the air in most of the width direction of a user's body. The air discharged from the moving bar 230 may be discharged slantingly toward the front lower part of the main body 100. The air discharged from the moving bar 230 may function to dry moisture on a user's body, and may cause the moisture to be blown down and fall to the ground when there is much moisture on the body. The moving bar 230 may intensively discharge the air to a desired position on the user's body while moving up and down along the front plate 112 of the main body 100.

Air flow in the moving bar 230 will be described with reference to FIG. 44. When the bar fan assembly 250 operates in the moving bar 230, outside air may be introduced into the moving bar 230 through the inlet 248. Filters such as pre-filters may be located in the inlet 248 to purify air. Air flowing through the bar fan assembly 250 may flow through the second heater 268 into the air guide 270. The air may flow through the second heater 268 and have temperature desired by a user.

The air introduced into the air guide 270 is delivered to the discharge nozzle 278 through the first communication slot 276. The first communication slot 276 may be formed longitudinally from the upper flow part 274 of the air guide 270 to the lower part 275 thereof, whereby the air may flow width wide from side to side and may be delivered to the second communication slot 280 of the discharge nozzle 278.

The air flowing through the second communication slot 280 of the discharge nozzle 278 may flow through the nozzle flow path 282 of the discharge nozzle 278 and may be discharged to the outside of the moving bar 230 through the nozzle slot 245'. The air discharged through the nozzle slot 245' of the moving bar 230 may be discharged width wide from side to side and may be discharged to almost the entire width of a user's body, and blow down moisture on the user's body.

FIG. 45 is a block diagram of parts connected to the controller controlling the drying apparatus, and FIGS. 46 to 52 are flowcharts illustrating the control methods of the drying apparatus that may be performed by the controller according to the embodiments.

Referring to FIGS. 45 and 46, the drying apparatus may be turned on by various methods. For example, a user may turn on the drying apparatus using a power button on the manipulation panel 124, and in another example, when the first sensor 105 detects a user located in the front of the main body 100 for a preset period of time, the drying apparatus may be automatically turned on. [S10: the step of turning on the drying apparatus]

When the drying apparatus is turned on, a drying condition may be selected or inputted. The drying condition may include at least one of the discharge position, temperature, volume, and the drying area of air to be discharged. The drying condition may be selected or inputted by various methods. For example, the drying condition may be preset as a default value. Accordingly, when the drying apparatus is turned on, the drying condition preset as the default value may be automatically selected, and the drying apparatus may perform drying according to the automatically selected drying condition. In another example, when the drying apparatus is turned on, the manipulation panel 124 may be turned on, and a user may select or input a drying condition through the manipulation panel 124. In still another example, the manipulation panel 124 may display at least one drying condition of the discharge position, temperature, air volume, and the drying area. When the at least one drying condition is inputted by a user within a preset period of time (for example, three seconds) when the drying condition is displayed, the inputted drying condition may be selected, and when the at least one drying condition is not inputted within the preset period of time, the displayed drying condition may be automatically selected. In this case, selecting the drying condition may mean that the controller 122 finally determines the drying condition. [S20: the step of inputting the drying condition]

When the drying condition is selected as described above, air may be discharged from at least one of the main body 100 and the moving bar 230 according to the selected drying condition. The controller 122 may allow at least one of the fan 172 and the bar fan 256 to be rotated by operating at least one of the fan motor 170 and the bar fan motor 254 such that the air is discharged corresponding to the selected drying condition. In addition, the controller 122 may allow the moving bar 230 to move up and down along the main body 100 in the front surface thereof according to the selected drying condition. For example, in the case in which the moving bar 230 may be selected as the discharge position and the entire body drying or partial body drying is selected, the moving bar 230 may discharge air while moving up and down within the range of the height of the drying area. [S30: the step of discharging air]

When the drying starts, the controller 122 may check elapsed time by using a timer 107. The timer 107 may count time elapsed from time at which the drying apparatus is powered on. [S40: the step of determining drying time]

When preset drying time elapses, the drying process may end. To this end, the controller 122 may stop the operations of the fan motor 170 and the bar fan motor 254 when the drying time elapses after the discharge of air by checking the timer 107, and further, may also stop the operation of the bar drive source 212. [S50: the step of ending drying]

Meanwhile, throughout the present disclosure, the operation of the main body 100 by the controller 122 such that the air is discharged from the main body 100 may mean that the controller 122 allows the fan 172 to be rotated by driving or operating the fan motor 170 arranged in the main body 100.

In addition, throughout the present disclosure, the operation of the moving bar 230 by the controller 122 such that the air is discharged through the moving bar 230 may mean that the controller 122 allows the bar fan 256 to be rotated by driving or operating the bar fan motor 254 arranged in the moving bar 230.

Referring to FIGS. 45 and 47, for drying, the drying apparatus may be turned on. As illustrated in FIG. 46, the drying apparatus may be turned on by various methods. When the drying apparatus is turned on, the drying apparatus may be initialized to a preset state. In the initialized state, power required for various devices, electronic circuits, parts, including motors, sensors, the manipulation panel, and the controller may be supplied, and a preparation process for the operation of the drying apparatus may proceed. In the preparation process, the controller 122 may maintain various motors in stopped states, maintain the manipulation panel 124 in a turned-off state, and operate the first sensor 105. [S101: the step of turning on the drying apparatus]

When the first sensor 105 is operated, the first sensor may detect whether there is a user in the front of the drying apparatus. For example, a user 1 located in the front of the drying apparatus may be detected (see FIG. 53). In this case, the first sensor 105 may be rotated vertically and horizontally to detect whether there is a presence of a user. A result value obtained by the first sensor 105 may be transmitted to the controller 122. When the presence of a user is not detected by the first sensor 105, the controller 122 may control the first sensor such that the first sensor continues detecting. Such detecting may be continuously performed, or may be repeated according to a preset period. [S103: the step of detecting a user]

When the first sensor 105 detects the presence of a user, the controller 122 may turn on the manipulation panel 124, and maintain a motor in a stopped state. A user may input a manipulation command to the manipulation panel 124, and the manipulation panel 124 may display guide information, state information, and drying progress information about the drying apparatus. When the first sensor 105 detects the presence of a user, the controller 122 may turn on the manipulation panel 124. When the manipulation panel 124 is turned on, various information may be displayed thereon. For example, guide information such as "pleasant drying starts" may be displayed. In addition, a sound output part (not shown) may be provided in the manipulation panel 124, and the guide information may be output as sound through the sound output part. [S105: the turning-on of the manipulation panel]

When the manipulation panel is turned on, the controller 122 may control the first sensor 105 such that the first sensor measures the user's body. Information on the detected user's body may be the user's height. The controller 122 may detect a distance from the user's head to feet in real time by vertically rotating the first sensor 105. For measurement to obtain accurate body information, the distance sensor 105 may rotate up and down several times.

The controller 122 may calculate the user's height by using the detected distance. On the basis of the distance detected by the first sensor 105 in the process of measuring the user's body, guide information and/or guide sound may be outputted through the manipulation panel 124 for adjusting a user's standing position. For example, when the user is not standing at the front center of the drying apparatus, but is standing to the left or right thereof, the first sensor 105 may not detect the user's body accurately, and thus the air discharged by the drying apparatus may not reach the body effectively. [S107: the step of measuring a user's body]

When the measurement of the user's body is completed, the controller 122 may allow the manipulation panel 124 to display buttons for the user's manipulation. The buttons may be a plurality of buttons for inputting, selecting, or changing (adjusting) temperature, air volume, the drying area, the discharge position, etc.

The temperature button may be used to select the temperature of the discharging air. For example, the unheated air, warm air, or hot air may be inputted or selected through the temperature button. Furthermore, when one of these items is touched, the touched corresponding temperature may be selected. The value of the selected temperature may be transmitted to the controller 122. Alternatively, when the temperature button is touched one time, the unheated air may be displayed, when the temperature button is touched once more, warm air may be displayed, and when the temperature button is touched still once more, hot air may be displayed. Still alternatively, when a preset period of time (for example, three seconds) has elapsed after each item is displayed, the displayed temperature may be automatically selected. The value of the automatically selected temperature may be transmitted to the controller 122. The items of temperature may be added, or may be removed. Here, warm air and hot air may mean air having at least a predetermined temperature due to the operation of the heater. Although the hot air and the warm air have at least a predetermined temperature, the hot air may have a temperature higher than the warm air. On the other hand, the unheated air may mean air discharged without the operation of the heater.

The air volume button may be intended to select the intensity of discharging air. For example, high volume (strong), medium volume (medium), low volume (weak) may be inputted or selected. Furthermore, when one of these items is touched, the touched corresponding air volume may be selected. In the same manner as the selection of temperature, every time when the air volume button is touched, the high volume, the medium volume, and the low volume may be displayed sequentially, and when the preset period of time (for example, three seconds) has elapsed, the displayed air volume may be autocratically selected. The information of the automatically selected air volume may be transmitted to the controller 122. The items of the air volume may also be added or removed.

The drying area button is intended to select a portion of the body to be dried. For example, the whole body, head, upper body, lower body, hands, feet, and floor may be displayed. Furthermore, when one of these items is touched, the touched corresponding drying area may be selected. In the same manner as the selection of the temperature and/or air volume, whenever the drying area button is touched, the plurality of drying areas may be sequentially displayed. In the displayed state, when a preset period of time (for example, three seconds) has elapsed, the displayed drying area may be automatically selected. The information of the automatically selected drying area may also be transmitted to the controller 122. The items of the drying area may also be added or removed.

The discharge position button is intended to select the discharge position of air. For example, the air discharge of the main body 100 and/or the air discharge of the moving bar 230 may be inputted or selected. For example, the discharge position button may include a main body discharge button and a moving bar discharge button. Alternatively, when the discharge position button is touched one time, a main body discharge may be selected, and when the discharge position button is touched once more, a moving bar discharge may be selected.

Alternatively, the drying condition of at least one of the temperature, air volume, the discharge position, and the drying area of air to be discharged may be displayed on the manipulation panel 124. When the touching by a user is detected within a preset period of time (for example, three seconds) in the state in which the drying condition is displayed, the touched drying condition may be selected, and when the touching by the user is not detected within the preset period of time, the displayed drying condition may be automatically selected.

Other information and functions may also be selected. For example, the speed of the raising/lowering of the moving bar 230, and a button for selecting the maintaining of the drying area (the maintaining of the moving bar) may also be additionally displayed. Furthermore, each of these buttons may be touched at any time during the operation of the drying apparatus, and the drying condition may be changed.

[S109: the step of selecting the drying condition]

When the drying condition is selected, the controller 122 may allow the drying apparatus to be operated such that the drying apparatus discharges air according to the selected drying condition. The controller 122 may allow drying to start by operating the drying apparatus when the drying start button on the manipulation panel 124 is touched after the drying condition is selected. Alternatively, the controller 122 may allow drying to start by automatically operating the drying apparatus when a preset period of time (for example, three seconds) has elapsed after the drying condition is selected.

To start drying, the controller 122 may drive at least one of the fan motor 170 and the bar fan motor 254 such that the air volume is produced corresponding to selected air volume. The fan motor 170 and the bar fan motor 254 may be simultaneously or selectively driven according to a selected discharge position and/or a drying area. That is, when the selected discharge position is the main body 100, the fan motor 170 may be driven, and when the selected discharge position is the moving bar 230, the bar fan motor 254 may be driven, and when the selected discharge position is the main body 100 and the moving bar 230, the fan motor 170 and the bar fan motor 254 may be simultaneously driven. The controller 122 may allow each of the fan 172 and the bar fan 256 to be rotated by driving each of the fan motor 170 and the bar fan motor 254. Accordingly, throughout the present disclosure, the operating, driving, controlling, or rotating of each of the fan 172 and the bar fan 256 by the controller 122 may mean that the controller 122 rotates each of the fan 172 and the bar fan 256 by driving each of the fan motor 170 and the bar fan motor 254.

In addition, the controller 122 may operate at least one of the first heater 174 and the second heater 268 such that the temperature of air to be discharged corresponds to the selected temperature. The first heater 174 and the second heater 268 may also be simultaneously or selectively driven according to the selected temperature and discharge position. That is, when the selected drying condition includes the air discharge of the main body 100, and warm air or hot air, the first heater 174 may be driven. When the selected drying condition includes the air discharge of the moving bar 230, and warm air or hot air, the second heater 268 may be driven. When the selected drying condition includes the simultaneous discharge of the main body 100 and the moving bar 230, and warm air or hot air, the first heater 174 and the second heater 268 may be simultaneously driven. Furthermore, when the discharging air is selected as the unheated air, the controller 122 may not drive the first heater 174 and the second heater 268. In this case, hot air may have temperature higher than the temperature of warm air. Each of the first heater 174 and the second heater 268 may be differently operated according to the temperature of each of warm air and hot air.

Meanwhile, the discharge position may be preset according to the drying area. For example, when the entire body drying is selected, the main body 100 and the moving bar 230 may be preset to simultaneously discharge air. In this case, the controller 122 may simultaneously drive the fan motor 170 and the bar fan motor 254. Alternatively, when the entire body drying is selected, only one of the main body 100 or the moving bar 230 may be preset to discharge air. In this case, the controller 122 may drive only one of the fan motor 170 or the bar fan motor 254. Later, the discharge position could be changed by a user's manipulation. When the discharge position is changed, the controller 122 may selectively drive at least one of the fan motor 170 and the bar fan motor 254 according to the changed discharge position. Accordingly, whether the fan motor 170 and the bar fan motor 254 are selectively driven may be applied to the entire body drying or to the partial body drying in the same way.

The pressure of air discharged from the moving bar 230 may be higher than the pressure of air discharged from the main body 100. The air discharged by the moving bar 230 may apply pressure to a user's body to blow down moisture on the user's body. Accordingly, the air discharged from the main body 100 may dry the body, and at the same time, or independently thereof, the air discharged by the moving bar 230 may blow down moisture on the body. [S111: the step of discharging air]

In the process of drying, together with the operations of the fan motor 170 and/or the bar fan motor 254, and the operations of the first heater 174 and/or the second heater 268, the controller 122 may drive the bar drive source 212 such that the moving bar 230 moves up and down within the range of the preset height (position). This is intended such that the controller allows the moving bar 230 to discharge air while moving up and down to effectively dry a user's body. According to the selected drying area, the moving position and range of the moving bar 230 may be changed. For example, in the case of the entire body drying, the moving bar 230 may move from a preset that is the highest end to a preset that is the lowest end. The upward and downward movement may be repeated a preset number of times. Alternatively, according to the user's detected height at S107, the moving bar 230 may move up and down within the height ranging from the head to feet. Such upward and downward movement may also be repeated a preset number of times. Still alternatively, in the case of the partial body drying, the moving bar 230 may move up and down within a preset height range for each part of the body. For example, in the case of an upper body drying, the moving bar may move up and down within height ranging from the neck to the waist corresponding to the upper body. [S113: the step of moving the moving bar up and down]

When drying starts as described above, the controller 122 may check elapsed time by using the timer 107. The timer 107 may count the time elapsed from the time at which the drying apparatus is powered on. Drying time may be set differently for each drying area. As the drying area increases, drying time may be set to correspondingly increase. The set drying time may be stored in an internal memory. The controller 122 may determine whether the time counted by the timer 107 from time at which the selected drying starts reaches drying time preset according to the drying area. [S115: the step of determining drying time]

When the time counted by the timer reaches the preset drying time, the controller 122 may stop the drying process. When the drying process stops, the controller 122 may stop the operation of all of the fan motor 170, the bar fan motor 254, the first heater 174, and the second heater 268. Of course, the first and second heaters 174 and 268 may not operate in the case of the unheated air, and thus the stopped states of the first and second heaters 174 may be maintained. In addition, when the drying process stops, the controller 122 may allow the moving bar 230 to be moved to a preset position by driving the bar drive source 212. Furthermore, the controller 122 may output visually and/or audibly the guide information of informing the stopping of drying selected by a user's command inputted to the manipulation panel 124. [S117: the step of stopping drying]

Meanwhile, at least some selected steps of the steps S101 to S117 may be selectively performed. For example, the step S103 may not be performed. When the step S103 is not performed, the step S101 may proceed directly to step S105. Alternatively, for example, the step S109 may be selectively performed.

FIG. 48 illustrates a control method of the drying apparatus according to a discharge position of air in the drying apparatus. In describing FIG. 48, the description overlapping with the descriptions of FIGS. 46 and 47 may be selectively omitted in order to avoid duplication of the description.

Referring to FIG. 48, when the drying apparatus is turned on by various methods, the controller 122 may maintain various motors in stopped states, and may maintain the manipulation panel 124 in a turned-off state. In addition, the controller 122 may operate the first sensor 105. [S201: the step of turning on the drying apparatus]

When the first sensor 105 is operated, the first sensor may detect whether there is a user around the drying apparatus. The result value obtained by the first sensor 105 may be transmitted to the controller 122. When a user is not detected by the first sensor 105, the controller 122 may control the first sensor such that the first sensor continues detecting. [S203: the step of detecting a user]

When the first sensor 105 detects a user, the controller 122 may turn on the manipulation panel 124. The user's manipulation command may be inputted at the manipulation panel 124, and the drying condition may be inputted thereto. Additionally, the guide information, state information, and drying process information on the drying apparatus may be displayed. [S205: the step of turning on the manipulation panel]

When the manipulation panel is turned on, the controller 122 may control the first sensor 105 such that the first sensor measures the user's body. Information on the detected user's body may be the user's height. The controller 122 may detect a distance from the user's head to feet in real time by vertically rotating the first sensor 105. [S207: the step of measuring a user's body]

When the first sensor 105 completes the measurement of the user's body, the controller 122 may allow the drying condition to be selected in the manipulation panel 124. The user may touch at least one of the temperature button, the air volume button, the drying area button, and the discharge position button at the manipulation panel 124 to select at least one of the temperature, air volume, the discharge position, or the drying area of discharged air. Alternatively, when at least one of the temperature, air volume, the discharge position, and the drying area displayed on the manipulation panel 124 is touched within a preset period of time (for example, three seconds), the touched drying condition may be selected, and when at least one of the temperature, air volume, the discharge position, and the drying area is not touched within the preset period of time, the displayed drying condition may be automatically selected. [S209: the step of selecting the drying condition]

When the drying condition is manually or automatically selected as described above, the controller 122 may determine whether the selected discharge position is the main body. The discharge position of air may be the main body 100 and the moving bar 230. The main body discharge refers to the discharge of air through the outlets 136 formed in the main body 100, and the moving bar discharge refers to the discharge of air through the nozzle slot 245' formed slantingly in the lower surface of the moving bar 230. [S211: the step of determining whether air is discharged from the main body]

When the main body discharge is selected, the controller 122 may drive the fan motor 170 so that the air is discharged from the main body 100. The fan 172 may be rotated by the driving of the fan motor 170, and the air may be discharged through the outlets 136 of the main body 100. [S213: the step of driving the fan motor]

In addition, the controller 122 may determine whether the air having the selected temperature is warm air or hot air. The temperature may be divided into various levels. The temperature may be divided into two levels of unheated air and warm air, or three levels of unheated air, warm air, and hot air. Of course, the temperature may be divided into more levels. The unheated air may mean air which is not heated. [S215: the step of determining whether air having the selected temperature is warm air or hot air]

When the warm air or hot air is selected, the controller 122 may drive the first heater 174, and set the temperature of air discharged through the outlets 136 of the main body 100 to the temperature corresponding to the selected warm air or hot air. [S217: the step of driving the first heater]

If the unheated air is selected instead of the warm air or the hot air, the controller 122 may turn off the first heater 174 or maintain the first heater 174 to be off. The unheated air may refer to the air discharged without using the heater. In this case, the unheated air may be the air cooler than the warm air or hot air. For example, the unheated air may be used in summer, and the warm air or hot air may be used in fall or winter. [S219: the step of turning off the first heater]

Here, the steps S215 to S219 may be taken independently of S211 and S213. Alternatively, S215 to S219 may be performed prior to or at the same time as S211 and S213.

When the main body discharge is not selected at S211, it may be determined whether the moving bar discharge is selected. [S221: the step of determining whether the moving bar discharge is selected]

When the moving bar discharge is selected, the controller 122 may drive the bar fan motor 254 so that the air is discharged from the moving bar 230. In this case, the fan motor 170 may be stopped. The bar fan 256 may be rotated by the driving of the bar fan motor 254, and thus the air may be discharged from the moving bar 230. [S223: the step of driving the bar fan motor]

In addition, the controller 122 may determine whether the air having the selected temperature is warm air or hot air. Temperature may be divided into multiple levels. [S225: the step of determining whether air having the selected temperature is warm air or hot air]

When warm air or hot air is selected, the controller 122 may drive the second heater 268, and may adjust the temperature of air discharged from the moving bar 230 to a temperature corresponding to the selected warm air or hot air. [S227: the step of driving the second heater]

When the unheated air is selected instead of warm air or hot air, the controller 122 may turn off the second heater 268. [S229: the step of turning off the second heater]

Here, the steps S225 to S229 may be taken independently of the steps S221 and S223. Alternatively, the steps S225 to S229 may be taken prior to, or at the same time as the steps S221 and S223.

When the moving bar discharge is not selected at S221, whether the simultaneous discharge of the main body and the moving bar is selected may be determined. [S231: the step of determining whether the simultaneous discharge of the main body and the moving bar is selected]

When the simultaneous discharge of the main body and the moving bar is selected, the controller 122 may drive the fan motor 170 and the bar fan motor 254 such that the air is discharged simultaneously from the main body 100 and the moving bar 230. The fan 172 and the bar fan 256 may be rotated by the driving of the fan motor 170 and the bar fan motor 254, and thus the air may be discharged simultaneously from the main body 100 and the moving bar 230. [S233: the step of simultaneously driving the fan motor and the bar fan motor]

In addition, the controller 122 may determine whether the air having the selected temperature is warm air or hot air. [S235: the step of determining whether air having the selected temperature is warm air or hot air]

When warm air or hot air is selected, the controller 122 may drive the first heater 174 and the second heater 268, and may adjust the temperature of the air discharged from the main body 100 and the moving bar 230 to a temperature corresponding to the selected warm air or hot air. [S237: the step of driving the first and second heaters]

When the unheated air is selected instead of warm air or hot air, the controller 122 may turn off the first heater 174 and the second heater 268. [S239: the step of turning off the first and second heaters]

Later, according to the selected discharge position and/or drying area, the moving bar 230 may be moved up and down. To this end, the controller 122 may allow the moving bar 230 to move up and down within a height range corresponding to the selected drying area by driving the bar drive source 212. [S241: the step of moving the moving bar up and down]

Accordingly, whether the fan motor 170 and/or the bar fan motor 254 is driven may be determined according to the discharge position. Additionally, the driving speed of each of the fan motor 170 and the bar fan motor 254 may be related to the volume of air to be discharged. That is, the driving speed of each of the fan motor 170 and the bar fan motor 254 may determine the rotating speed of each of the fan 172 and the bar fan 256, and accordingly, the air volume may be determined.

FIG. 49 illustrates a control method of the drying apparatus according to a drying area in the drying apparatus. In describing FIG. 49, description overlapping with the descriptions of FIG. 46 to FIG. 48 may be selectively omitted in order to avoid duplication of the description.

Referring to FIG. 49, when the drying apparatus is turned on, the controller 122 may maintain the motors in stopped states, and may maintain the manipulation panel 124 in a turned-off state. Additionally, the controller 122 may operate the first sensor 105. [S301: the step of turning on the drying apparatus]

When the first sensor 105 is operated, the first sensor may detect whether there is a user in the front of the drying apparatus. The result value obtained by the first sensor 105 may be transmitted to the controller 122. When a user is not detected by the first sensor 105, the controller 122 may control the first sensor such that the first sensor continues detecting. [S303: the step of detecting a user]

When the first sensor 105 detects a user, the controller 122 may turn on the manipulation panel 124. The user's manipulation command may be inputted at the manipulation panel 124, and the drying condition may be inputted thereto. Additionally, the guide information, state information, and drying process information on the drying apparatus may be displayed. [S305: the step of turning on the manipulation panel]

When the manipulation panel is turned on, the controller 122 may control the first sensor 105 such that the first sensor measures the user's body. Information on the detected user's body may be the user's height. [S307: the step of measuring a user's body]

When the first sensor 105 completes the measurement of the user's body, the controller 122 may allow the drying condition to be selected in the manipulation panel 124. The user may touch at least one of the temperature button, the air volume button, the drying area button, and the discharge position button at the manipulation panel 124 to select at least one of the temperature, air volume, the discharge position, and the drying area of discharging air. Alternatively, when at least one of the temperature, air volume, the discharge position, and the drying area displayed on the manipulation panel 124 is touched within a preset period of time (for example, three seconds), the touched drying condition may be selected, and when at least one of the temperature, air volume, the discharge position, and the drying area is not touched within the preset period of time, the displayed drying condition may be automatically selected. [S309: the step of selecting the drying condition]

When the drying condition is manually or automatically selected, the controller may determine whether the drying area is selected as the entire body drying. The entire body drying may be removing moisture on a user's body by discharging air to the entirety of the user's body from the user's head to feet. [S311: the step of determining whether the entire body drying is selected]

When the entire body drying is selected, the controller 122 may simultaneously drive the fan motor 170 and the bar fan motor 254 or may drive one thereof such that the air corresponding to selected air volume is discharged from the discharge position selected through the manipulation panel 124. At the same time or independently, the controller may operate or may not operate the first heater 174 and the second heater 268 simultaneously, or may operate only one thereof such that the air corresponding to selected temperature is discharged. [S313: the step of firstly discharging air]

Together with such air discharge, the upward/downward movement of the moving bar 230 for the entire body drying may start. Air may be required to be discharged from a user's head to feet for the entire body drying. Accordingly, the moving bar 230 may move up and down from an upper position corresponding to the user's head to a lower position corresponding to the user's feet. Such upward and downward movements may be repeated. The upper position may be the highest end to which the moving bar 230 may move up, and the lower position may be the lowest end to which the moving bar 230 may move down. For the vertical upward/downward movement of the moving bar 230, the controller 122 may drive the bar drive source 212. [S315: the step of moving the moving bar up and down]

The upward/downward movement of the moving bar 230 may be performed for a preset period of time. Such a preset period of time may be the time required for the entire body drying. The controller 122 may determine whether the preset period of time has elapsed by using the time counted by the timer 107 after the entire body drying starts. [S317: the step of determining drying time]

When the preset period of time has elapsed, the controller 122 may stop the first and second heaters 174 and 268, the fan motor 170 and the bar fan motor 254, and the bar drive source 212 so as to end the process of the entire body drying. In the process of the ending the entire body drying, the moving bar 230 may be moved to a preset position and stopped. The controller 122 may drive the bar drive source 212 such that the moving bar 230 is moved to the preset position by moving up or down the moving bar 230. Alternatively, when a drying end button on the manipulation panel 124 is touched by a user before the preset period of time has elapsed, the controller 122 may stop the process of the entire body drying. [S319: the step of stopping drying]

Meanwhile, at S311, it may be determined that the drying area is selected as the partial body drying instead of the entire body drying. For example, the partial body drying may include: head drying, upper body drying, lower body drying, feet drying, and floor drying. At S311, the controller 122 may determine whether one of the plurality of items of the partial body drying is selected. [S321: the step of selecting the partial body drying]

When the partial body drying is selected, the operation for performing the partial body drying may be performed. Particularly, the controller 122 may simultaneously drive the fan motor 170 and the bar fan motor 254 or may drive one thereof such that the air corresponding to selected air volume is discharged from the discharge position selected through the manipulation panel 124. At the same time or independently, the controller 122 may operate or may not operate the first heater 174 and the second heater 268 simultaneously, or may operate only one thereof such that the air corresponding to selected temperature is discharged. [S323: the step of secondly discharging air]

Together with such air discharge, the upward/downward movement of the moving bar 230 for the partial body drying may start. For the partial body drying, air may be required to be discharged only to the selected drying area. Accordingly, the moving bar 230 may move up and down within a height range corresponding to the selected drying area. The height range may be predetermined according to the drying area (see FIG. 54). Such upward and downward movements may be repeated a plurality of times. For example, as illustrated in FIG. 54, in the case of the head drying, the moving bar 230 may be moved up and down within a height range R1 corresponding to a user's head; in the case of the upper body drying, the moving bar 230 may be moved up and down within a height range R2 corresponding to the user's waist from the user's neck; in the case of lower body drying, the moving bar 230 may be moved up and down within a height range R3 corresponding to the user's ankle from the user's waist; and in the case of feet drying, the moving bar 230 may be moved up and down within a height range R4 from the ankle to the floor. In the case of floor drying, the moving bar 230 may move down to the height of the lowest end. For moving the moving bar 230 up and down, the controller 122 may drive the bar drive source 212. [S325: the step of moving the moving bar up and down]

Later, the step S317 may be performed, and the controller 122 may determine whether a preset period of time corresponding to the selected drying area has elapsed. When the preset period of time has elapsed, the step S319 may be performed and the drying may stop.

FIG. 50 illustrates a control method of the drying apparatus when air discharged by the moving bar of the drying apparatus dries the hand. In describing FIG. 50, description overlapping with FIGS. 46 to 49 may be selectively omitted in order to avoid duplication of the description.

Referring to FIG. 50, when the drying apparatus is turned on, the controller 122 may maintain the motors in stopped states, and may maintain the manipulation panel 124 in a turned-off state. Furthermore, the controller 122 may operate the first sensor 105 and the second sensor 286. [S401: the step of turning on the drying apparatus]

When the first sensor 105 is operated, the first sensor may detect whether there is a user around the drying apparatus.

A result value obtained by the first sensor 105 may be transmitted to the controller 122. [S403: the step of detecting a user]

When the first sensor 105 detects a user, the controller 122 may turn on the manipulation panel 124. The user's manipulation command may be inputted at the manipulation panel 124, and the drying condition may be input thereto. Additionally, the guide information, state information, and drying process information on the drying apparatus may be displayed. [S405: the step of turning on the manipulation panel]

When the manipulation panel 124 is turned on, the controller 122 may control the second sensor 286 such that the second sensor 286 detects whether there is a portion of a user's body under the moving bar 230. For convenience of description, a portion of the human body is called the hands (see FIG. 55). Of course, the portion of the human body may be a different part of the body. The detection result may be transmitted to the controller 122. [S407: the step of detecting a portion of a user's body]

When the second sensor 286 detects hands 2 located under the moving bar 230 (see FIG. 55), a distance between the moving bar and the hands 2 may be detected in real time. The detected distance value between the moving bar and the hands 2 may be transmitted to the controller 122 in real time. [S409: the step of measuring a distance between the moving bar and the hand]

The controller 122 may determine whether the detected distance between the moving bar and the hands is longer than a preset reference distance. The fact that the detected distance is longer than the reference distance may mean that the hands are located at a position farther than the reference distance from the moving bar 230. [S411: the step of determining a distance]

In the drying apparatus, when the hands are located at a position apart by at least the reference distance from the moving bar 230 by which air is discharged, the effect of drying the hands may be decreased. To increase the effect of the drying of the hand, the controller 122 may move the position of the moving bar 230 by driving the bar drive source 212. The controller 122 may move the moving bar 230 by driving the bar drive source 212 until the detected distance between the moving bar 230 and the hands 2 reaches the reference distance. Preferably, the controller 122 may move down the moving bar 230 (see FIG. 55). In FIG. 55, for example, when a detected distance Y1 between the moving bar 230 and the hands 2 is longer than the reference distance Y2, the moving bar 230 may move down, and when Y1 is the same as Y2, the moving bar may stop. The reference distance may be a distance in which the effect of drying the hands 2 by using the air discharged by the moving bar 230 is maximized. Such a reference distance may be preset and stored. Alternatively, even when the detected distance is shorter than the preset minimum distance, the controller 122 may selectively drive the bar drive source 212 and move the moving bar 230. The fact that the detected distance is shorter than the minimum distance may mean that the hands 2 are excessively close to the moving bar 230. In this case, since the discharging air is likely to be discharged only to a certain position of the hands 2, the drying effect may be reduced. To improve this, the moving bar 230 may be moved such that a distance between the moving bar 230 and the hands 2 is longer than the minimum distance. [S413: the step of moving the moving bar]

The controller 122 may determine whether the detected distance reaches the reference distance. [S415: the step of determining a distance]

When the detected distance reaches the reference distance or is longer than the minimum distance, the controller 122 may stop the operation of the bar drive source 212 to stop the movement of the moving bar 230. This may mean that the controller determines that a distance between the moving bar 230 and the hands 2 for drying the hands is optimal, and stops the movement of the moving bar 230. [S417: the step of stopping the moving bar]

When the movement of the moving bar 230 stops, the controller 122 may allow the air to be discharged at a preset temperature and air volume or at a temperature and air volume selected by a user. To this end, the controller 122 may drive the bar fan motor 254 according to the selected air volume, and together with this, may determine whether to drive the second heater 268 according to the selected temperature. For example, in the case of the unheated air, the second heater 268 may not be driven, and only in the case of hot air or warm air, the second heater 268 may be driven. [S419: the step of discharging air]

The controller 122 may determine whether a preset period of time has elapsed after the air discharge starts. [S421: the step of determining whether a preset period of time has elapsed]

When the preset period of time has elapsed, the process of drying the hands may end. When the process of drying the hands ends, the controller 122 may allow the moving bar 230 to be moved to a preset position by driving the bar drive source 212. [S423: the step of ending hand drying]

Meanwhile, in the present disclosure, while the hand drying is performed by the air discharged by the moving bar 230, the moving bar 230 may be dynamically moved according to the change of a hand position such that a distance between the moving bar 230 and the hands is maintained constant.

FIG. 51 illustrates a control method of the drying apparatus according to a movement of the hands during the drying of the hands by the drying apparatus. Referring to FIG. 51, to dry the hands 2 detected under the moving bar 230 as described above, air may be discharged by the moving bar 230. [S501: the step of discharging air by the moving bar]

Even while the air is discharged by the moving bar 230, the second sensor 286 may detect a distance between the moving bar and the hands 2 in real time. Measuring the distance between the moving bar and the hands 2 in real time is intended to detect the upward/downward movement of the hands 2 in real time. The detected distance value may be transmitted to the controller 122. [S503: the step of firstly measuring a distance between the moving bar and the hand]

The controller 122 may compare the real-time detected distance with a preset reference distance. Through the comparison, the controller 122 may determine whether the real-time detected distance is the same as the reference distance. This is intended to determine whether a user's hands are located at a position apart by the reference distance from the moving bar 230. [S505: the step of firstly determining whether the real-time detected distance reaches the reference distance]

When the real-time detected distance is longer than the reference distance in the comparison, the moving bar 230 is located at a position apart longer than the reference distance from the user's hand, so the controller 122 may allow the moving bar 230 to be moved. In this case, the controller 122 may allow the moving bar 230 to be moved to a position close to the hands by driving the bar drive source 212. The moving bar 230 may be lowered (see FIG. 55). [S507: the step of firstly moving the moving bar]

At S507, even during the movement of the moving bar 230, the second sensor 286 may continuously detect a distance between the moving bar and a user's hands in real time. The real-time detected distance value may be transmitted to the controller 122 in real time. The controller 122 may determine whether the real-time detected distance reaches the reference distance. [S509: the step of secondly determining whether the real-time detected distance reaches the reference distance]

When the real-time detected distance reaches the reference distance, the controller 122 may stop the operation of the bar drive source 212 such that the movement of the moving bar 230 stops. The movement of the moving bar 230 may continue until the real-time detected distance reaches the reference distance. [S511: the step of stopping the moving bar]

In the comparison, when the real-time detected distance is shorter than the reference distance, the controller 122 may determine whether the real-time detected distance is shorter than a preset minimum distance. When the detected distance is shorter than the minimum distance, a user's hands may be excessively close to the moving bar 230, so the effect of drying the hands may be decreased. In this case, the moving bar 230 may be moved to a position farther from the hand. Preferably, the distance between the moving bar and the hands may reach the reference distance. [S513: the step of thirdly determining whether the real-time detected distance reaches the reference distance]

When the detected distance is shorter than the minimum distance, the controller 122 may allow the moving bar 230 to be moved by driving the bar drive source 212. In this case, the controller may allow the moving bar 230 to be moved up. Such a movement of the moving bar 230 may continue until the real-time detected distance reaches the reference distance. [S515: the step of secondly moving the moving bar]

Later, the step S509 may be performed, and the second sensor 286 may determine in real time whether the distance between the moving bar and the hands reaches the reference distance. When the detected distance reaches the reference distance, the moving bar 230 may stop at the step S511.

Due to such a process, during the hand drying, a distance between the moving bar 230 and the user's hands may be maintained constant. Although the position of the hands changes, the moving bar 230 may move by actively responding to the change of the position of the hand.

FIG. 52 illustrates a control method of the drying apparatus during the drying of a place in which the drying apparatus is installed, for example, the floor of a bathroom instead of the drying of a user's body by the drying apparatus. In describing FIG. 52, description overlapping with FIGS. 46 to 51 may be selectively omitted in order to avoid the duplication of the description.

Referring to FIG. 52, when the drying apparatus is turned on, the controller 122 may maintain the motors in stopped states, and may maintain the manipulation panel 124 in a turned-off state. In addition, the controller 122 may operate the first sensor 105. [S601: the step of turning on the drying apparatus]

When the first sensor 105 is operated, the first sensor may detect whether there is a user around the drying apparatus. A result value obtained by the first sensor 105 may be transmitted to the controller 122. [S603: the step of detecting a user]

When the first sensor 105 detects a user, the controller 122 may turn on the manipulation panel 124. The user's manipulation command may be inputted at the manipulation panel 124, and the drying condition may be inputted thereto. Additionally, the guide information, state information, and drying process information on the drying apparatus may be displayed. [S605: the step of turning on the manipulation panel]

When the manipulation panel 124 is turned on, a user may select the floor drying on the manipulation panel 124. Alternatively, the floor drying may be displayed on the manipulation panel 124, and when the user touches the floor drying within a preset period of time (for example, three seconds), the touched floor drying may be selected. When the floor drying is not touched within the preset period of time, the displayed floor drying may be automatically selected. Accordingly, the controller 122 may check whether an automatic selection is performed or a manual selection by a user is performed. [S607: the step of selecting the floor drying]

When the floor drying input is received, the controller 122 may allow the moving bar 230 to be moved to the position of a preset lowest end such that the moving bar approaches at a position closest to the floor by driving the bar drive source 212. This is intended to perform the floor drying by using the air discharged by the moving bar 230. [S609: the step of moving the moving bar to the lowest end thereof]

The controller may determine whether the moving bar 230 is moved to the lowest end. [S611: the step of determining the moving bar's moving]

When the moving bar 230 is moved to the lowest end, the controller 122 may stop the operation of the bar drive source 212 to stop the movement of the moving bar 230. To this end, in the present disclosure, a limit sensor (not shown) detecting whether the moving bar 230 reaches the position of the highest end or the position of the lowest end may be provided. [S613: the stopping of the moving bar]

When the moving bar 230 reaches the position of the lowest end, the moving bar may discharge air having preset temperature and air volume at the preset discharge position. For example, the air may be discharged simultaneously from the main body 100 and the moving bar 230, or from a selected one thereof, and may be discharged as hot air or warm air, and may be discharged at a medium air volume. Of course, the discharge position, temperature, and air volume may be set variously, and may be changed by a user. Such a drying condition may be changed by a user. The discharging air may reach the floor. [S615: the step of discharging air]

After the air discharge is performed, the controller 122 may determine whether a preset period of time has elapsed. [S617: the step of determining drying time]

When the preset period of time has elapsed, the process of the floor drying may end. When the process of the floor drying ends, the controller 122 may allow the moving bar 230 to be moved to a preset position by driving the bar drive source 212. [S619: the step of ending floor drying]

Even though it has been described that all components constituting the embodiments of the present disclosure are combined into one or operated in combination with each other, the drying apparatus of the present disclosure is not necessarily limited to these embodiments. That is, within the scope of the objective of the present disclosure, all of the components may be selectively combined into at least one and operated.

In the illustrated embodiment, the controller 122 is located in the main body 100, but the entire function of the controller 122 or at least a partial function thereof may be performed outside the main body 100. For example, a home network server may perform the entire function of the controller 122, or at least the partial function thereof.

In the illustrated embodiment, the outlets 136 is formed in the duct cover 134 of the duct 130, and is exposed to the front of the main body 100 through the first vane 118 and the second vane 120. However, the outlets 136 may be formed in a structure located at the front end frame 102 constituting the main body 100. In this case, the outlets 136 formed in the duct cover 134 and the outlets formed in the front end frame 102 may directly communicate with each other.

In the illustrated embodiment, the outlets 136 are formed in the front surface of the main body 100. However, the outlets 136 may be formed in other positions except for the front surface such as the side surface of the main body 100 and may be configured to allow air to be discharged toward the front of the main body 100. For example, the outlets may be formed along the perimeter wall 103 of the main body 100, and may be configured to be open toward the front of the main body 100.

In the illustrated embodiment, the moving bar 230 may be connected to the drive assembly 210 or 210' located in the main body through the movement channel 121 of the front surface of the main body 100. However, a part such as the movement channel 121 may be formed in the side surfaces or rear surface of the main body 100 through which the moving bar 230 is moved.

In the illustrated embodiment, in the duct 130, the first flow path 140 and the second flow path 142 may be formed by being separated from each other by the partition wall 144. However, unlike the configuration in which the first flow path 140 and the second flow path 142 are separated from each other by the partition wall 144, in the air exit 169 of the fan assembly 160, separate pipes or tubes in which the first flow path 140 and the second flow path 142 are formed may be installed to communicate with each other such that air flows through. In this case, outlets communicating with the outlets 136 may be formed in the separate pipes or tubes, or the separate pipes or tubes may function as the outlets 136.

In the illustrated embodiments, the moving bar 230 may be mounted to the main body 100, and may be configured to discharge air to a user's body while moving. However, without the moving bar 230, the main body 100 may be configured to discharge air to a user's body, through the outlets 136 thereof.

The moving bar 230 of the illustrated embodiments may be configured variously and may move along the main body 100. In the drying apparatus of the present disclosure, the moving bar configured in various shapes may be installed in the main body 100 through the side surfaces or rear surface of the main body 100, and be moved. That is, the moving bars having various shapes used in the drying apparatus of the present disclosure may have the same function as the function of the moving bar 230, and may have installation shapes and exterior configurations different from the moving bar 230.

In the specification, outside air may be introduced into the main body 100 through the entrance hole 108, and the air introduced through the entrance hole 108 may be introduced into the main body 100 by flowing through the filter assembly 180 from the rear of the main body 100. Here, the rear of the main body 100 may substantially include the rear ends of the side surfaces of the main body 100. Here, the inclining surface 109 of the rear end frame 106 may be located at each of the rear ends of the side surfaces of the main body 100, so that air may be substantially introduced to the filter assembly 180 from the rear of the main body 100.

What is claimed is:

1. A drying apparatus comprising:

a main body having a front end frame and a rear end frame constituting an exterior thereof and having an entrance hole through which air is introduced into the rear end frame, the main body allowing the air to be discharged by surrounding edges of a front surface of the front end frame;

a fan assembly disposed inside the entrance hole of the main body to receive the air from the rear end frame of the main body and generate a flow of the air;

a duct communicating with the fan assembly and allowing the flow of the air to be delivered to the surrounding edges of the front surface of the front end frame of the main body to be discharged; and a moving bar movably mounted to the main body to discharge air introduced from an outside of the moving bar while moving up and down along the main body, wherein the main body includes a fan receiving part disposed at an upper part of the front end frame and protruding therefrom toward a front of the main body in which the fan assembly is disposed therein.

2. The drying apparatus of claim 1, wherein the fan assembly comprises:

a fan housing having an air entrance and an air exit, and having an air flow space therein;

a fan motor disposed outside the fan housing to supply a driving force; and a fan rotated by the fan motor and disposed in the fan housing.

3. The drying apparatus of claim 2, wherein the air entrance of the fan housing communicates with a filter assembly, and the air exit of the fan housing communicates with the duct.

4. The drying apparatus of claim 2, wherein in the fan housing, a housing cover to which the fan motor is mounted is disposed at a side opposite to the air entrance, and in the fan receiving part, the fan motor is disposed at a side at which the front end frame is located.

5. The drying apparatus of claim 2, wherein the air entrance of the fan housing is open toward a rear surface of the rear end frame, and the air exit of the fan housing is open toward a duct entrance of the duct disposed at a position lower than the fan housing inside the main body.

6. The drying apparatus of claim 5, further comprising a heater disposed between the air exit of the fan housing and the duct entrance of the duct to set a temperature of the air.

7. The drying apparatus of claim 1, further comprising a filter assembly installable at the entrance hole of the rear end frame to purify the air introduced into the entrance hole.

8. The drying apparatus of claim 7, wherein the air is introduced into the rear end frame through side edges of the filter assembly, and flows into the fan assembly through an inside of the filter assembly.

9. The drying apparatus of claim 2, wherein the fan of the fan assembly has a rotational center corresponding to a center of the air entrance of the fan housing, and discharges the air introduced through the air entrance in radial directions, thereby allowing the air to flow to the air exit open toward a duct entrance.

10. A drying apparatus comprising:

a main body having an entrance hole through which air is introduced thereinto and having outlets through which the air is discharged toward a front of the main body;

a fan assembly disposed inside the entrance hole of the main body to receive the air from a rear surface of the main body and generate a flow of the air;

a duct communicating with the fan assembly and allowing the flow of the air to be delivered to the outlets; and a moving bar movably mounted to the main body to discharge air introduced from an outside of the moving bar while moving up and down along the main body, wherein the main body includes a fan receiving part at an upper part of the main body and protruding forward therefrom in which the fan assembly is disposed therein.

11. The drying apparatus of claim 10, wherein the fan assembly comprises:

a fan housing having an air entrance and an air exit, and having an air flow space defined therein;

a fan motor disposed outside the fan housing to supply a driving force; and a fan rotated by the fan motor and disposed in the fan housing.

12. The drying apparatus of claim 11, wherein the air entrance of the fan housing communicates with a filter assembly that purifies the air introduced into the main body.

13. The drying apparatus of claim 11, wherein the air exit of the fan housing communicates with the duct.

14. The drying apparatus of claim 13, further comprising a heater disposed between the fan housing and the duct to set a temperature of the air.

15. The drying apparatus of claim 11, wherein in the fan housing, a housing cover to which the fan motor is mounted is disposed at a side opposite to the air entrance, and in the fan receiving part of the main body, the fan motor is disposed at a side of a front end of the main body.

16. The drying apparatus of claim 11, wherein the air entrance of the fan housing is open toward the rear surface of the main body, and the air exit of the fan housing is open toward a duct entrance of the duct disposed at a position lower than the fan housing inside the main body.

17. The drying apparatus of claim 12, wherein the fan of the fan assembly operates to introduce the air in a direction of a rotational shaft thereof and discharges the air in radial directions thereof, so that the air flows in the air flow space of the fan housing and is delivered to the air exit open toward a duct entrance.

18. The drying apparatus of claim 10, wherein a filter assembly to purify the air is installable in the entrance hole located in a rear surface of the fan receiving part of the main body.

19. The drying apparatus of claim 18, wherein the air is introduced into the main body through side edges of the filter assembly, and flows into the fan assembly through an inside of the filter assembly.

20. The drying apparatus of claim 10, wherein the entrance hole of the main body is open in a direction facing a wall surface to which the main body is located.

* * * * *